US012520855B2

(12) United States Patent
Simmons et al.

(10) Patent No.: US 12,520,855 B2
(45) Date of Patent: Jan. 13, 2026

(54) IMMERSION CONTAINER FOR TREATING PRODUCE WITH AN OZONATED CONCENTRATE LIQUID

(71) Applicant: BioSure North America LLC, Fair Oaks Ranch, TX (US)

(72) Inventors: Darren Simmons, Fair Oaks Ranch, TX (US); Ivor J.J. Longo, Atlanta, TX (US); Wayne Simmons, Adkins, TX (US); H Brock Kolls, Alpharetta, GA (US)

(73) Assignee: BioSure North America LLC, Fair Oaks Ranch, TX (US)

( * ) Notice: Subject to any disclaimer, the term of this patent is extended or adjusted under 35 U.S.C. 154(b) by 0 days.

(21) Appl. No.: 18/919,605

(22) Filed: Oct. 18, 2024

(65) Prior Publication Data

US 2025/0311742 A1 Oct. 9, 2025

Related U.S. Application Data

(63) Continuation-in-part of application No. 18/782,055, filed on Jul. 24, 2024, now Pat. No. 12,274,805, and
(Continued)

(51) Int. Cl.
*A23B 7/157* (2006.01)
*A23B 7/02* (2006.01)
(Continued)

(52) U.S. Cl.
CPC ............... *A23B 7/157* (2013.01); *A23B 7/02* (2013.01); *A47J 43/24* (2013.01); *C02F 1/46104* (2013.01); *C02F 2201/4611* (2013.01)

(58) Field of Classification Search
CPC .................... A61L 2/10; A47J 43/24
See application file for complete search history.

(56) References Cited

U.S. PATENT DOCUMENTS

2016/0165947 A1* 6/2016 Hoye ..................... A23N 12/06
134/57 R
2017/0208826 A1* 7/2017 Lynn ................... B01F 23/2326

FOREIGN PATENT DOCUMENTS

JP 3108333 U * 4/2005

OTHER PUBLICATIONS

English translation of JP-3108333-U (Year: 2005).*

* cited by examiner

*Primary Examiner* — Sean E Conley
(74) *Attorney, Agent, or Firm* — H. Brock Kolls

(57) ABSTRACT

An immersion container for treating produce with an ozonated concentrate liquid is disclosed. The container is configured to hold produce up to a produce fill line and ozonated concentrate liquid up to an ozonated concentrate liquid fill line, ensuring full immersion of the produce. An adjustable egress port controls the drainage of the liquid at a time rate corresponding to a disinfection treatment time. A drying platform supports the produce during immersion, oxygenation, and drying processes. One or more produce agitation mechanisms are operationally related to either the drying platform or the container and are configured to enhance ozonated concentrate liquid interaction during immersion or dislodge any remaining liquid post-treatment. The ozonated concentrate liquid is generated from water via an electrochemical generator. The system may include a flow governor to regulate ozone production and concentration. A method of treating produce using the immersion container is also provided.

21 Claims, 33 Drawing Sheets

Related U.S. Application Data a continuation-in-part of application No. 18/782,058, filed on Jul. 24, 2024, now Pat. No. 12,194,164, and a continuation-in-part of application No. 18/646,394, filed on Apr. 25, 2024, and a continuation-in-part of application No. 18/628,680, filed on Apr. 6, 2024, now Pat. No. 12,137,699.

(51) Int. Cl.
*A47J 43/24* (2006.01)
*C02F 1/461* (2023.01)

Post-Harvest Produce Treatment

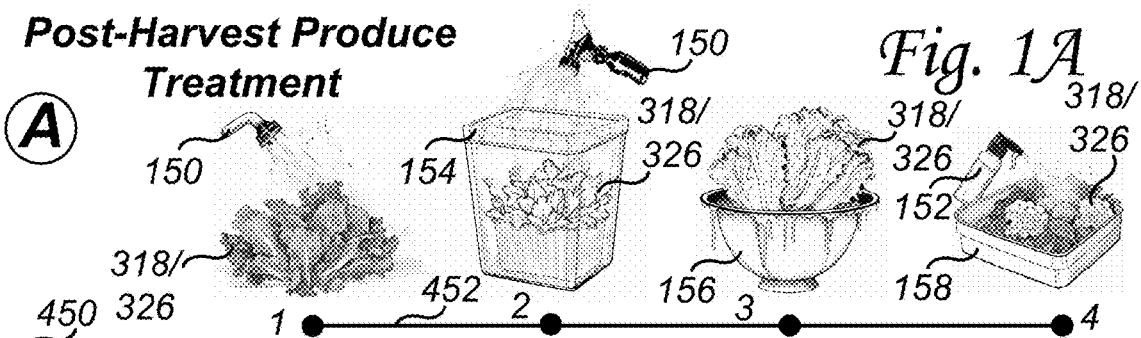

*Fig. 1A*

| O₃ Delivery | Spray | Immersion | Delay Drying | Mist |
|---|---|---|---|---|
| Action | Remove Pesticide Residuals | Disinfect | Oxygenate | Neutralize Odor |
| Duration | Seconds | < 1 Min | > 1 Min | Repeat > 1 Hr & Air Dry |
| Outcome | Produce Surface Decontamination And Pathogen Inactivation | | Plant Tissue Cellular Revitalization | |

Food Preparation Disinfection Treatment

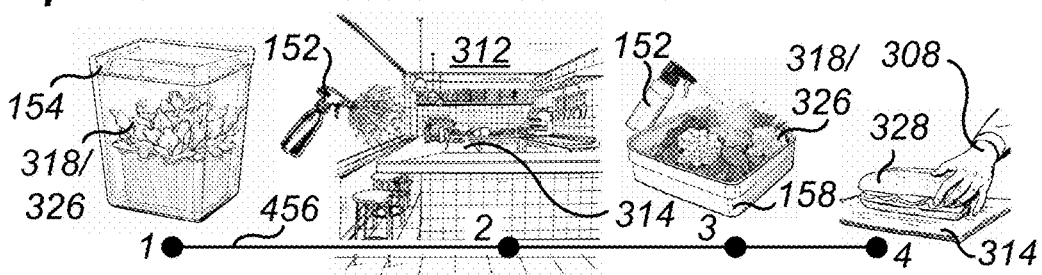

Prepare Food Item

| O₃ Delivery | Immersion | Mist | Mist | |
|---|---|---|---|---|
| Action | Disinfect (Produce) | Disinfect (Food Prep Areas) | Oxygenate & Neutralize Odor (Produce) | |
| Duration | < 1 Min | Wipe > 30 Sec Prefer Air Dry | Repeat > 1 Hr & Air Dry | 454 |
| Outcome | Produce/Prep Area Surfaces Decontamination And Pathogen Inactivation | | Plant Tissue Cellular Revitalization | |

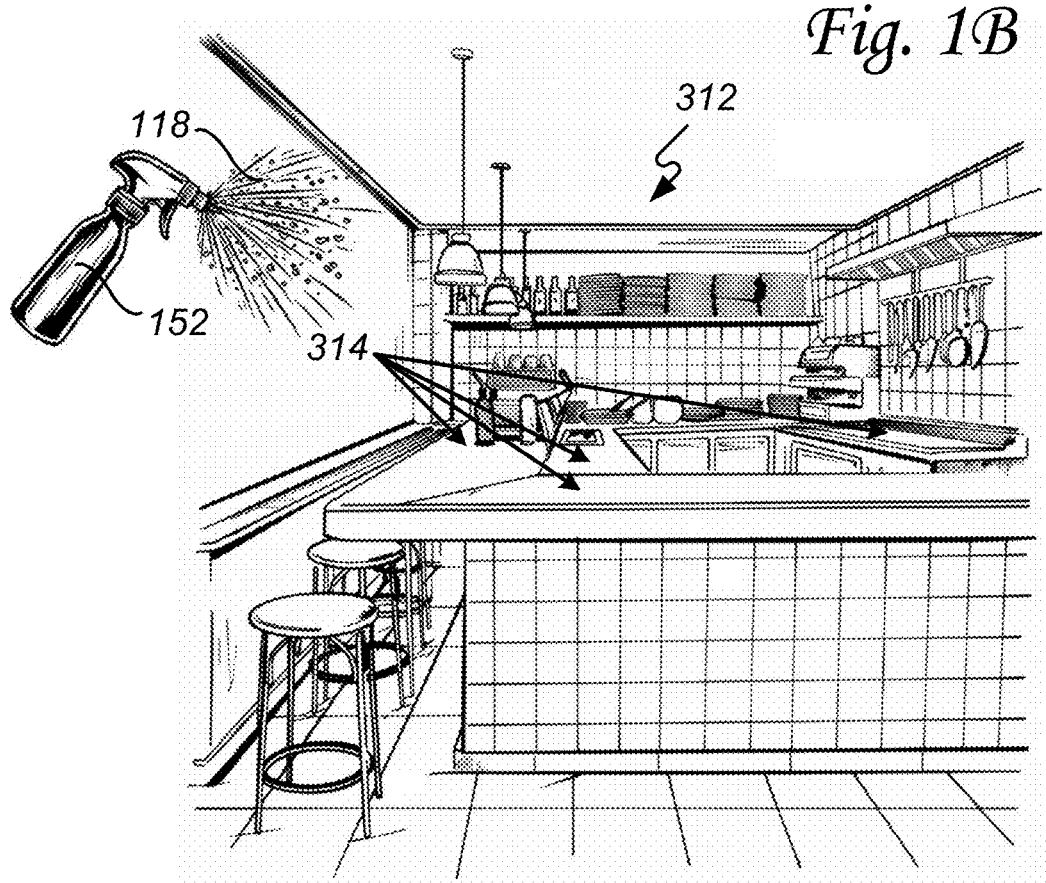
Fig. 1B
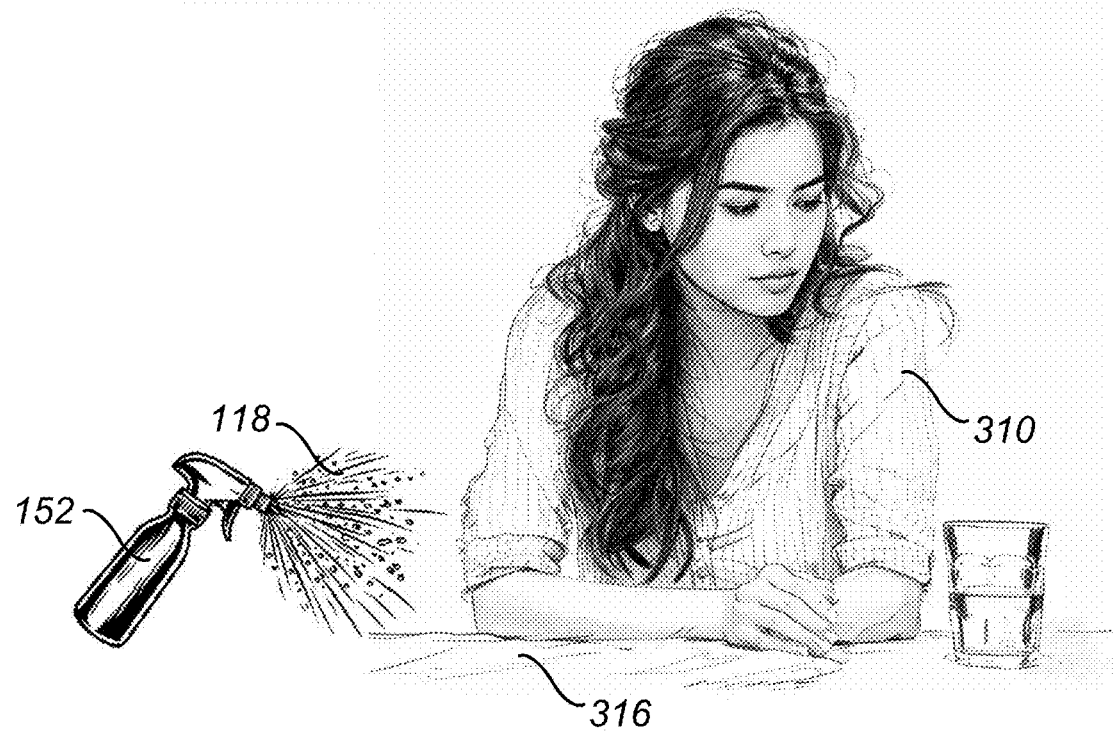

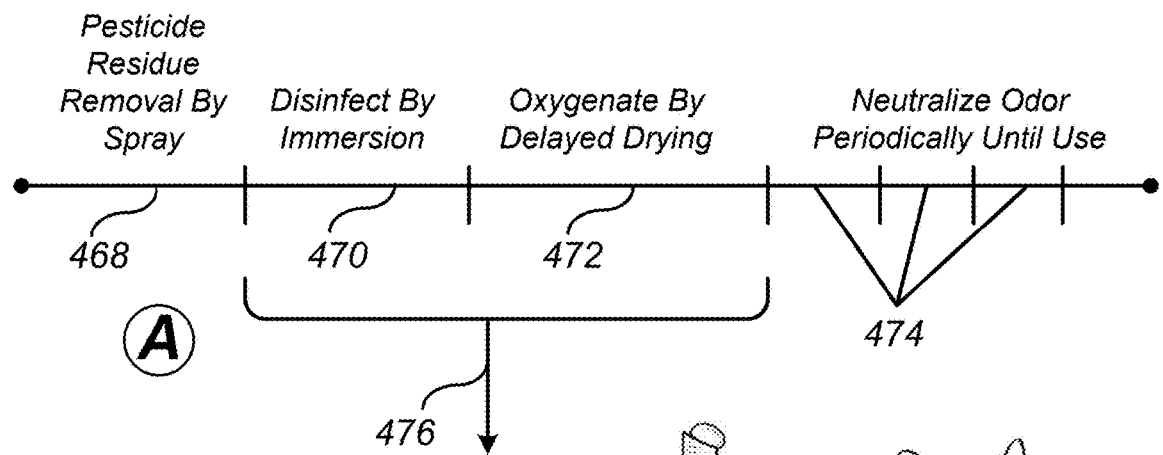
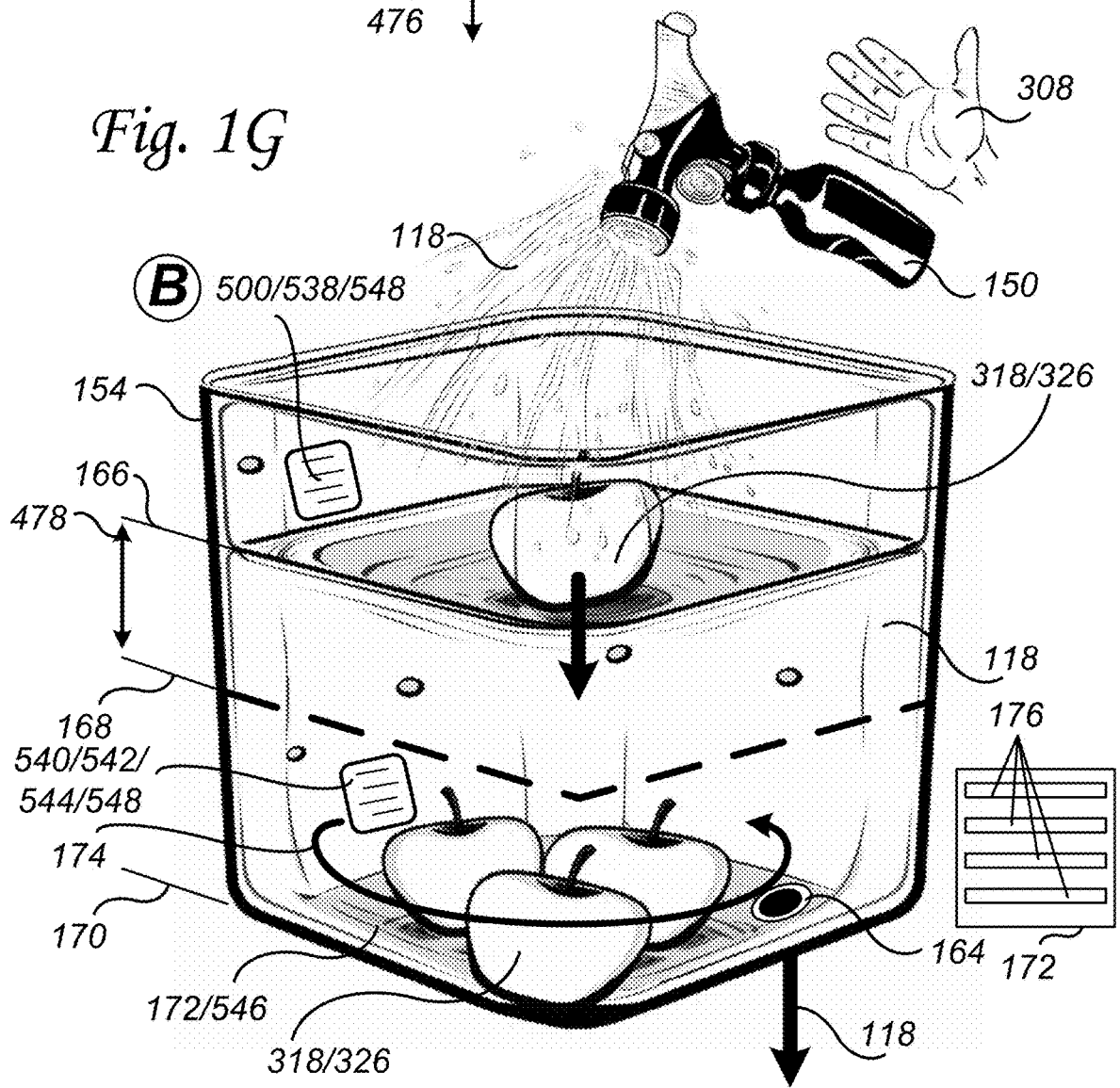
Fig. 1G

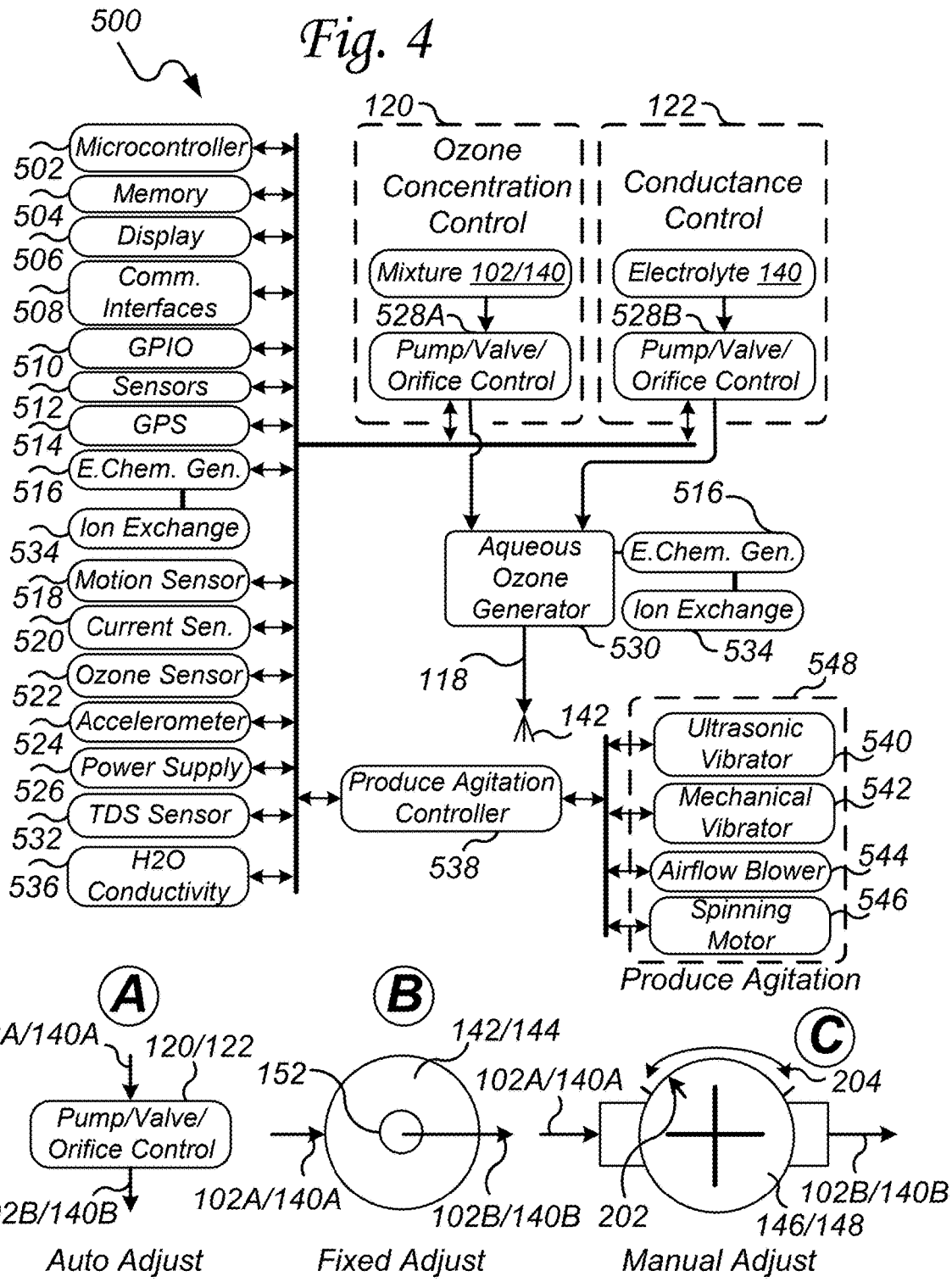

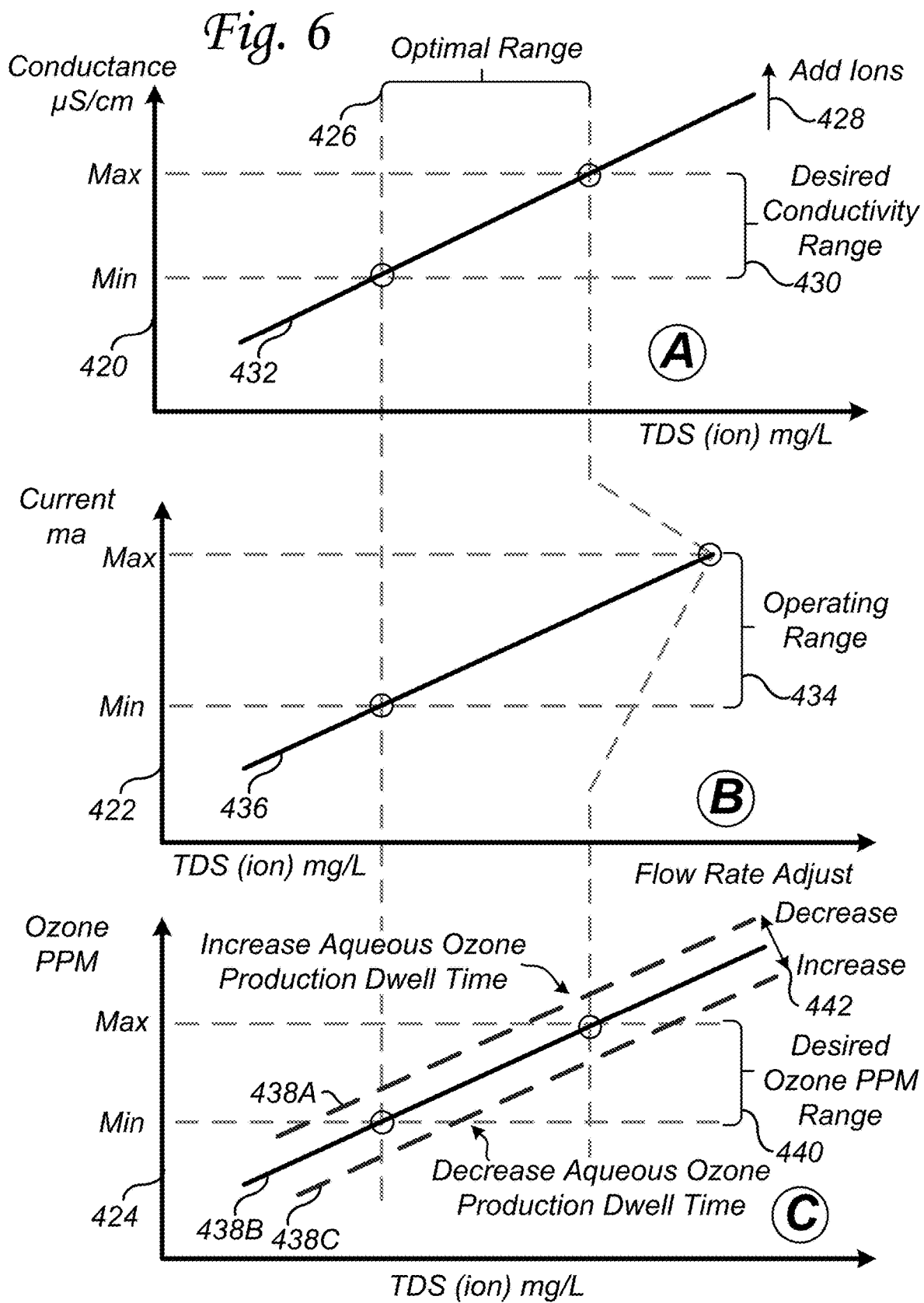

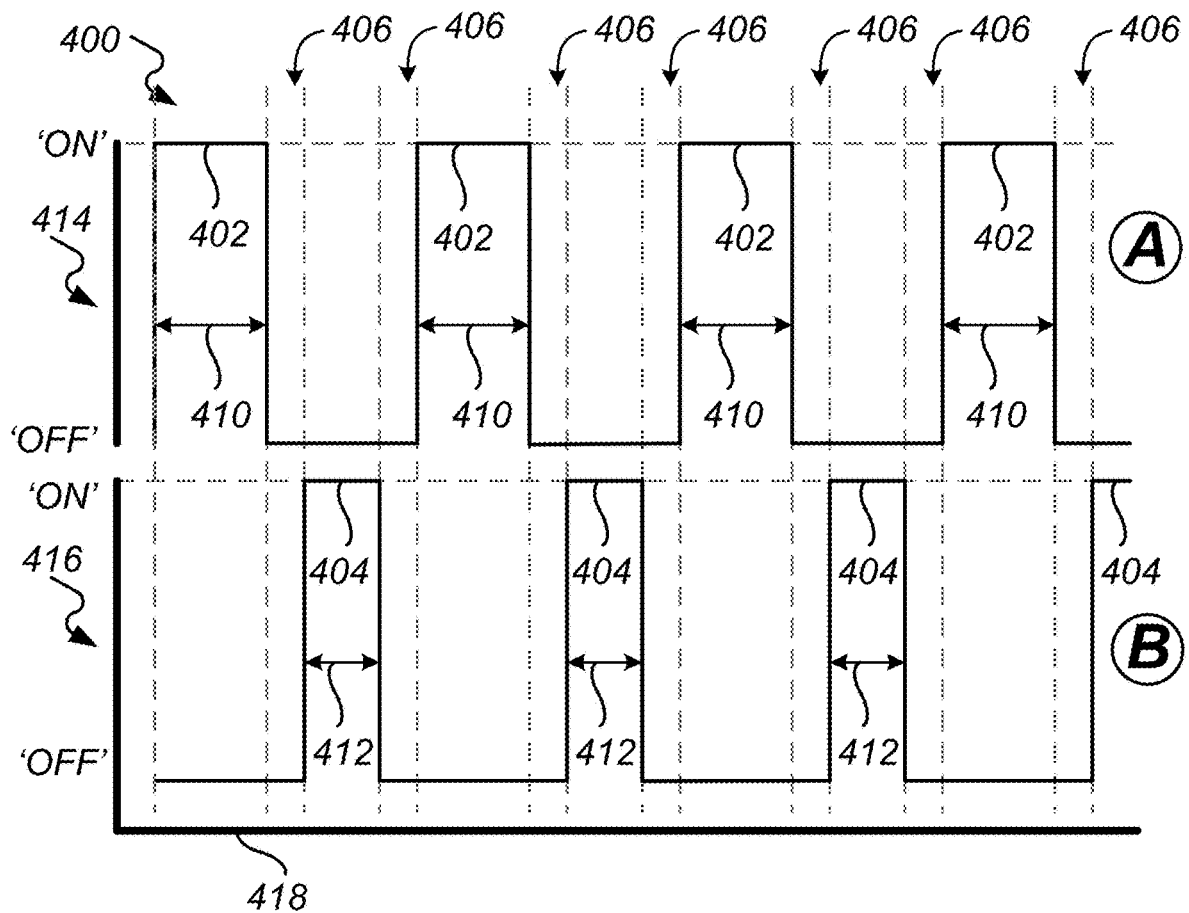
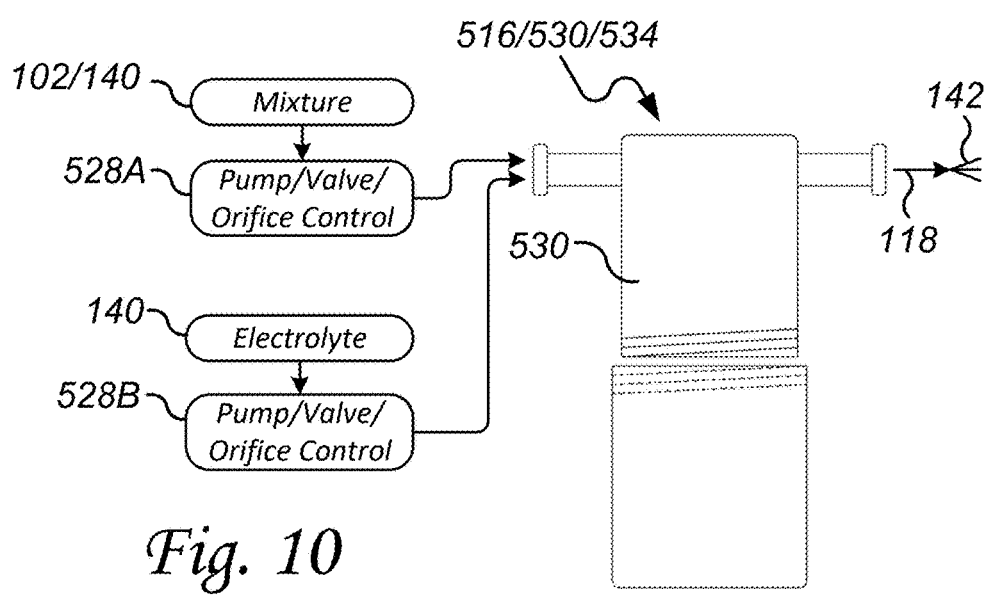
Fig. 10

| Date | Technician | Equipment | Geofenced Area Disinfected | Ozone PPM Test |
|---|---|---|---|---|
| 11/9/23 | Jeff | Unit-01 | Food Prep – 'A' | 2.0 ppm |
| 11/10/23 | Darren | Unit-02 | Dining Hall – 'B' | 2.2 ppm |
| 11/10/23 | Wayne | Unit-01 | Food Prep – 'A' | 2.1 ppm |
| 11/11/23 | Chris | Unit-01 | Kitchen 'C' | 2.5 ppm |
| 11/12/23 | Ivor | Unit-03 | Food Prep 'A' | 2.1 ppm |
| 11/13/23 | Brock | Unit-02 | Dining Hall - 'B' | 0.4 ppm !!! |

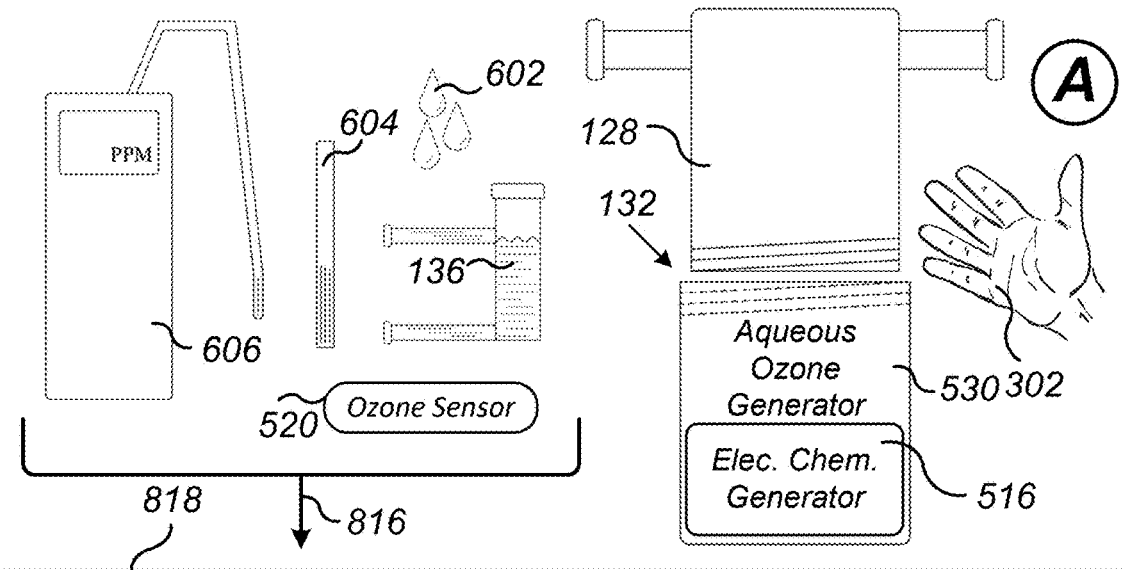
| Date | Technician | Equipment | Ozone PPM Test |
|---|---|---|---|
| 11/3/21 | Jeff | Unit-01 | 3.2 ppm |
| 11/6/21 | Darren | Unit-01 | 3.2 ppm |
| 11/10/21 | Wayne | Unit-01 | 3.1 ppm |
| ... | ... | ... | ... |
| 1/20/23 | Chris | Unit-01 | 2.5 ppm |
| ... | ... | ... | ... |
| 8/2/23 | Ivor | Unit-01 | 2.1 ppm |
| 11/13/23 | Brock | Unit-01 | 1.9 ppm |
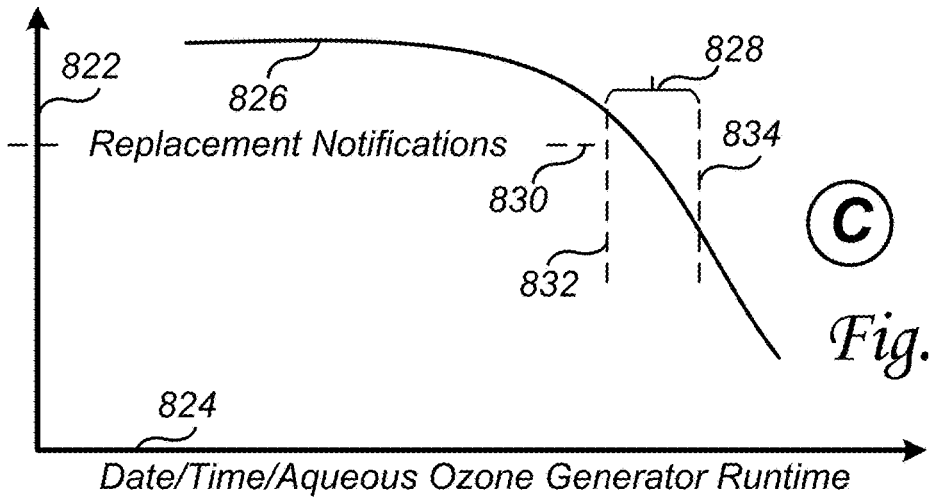
Fig. 15

```
┌─────────────────────────┐          ┌─────────────────────────┐
│ Drying The Fruit Or The │          │ Removing The Fruit Or The│
│ Vegetable By Air Drying,│          │    Vegetable From A      │
│ Salad Spinning, Blotting│          │  Prepackaged Lettuce     │
│ With Paper Towel Or Clean│         │ Packaging, Prior To The  │
│ Kitchen Towel, Commercial│         │ Step Of Removing Pesticide│
│ Salad Dryers, Or Draining│         │        Residues          │
│          Rack           │          └─────────────────────────┘
└─────────────────────────┘                    2110    ↓    2112
         2102        2104                  ┌─────────────────────────┐
┌─────────────────────────┐                │ Returning The Fruit Or The│
│  Spinning The Fruit Or  │                │   Vegetable To The       │
│ Vegetable Dry Prior To The│              │  Prepackaged Produce     │
│ Step Of Returning The Fruit│             │ Packaging For Storage    │
│   Or The Vegetable To The │              │  After The Steps Of      │
│   Prepackaged Produce    │               │ Removing, Disinfecting, And│
│   Packaging For Storage  │               │      Oxygenating         │
└─────────────────────────┘                └─────────────────────────┘
```

Box 2106: The Food Item Is A Sandwich, A Salad, A Hamburger, A Pizza, A Taco, Or A Burrito Box 2108: Removing Pesticide Residues From The Fruit Or The Vegetable By A Rinse With The Ozonated Concentrate Liquid Box 2114: Oxygenating The Plant Tissue By Removing The Fruit Or The Vegetable From The Immersion And Delaying Frying For An Oxygenation Treatment Time Box 2116: Disinfecting A Customer Accessible Countertop Or Table By Misting The Ozonated Concentrate Liquid Onto The Surface Of The Countertop Or The Table And Allowed To Air Dry Absent Agitation Or Removal

*Fig. 28*

IMMERSION CONTAINER FOR TREATING PRODUCE WITH AN OZONATED CONCENTRATE LIQUID

CROSS-REFERENCE TO RELATED APPLICATIONS

This application contains subject matter which is related to the subject matter of the following co-pending applications. The below-listed applications are hereby incorporated herein by reference in its entirety:

This is a U.S. non-provisional application that is a continuation in part of a U.S. non-provisional application Ser. No. 18/628,680, inventor Darren Simmons et al., entitled "FOOD PREPARATION DISINFECTION TREATMENT METHODS", filed Apr. 6, 2024; which is a continuation in part of a U.S. non-provisional application Ser. No. 18/428,523, inventor Darren Simmons et al., entitled "AQUEOUS OZONE DISINFECTION SYSTEM", filed Jan. 31, 2024, now U.S. Pat. No. 12,070,051;

This is a U.S. non-provisional application that is a continuation in part of a U.S. non-provisional application Ser. No. 18/646,394, inventor Darren Simmons et al., entitled "AQUEOUS OZONE FLOOR DISINFECTION SYSTEM", filed Apr. 25, 2024, which is a continuation in part of a U.S. non-provisional application Ser. No. 18/528,162, inventor Darren Simmons et al., entitled "AQUEOUS OZONE FLOOR DISINFECTION SYSTEM", filed Dec. 4, 2023, now U.S. Pat. No. 11,975,118; and a U.S. non-provisional application Ser. No. 18/528,194, inventor Darren Simmons et al., entitled "AQUEOUS OZONE FLOOR DISINFECTION SYSTEM", filed Dec. 4, 2023, now U.S. Pat. No. 12,036,331; and This U.S. non-provisional application is a continuation in part of a U.S. non-provisional application Ser. No. 18/782,055, inventor Darren Simmons et al., entitled "MICROFOAMING AQUEOUS OZONE DISINFECTION", filed Jul. 24, 2024; and U.S. non-provisional application Ser. No. 18/782,058, inventor Darren Simmons et al., entitled "MICROFOAMING AQUEOUS OZONE DISINFECTION", filed Jul. 24, 2024.

TECHNICAL FIELD OF THE INVENTION

The present invention relates to systems and methods for treating produce, and more specifically, to an immersion container configured to disinfect, oxygenate, and dry produce using an ozonated concentrate liquid. The invention involves the generation of the ozonated concentrate liquid through an electrochemical process, controlled immersion and drying processes, and the use of agitation mechanisms to enhance liquid interaction and dislodge contaminants from the produce surface. The invention also relates to controlling ozone concentration levels to ensure effective disinfection and produce treatment, with applications in food safety, produce preservation, and agricultural processing.

BACKGROUND OF THE INVENTION

Before our invention, food washing, in particular fruits and vegetables in restaurants was largely accomplished by merely rinsing in water. This approach while perhaps removing debris leaves largely untouched bacteria and other pathogens on the surface of the food. As such, contaminated food can easily touch other food preparation surfaces spreading pathogens that are ultimately ingested by consumers of the food.

Another shortcoming is that chemicals used on food preparation surfaces can easily be transferred to the food that is prepared on those surfaces and be ingested by consumers who then consume the food.

Another shortcoming is that many restaurants order large quantities of fruits and vegetables to accommodate food and restaurants supply delivery truck schedules. As such, often fruits and vegetables sit in refrigerators and on shelves for extended periods waiting to be used. During this wait time, bacteria and pathogens on the surface of the fruits and vegetables can accelerate the decay and reduce the freshness levels of the food.

The present invention addresses these and other shortcomings by providing aqueous ozone based disinfection treatment methods and other advantages. For these reasons and shortcomings as well as other reasons and shortcomings there is a long-felt need that gives rise to the present invention.

SUMMARY OF THE INVENTION

The shortcomings of the prior art are overcome and additional advantages are provided through the provision of an immersion container for treating produce with an ozonated concentrate liquid. The immersion container is configured to hold produce up to a produce fill line and ozonated concentrate liquid up to an ozonated concentrate liquid fill line, ensuring full immersion of the produce. An adjustable egress port at the base of the immersion container allows the ozonated concentrate liquid to drain at a controlled time rate, corresponding to a disinfection treatment time during which the produce remains immersed. The container further includes a drying platform to support the produce during immersion, oxygenation, and drying processes. One or more produce agitation mechanisms are provided, operationally related to either the drying platform or the container, to enhance liquid interaction during immersion or dislodge residual liquid post-treatment. The ozonated concentrate liquid is generated from water by an electrochemical generator.

In another aspect, the shortcomings of the prior art are overcome and additional advantages are provided through the provision of a method for using the immersion container. The method involves placing produce inside the container, filling the container with an ozonated concentrate liquid generated via an electrochemical process, and maintaining the immersion for a disinfection treatment time. After this, the ozonated concentrate liquid is drained at a controlled time rate, and the produce rests in a wetted state on the drying platform during a delay drying period for oxygenation. Produce agitation mechanisms are then employed to enhance liquid interaction during immersion or dislodge any remaining liquid at the end of the drying period.

Additionally, the shortcomings of the prior art are overcome and advantages are provided through the provision of an immersion container that incorporates an aqueous ozone generator. The generator receives water and generates ozonated concentrate liquid for produce treatment. The system includes one or more produce agitation mechanisms to enhance liquid interaction during immersion or dislodge liquid post-treatment, and the adjustable egress port controls the liquid drainage rate. The system may also include a produce treatment controller to automatically adjust the operation of the flow regulator, egress port, and agitation mechanisms based on the type of produce and stage of the treatment process.

In yet another aspect, the invention provides a system for treating produce with an ozonated concentrate liquid, wherein the system incorporates an aqueous ozone generator and a flow regulator. The regulator controls the flow of ozonated concentrate liquid into the immersion container, ensuring that the ozone concentration level is maintained within a desired range. The system further includes an adjustable egress port and produce agitation mechanisms to ensure proper disinfection, drying, and oxygenation of the produce.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1A illustrates one example of a post-harvest produce treatment table and a food preparation disinfection treatment table;

FIG. 1B illustrates one example of a restaurant environment comprising food preparation surfaces;

FIGS. 1G-1H illustrates examples of disinfection by immersion and oxygenation by delayed drying;

FIG. 4 illustrates one example of a control system for an aqueous ozone disinfection system;

FIG. 5 illustrates examples of electrochemical medium catalyst governors and flow governors;

FIG. 6 illustrates one example of the relationship between water conductance, electrical current, and ozone concentration of the concentrated ozone liquid;

FIG. 10 illustrates one example of mixing pulse sequence by way of transitioning between pump/valve activation pulses;

FIG. 15 illustrates one example of monitoring ozone concentration test results;

FIGS. 25-28 illustrate exemplary embodiments that can be interchangeably used with the methods of the present invention.

Figure 1C:
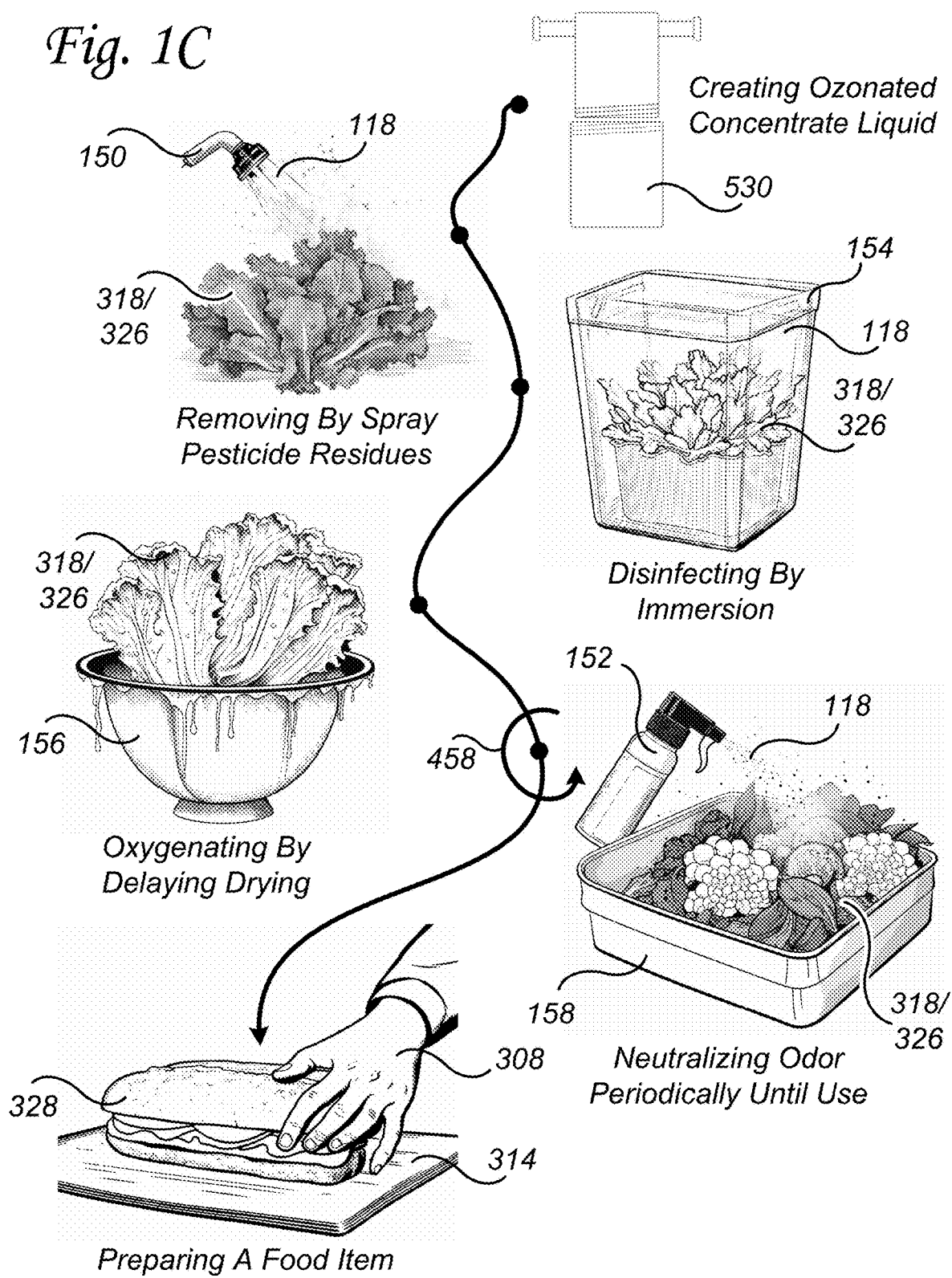
FIGS. 1C-1E illustrate examples of post-harvest produce which includes lettuce treatment methods.

The detailed description explains the preferred embodiments of the invention, together with advantages and features, by way of example with reference to the drawings.

DETAILED DESCRIPTION OF THE INVENTION

Turning now to the drawings in greater detail, it will be seen that in FIG. 1A, there is illustrated one example of a post-harvest produce treatment table 450 and a food preparation disinfection treatment table 454.

In an exemplary embodiment and with reference to the post-harvest produce treatment table 450, reference 'A', fruits and vegetables 318 including lettuce can generally be referred to as produce 318 and can be treated with several different steps that use aqueous ozone to disinfect and extend the vitality of the produce 318. For disclosure purposes, the term "produce" or "produce 318" can generally be items found or grown on a farm which includes fruits and vegetables including lettuce and some animal products.

An advantage, in the present invention, is that with respect to lettuce, as one example, such post-harvest produce treatment 450 can increase the volume of lettuce primarily in the step of oxygenation thus requiring less lettuce in the food product 318. This can lower the daily need amount as well as reduce the cost of producing food item 328 for restaurant 312. Customer 310 also benefits as the right-sized amount of lettuce makes the final food product 318 appear and taste better versus overfilling with limp worn-out lettuce.

In an exemplary embodiment, in operation, in a series of post-harvest produce treatment steps 452, produce 318 is first sprayed with the ozonated concentrate liquid 118 to remove pesticide residues from the surface of the produce 318. The aqueous ozonated liquid 118 generated from the aqueous ozone generator 520 is particularly well suited to break down the pesticide compounds removing the residues as well as other contaminates from the surface of the produce 318. Such ozonated concentrate liquid 118 spray can be administered by way of a spray nozzle 150 and such a pesticide residue removal treatment time 468 can be preferable in the range of several seconds, or other suitable time range, with the runoff of the ozonated concentrate liquid 118 preferably being allowed to drain away from the produce 318 without reuse.

In a second step, the produce 318 can be disinfected by being immersed in ozonated concentrate liquid 118. In this regard, the produce 318 can be placed in an immersion container 154, and the immersion container 154 filled with the ozonated concentrate liquid 118 or by other methods. At least FIG. 1G better illustrates one example of an immersion tank 154. Such immersion better ensures that the disinfection occurs on all parts of the produce 318. In operation, the produce 318 can be immersed in the ozonated concentrate liquid 118 for a disinfection treatment time 470 in the range of less than one minute, or for other suitable duration.

In a third step, the produce 318 can be oxygenated allowing the additional oxygen molecules in the aqueous ozone ($O_3$) to permeate the produce 318 plant tissue 326 revitalizing the cellular structure of the plant tissue 326 for an oxygenation treatment time 472 before drying the produce 318. In this regard, aqueous ozone is a rich source of oxygen. In operation, when ozonated water is applied to produce 318 including lettuce, the mechanism of action of the aqueous ozone introduces additional oxygen into the plant tissues 326. This can enhance the metabolic processes within the produce cells, revitalizing the leaves and promoting overall freshness. To accomplish this, the ozonated concentrate liquid 118 can be drained away from the produce 318, and drying of the produce 318 delayed for oxygenation treatment time 472, allowing the ozonated concentrate liquid 118 to remain on the produce oxygenating the plant tissue 326 for greater than one minute, or other suitable time.

In an exemplary embodiment, such drying of the lettuce can be by blotting with a towel 320, forced air flow 322, air-drying, spinning the produce 318 in a device to use centripetal force to remove excess water, or by other suitable methods as may be required and or desired in a particular embodiment.

In a fourth step, plant tissue 326 odor from decay and other sources can be neutralized by misting the ozonated concentrate liquid onto the plant tissue onto the produce 318 at a periodic mist interval 474 in the range of hourly to daily, or other suitable time, and at each interval for a mist duration treatment time to better ensure produce 318 complete coverage and seeping of the ozonated concentrate liquid into produce 318 crevasses. The mist duration treatment time can be in the range of seconds to less than one minute or other suitable time. The neutralization step is typically repeated at the periodic mist interval 474 until the produce is used in the preparation of a food item 328.

In an exemplary embodiment, a spray bottle 152, or other suitable misting device can be used to mist ozonated concentrate liquid 118 as required and/or desired in a particular embodiment.

In a plurality of exemplary embodiment, the post-harvest produce treatment can be used steps 452 can be organized and the treatment durations adjusted based, in part, on the types and kind of produce 318, how long produce is left in trays 158, the setup of the restaurant food preparation area and processes, the types of food items 328 being prepared, and other considerations.

In an exemplary embodiment and with reference to the food preparation disinfection treatment table 454, FIG. 1A reference 'B', fruits and vegetables 318 including lettuce generally referred to as produce 318 can be treated with several different steps that use aqueous ozone to disinfect and extend the vitality of the produce 318. Additionally, steps can be taken to disinfect restaurant 312, food preparation surfaces 314 so that contamination and pathogens aren't transferred from food preparation surface 214 to food item 328 and by way of the food preparation surfaces 314 from one food item 328 to another food item 328 prepared on the same food preparation surface 314.

In an exemplary embodiment, in operation, in a series of food preparation disinfection treatment steps 456, the initial step can be to disinfect the produce 318 by immersion in ozonated concentrate liquid 118. In this regard, the produce 318 can be placed in an immersion container 154, and the immersion container 154 filled with the ozonated concentrate liquid 118 or by other methods. At least FIG. 1G better illustrates one example of an immersion tank 154. Such immersion better ensures that the disinfection occurs on all parts of the produce 318. In operation, the produce 318 can be immersed in the ozonated concentrate liquid 118 for a disinfection treatment time 470 in the range of less than one minute, or for other suitable duration.

In the second step, the food preparation surfaces 314 in restaurant 312 can be disinfected by misting the ozonated concentrate liquid onto the plant tissue on the surfaces 314. In operation, preferably the misted food preparation surfaces 314 are left for surface a disinfection treatment time to air dry for a disinfection treatment time allowing maximum time for the aqueous ozone to disinfect and inactivate pathogens. If wiping of the food preparation surface is required or desired doing so after the food preparation surface is misted and waiting a disinfection treatment time of greater than 30 seconds is preferred. In other embodiments, other suitable surface disinfection treatment times can be implemented as may be required and/or desired.

In an exemplary embodiment, a spray bottle 152, or other suitable misting device can be used to mist ozonated concentrate liquid 118 as required and/or desired in a particular embodiment.

In a third step, plant tissue 326 odor from decay and other sources can be neutralized by misting the ozonated concentrate liquid onto the plant tissue onto the produce 318 at a periodic mist interval 474 in the range of hourly to daily, or other suitable time, and at each interval for a mist duration treatment time to better ensure produce 318 complete coverage and seeping of the ozonated concentrate liquid into produce 318 crevasses. The mist duration treatment time can be in the range of seconds or other suitable time. The neutralization step is typically repeated at the periodic mist interval until the produce is used in the preparation of a food item 328.

Additionally, can be oxygenated allowing the additional oxygen molecules in the aqueous ozone to permeate the produce 318 plant tissue 326 revitalizing the cellular structure of the plant tissue 326. In this regard, aqueous ozone is a rich source of oxygen. In operation, when ozonated water is applied to produce 318 including lettuce, the mechanism of action of the aqueous ozone introduces additional oxygen into the plant tissues 326. This can enhance the metabolic processes within the produce cells, revitalizing the leaves and promoting overall freshness. To accomplish this, the ozonated concentrate liquid 118 from the neutralizing odor mist can be left on the surface of the produce 318, oxygenating the plant tissue 326 while the produce air dries.

In the fourth step, a food item 328 can be prepared on the food surface 314 that comprises the produce 318.

In a plurality of exemplary embodiments, the food preparation disinfection treatment steps 456 can be organized and the treatment durations of each step adjusted based, in part, on the types and kind of produce 318, how long produce is left in trays 158, the setup of the restaurant food preparation area and processes, the types and/or kinds of food preparation surface 314, the types of food items 328 being prepared, and other considerations.

For disclosure purposes, food preparation surfaces 314 can include tables, countertops, cooking equipment, food slicers, toasters, and other types or kinds of surfaces and equipment, as may be required and/or desired in a particular embodiment.

Referring to FIG. 1B, there is illustrated one example of a restaurant 312 environment comprising a plurality of food preparation surfaces 314. In an exemplary embodiment, customers 310 can be seated at tabled or countertops 316. For disclosure purposes tables or countertops can also be referred to as food preparation surfaces as customers 310 routines eat their food items 328 aided to hold, sort, or organize their food in other ways by on the tables or countertops 316. Additionally, spray bottle 152, or other suitable misting devices can be used to mist ozonated concentrate liquid 118 on the food preparation surfaces 314 including the countertops or tables 316 as required and/or desired in a particular embodiment.

Figure 17:
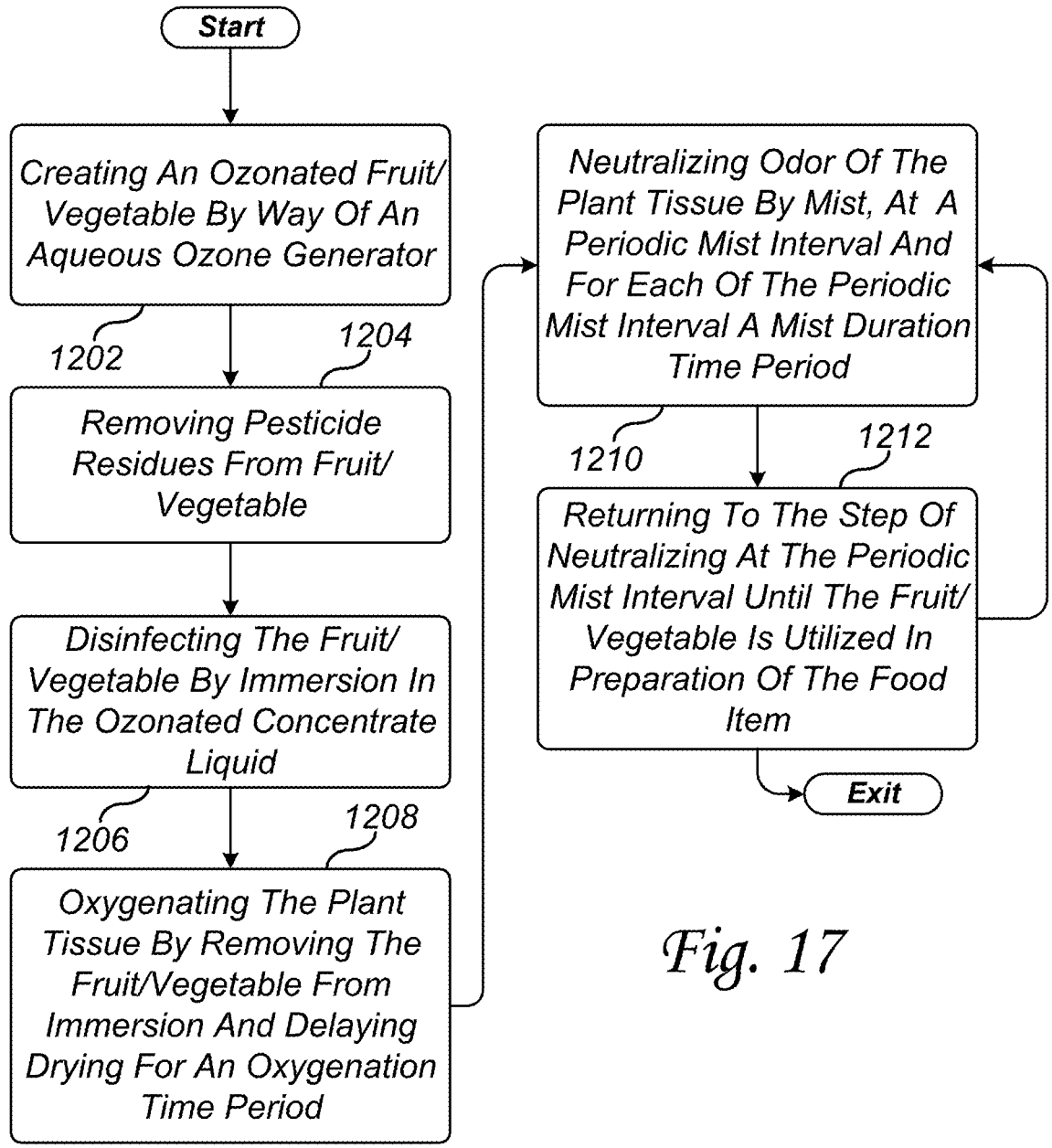
FIGS. 17-20 illustrate examples of a post-harvest lettuce treatment method.

Referring to FIGS. 1C and 17, there is illustrated one example of a post-harvest produce 318 which includes the lettuce treatment method. In an exemplary embodiment, a post-harvest produce 318 which includes the lettuce treatment method utilizes aqueous ozone to disinfect, extend vitality, and reduce the amount of produce 318 needed including lettuce during the preparation of a food item 328. The post-harvest lettuce treatment method begins in step 1202 by creating an ozonated concentrate liquid 118 by way of an aqueous ozone generator 530. The aqueous ozone generator 530 receives a water source 102 and generates from the water source 102 the ozonated concentrate liquid 118. The method then moves to step 1204.

The method continues in step 1204 by removing pesticide residues from one or more produce 318 which includes lettuce by a rinse with the ozonated concentrate liquid 118 for a pesticide residue removal treatment time 468, the ozonated concentrate liquid 118 used in the rinse can be discarded or otherwise not resued in the treatment process. The method then moves to step 1206.

The method continues in step 1206 by disinfecting produce 318 which includes lettuce by immersion in the ozonated concentrate liquid 118 for a disinfection treatment time 470. The produce 318 including the lettuce comprises a plant tissue 326. The method then moves to step 1208.

The method in step 1208 continues by oxygenating the plant tissue 326 by removing the produce 318 which includes lettuce from the immersion and delaying drying for an oxygenation treatment time 472, enhancing metabolic processes of the plant tissue 326, and increasing the size of the cells of the plant tissue 326 and correspondingly the lettuce which reduces the amount of the lettuce needed in preparation of the food item 328.

An advantage, in the present invention, is how the step of oxygenating the produce 318 which includes the lettuce revitalizes the plant tissue 326 including increasing the size of the cells of the plant tissue 326 thus requiring less lettuce (because the lettuce leaves are bigger) in the prepared food item which comprises the lettuce 318. In this regard, the lettuce 318 plant tissue 326 cell size increase when wetted with aqueous ozone and delayed drying can be attributed to several factors including:

Cell turgor pressure: When plant cells absorb water, they become turgid due to the increased pressure within the cell known as turgor pressure. This pressure helps maintain the structural integrity of the cell and contributes to cell enlargement;

Cell wall expansion: Aqueous ozone breaks down certain compounds in the cell wall, such as lignin and hemicellulose. This breakdown can make the cell wall more flexible, allowing it to expand more easily when water is taken up by the cell;

Increased water uptake: Ozone enhances water uptake by plant cells. As water is absorbed, the cells expand in size. The presence of ozone facilitates the movement of water into the cells through various mechanisms, such as modifying cell membrane permeability;

Stimulation of metabolic processes: Aqueous ozone also stimulates various metabolic processes within the plant cells. This leads to increased cellular activity, including the uptake of water and nutrients, contributing to cell enlargement;

Cell elongation and growth: Water uptake is crucial for cell elongation, which is a key process in plant growth. The elongation of cells contributes to the overall growth of plant tissues, and the presence of ozone influences the factors that regulate cell elongation; and Other beneficial factors and specific effects of aqueous ozone on plant cells can vary depending on concentration, exposure time, and other environmental factors. The method then moves to step 1210.

The method continues in step 1210 by neutralizing the odor of the plant tissue 326 by misting the ozonated concentrate liquid onto the plant tissue, at a periodic mist interval 474, and for each of the periodic mist intervals 474, a mist duration treatment time. The method then moves to step 1212.

The method continues in step 1212 by returning 458 to step 1210 of neutralizing at the periodic mist interval 474 until the produce 318 which includes lettuce is utilized in the preparation of the food item 328.

Figure 1D:
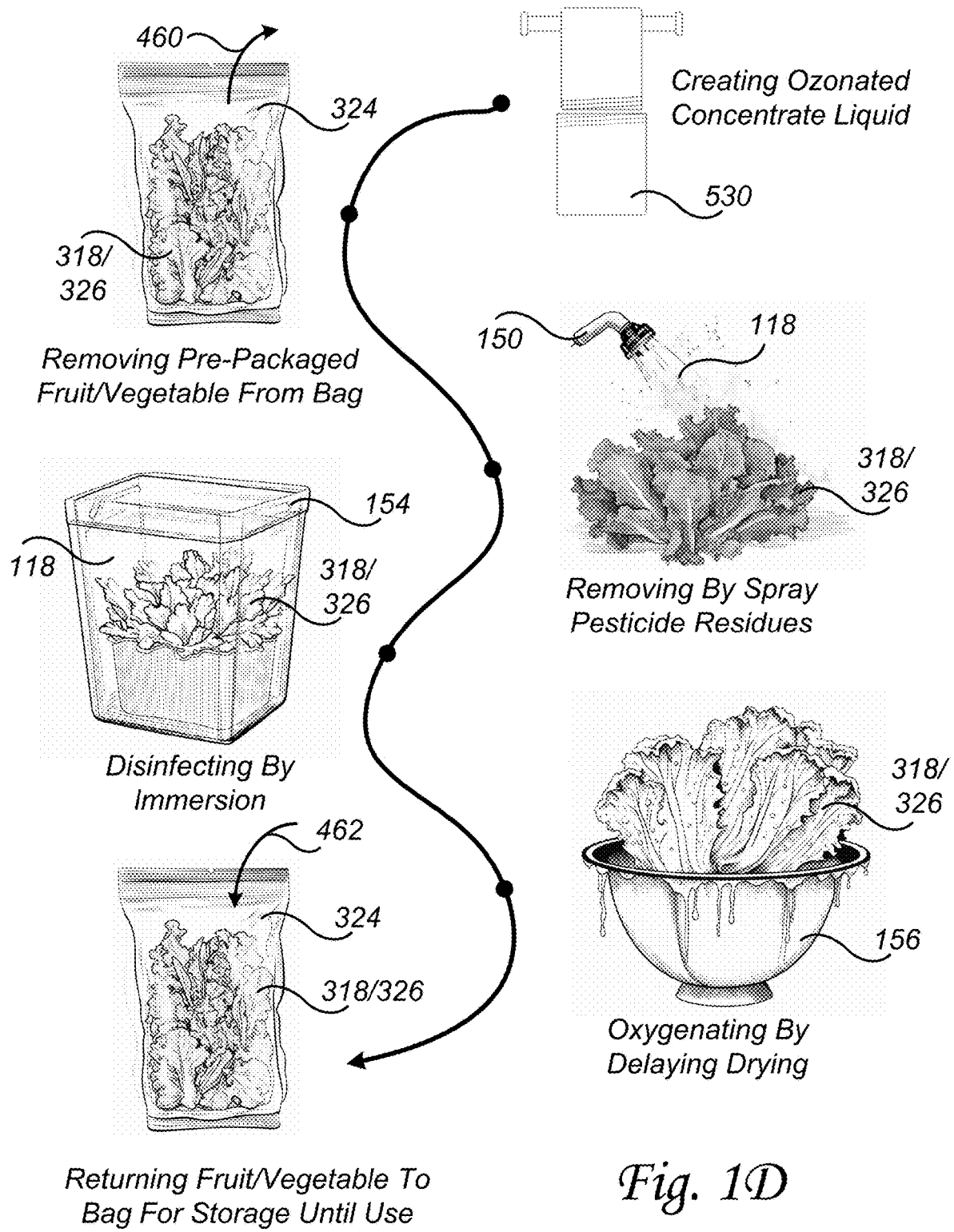
Figure 18:
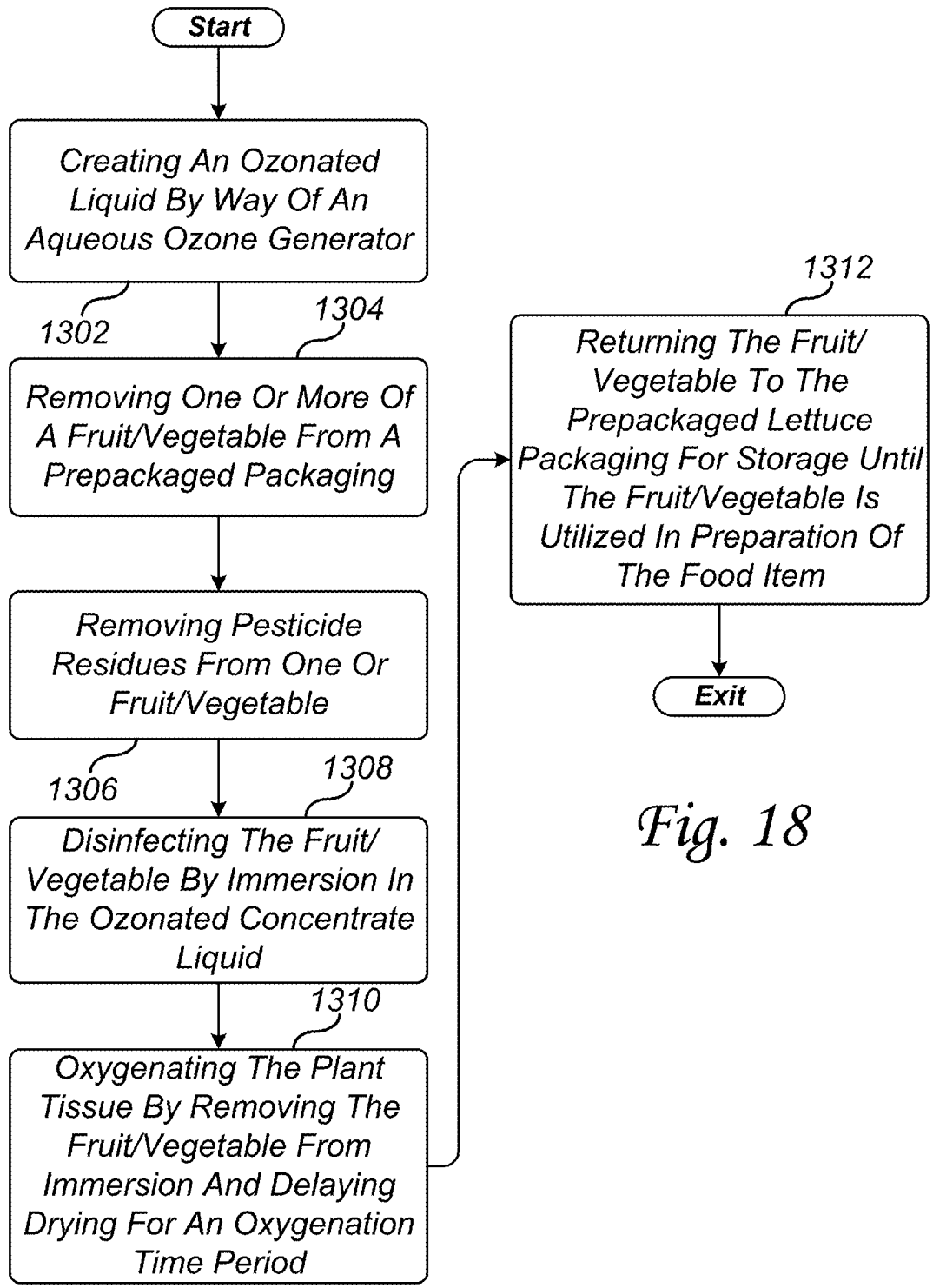

Referring to FIGS. 1D and 18, there is illustrated one example of a post-harvest produce 318 which includes the lettuce treatment method. In an exemplary embodiment, a post-harvest lettuce 318 treatment method uses aqueous ozone to disinfect, extend vitality, and reduce the amount of lettuce 318 needed during the preparation of a food item 326. The post-harvest lettuce treatment method begins in step 1302 by creating an ozonated concentrate liquid 118 by way of an aqueous ozone generator 530. The aqueous ozone generator 530 receives a water source 102 and generates from the water source 102 the ozonated concentrate liquid 118. The method then moves to step 1304.

The method continues in step 1304 by removing 460 one or more lettuce 318 from a prepackaged lettuce packaging 324. The method then moves to step 1306.

The method continues in step 1306 by removing pesticide residues from the lettuce 318 by a rinse with the ozonated concentrate liquid 118 for a pesticide residue removal treatment time 468. The method then moves to step 1308.

The method continues in step 1308 by disinfecting the lettuce 318 by immersion in the ozonated concentrate liquid 118 for a disinfection treatment time 470. The lettuce comprises a plant tissue 326. The method then moves to step 1310.

The method continues in step 1310 by oxygenating the plant tissue 326 by removing the lettuce 318 from the immersion and delaying drying for an oxygenation treatment time 472, enhancing the metabolic processes of the plant tissue and increasing the size of the cells of the plant tissue 326 which reduces the amount of the lettuce needed in the preparation of the food item 328. The method then moves to step 1312.

The method continues in step 1312 by returning 462 the lettuce 318 to the prepackaged lettuce packaging 324 for storage until the lettuce 318 is utilized in the preparation of food item 328. The method is then exited.

Figure 1E:
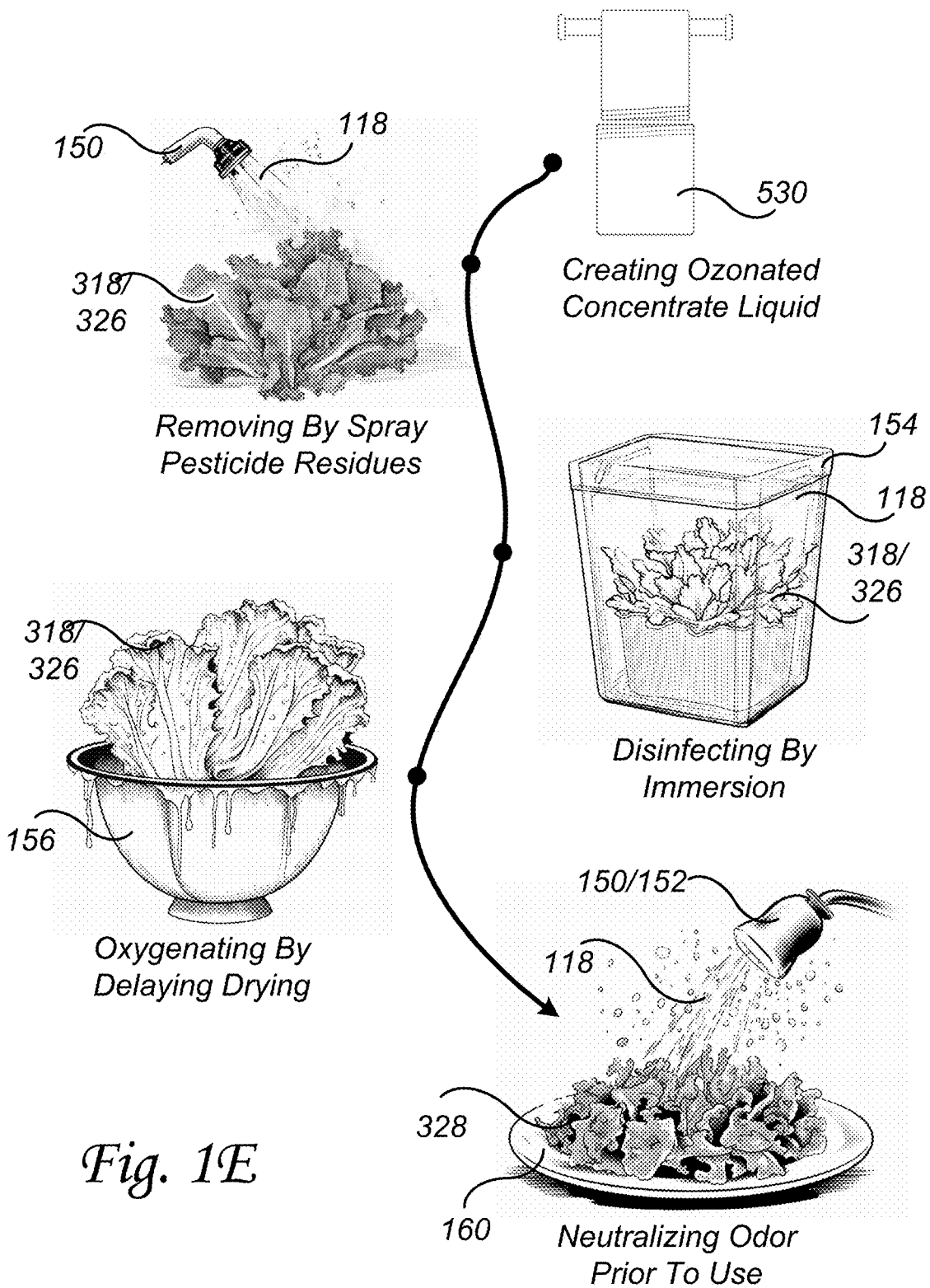
Figure 19:
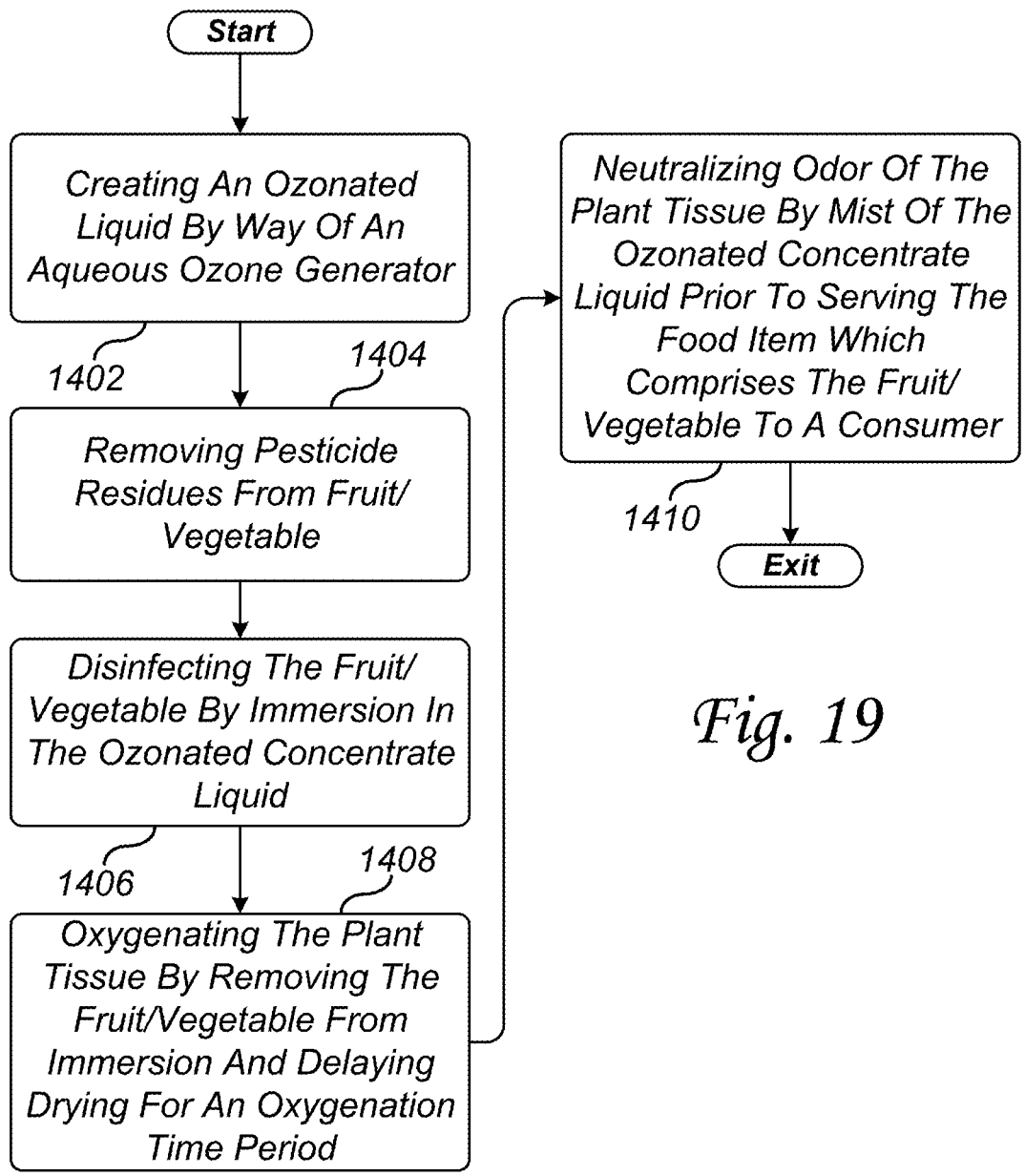

Referring to FIGS. 1E and 19, there is illustrated one example of a post-harvest produce 318 which includes the lettuce treatment method. In an exemplary embodiment, a post-harvest lettuce 318 treatment method uses aqueous ozone to disinfect, extend vitality, and reduce the amount of lettuce 318 needed during the preparation of a food item 326. The post-harvest lettuce treatment method begins in step 1402 by creating an ozonated concentrate liquid 118 by way of an aqueous ozone generator 530. The aqueous ozone generator 530 receives a water source 102 and generates from the water source 102 the ozonated concentrate liquid 118. The method then moves to step 1404.

The method continues in step 1404 by removing pesticide residues from one or more lettuce 318 by a rinse with the ozonated concentrate liquid 118, for a pesticide residue removal treatment time 468. The method then moves to step 1406.

The method continues in step 1406 by disinfecting the lettuce 318 by immersion in the ozonated concentrate liquid 118 for a disinfection treatment time 470. The lettuce 318 comprises a plant tissue 326. The method then moves to step 1408.

The method continues in step 1408 by oxygenating the plant tissue 326 by removing the lettuce 318 from the immersion and delaying drying for an oxygenation treatment time 472, enhancing metabolic processes of the plant tissue 326 and increasing the size of the cells of the plant tissue 326 which reduces the amount of the lettuce 318 needed in the preparation of the food item 328. The method then moves to step 1410.

The method continues in step 1410 by neutralizing the odor of the plant tissue 326 by misting the ozonated concentrate liquid onto the plant tissue prior to serving the food item 328 which comprises the lettuce 318 to a consumer 310.

Figure 1F:
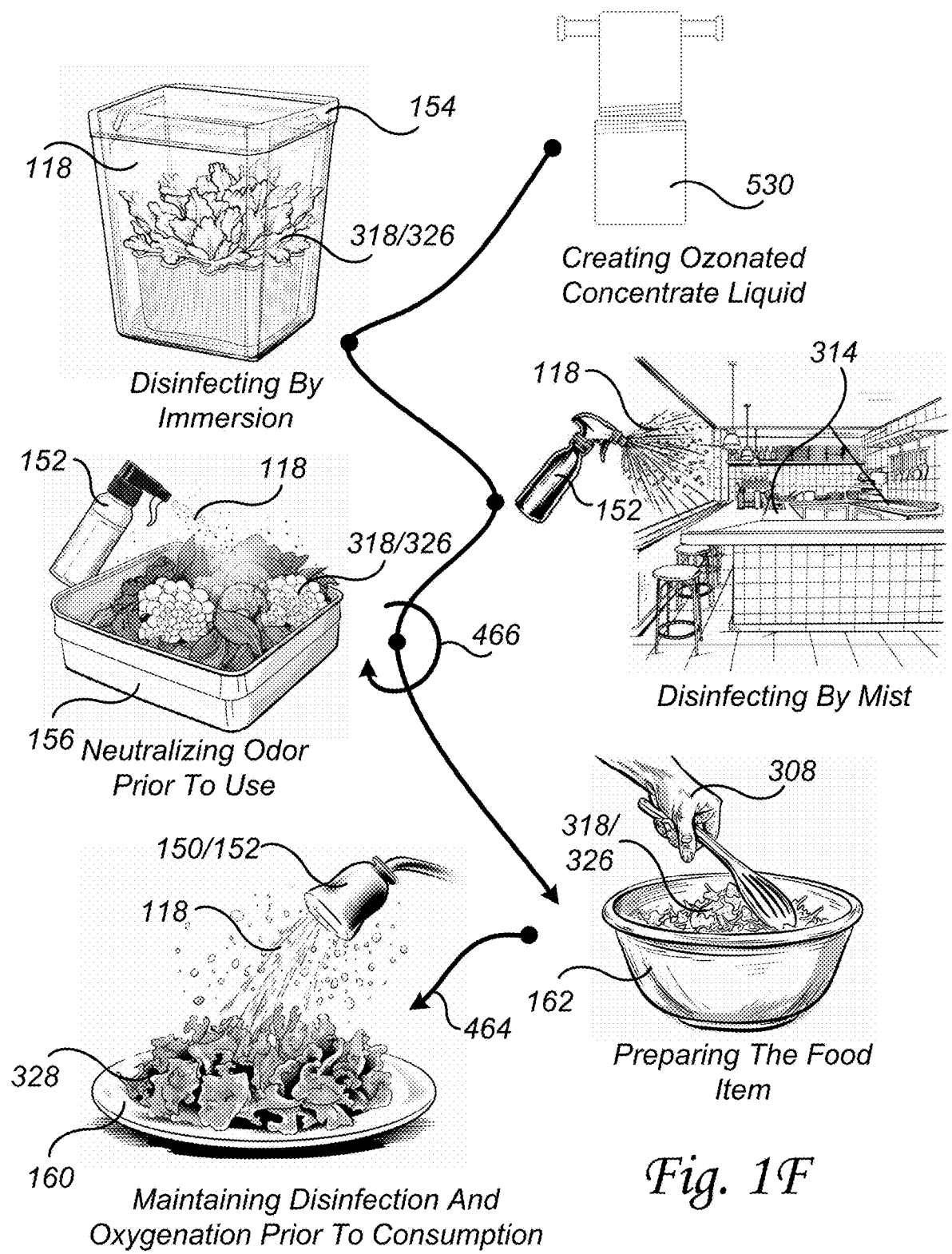
FIG. 1F illustrates one example of a food preparation disinfection treatment method.
Figure 1H:
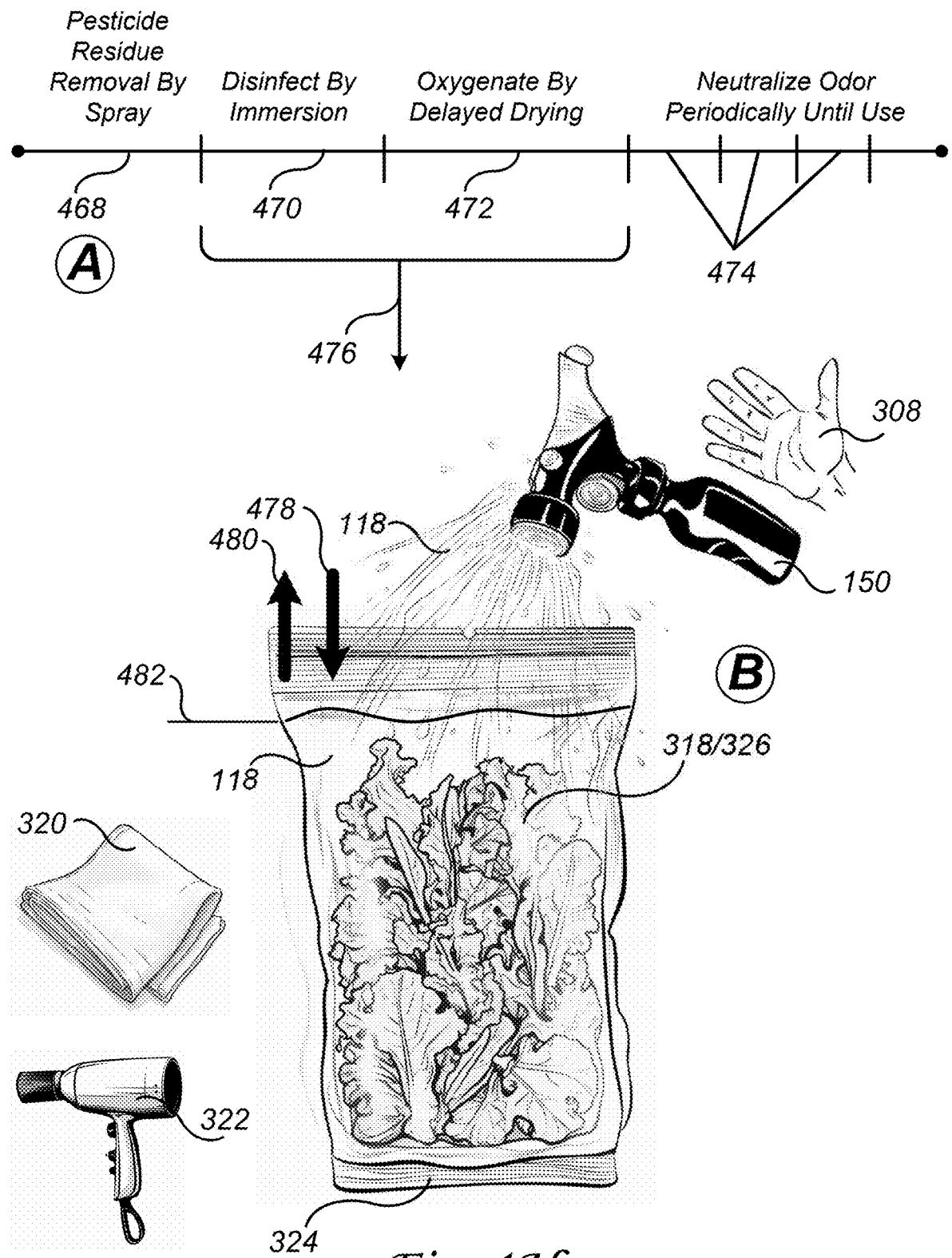
Figure 20:
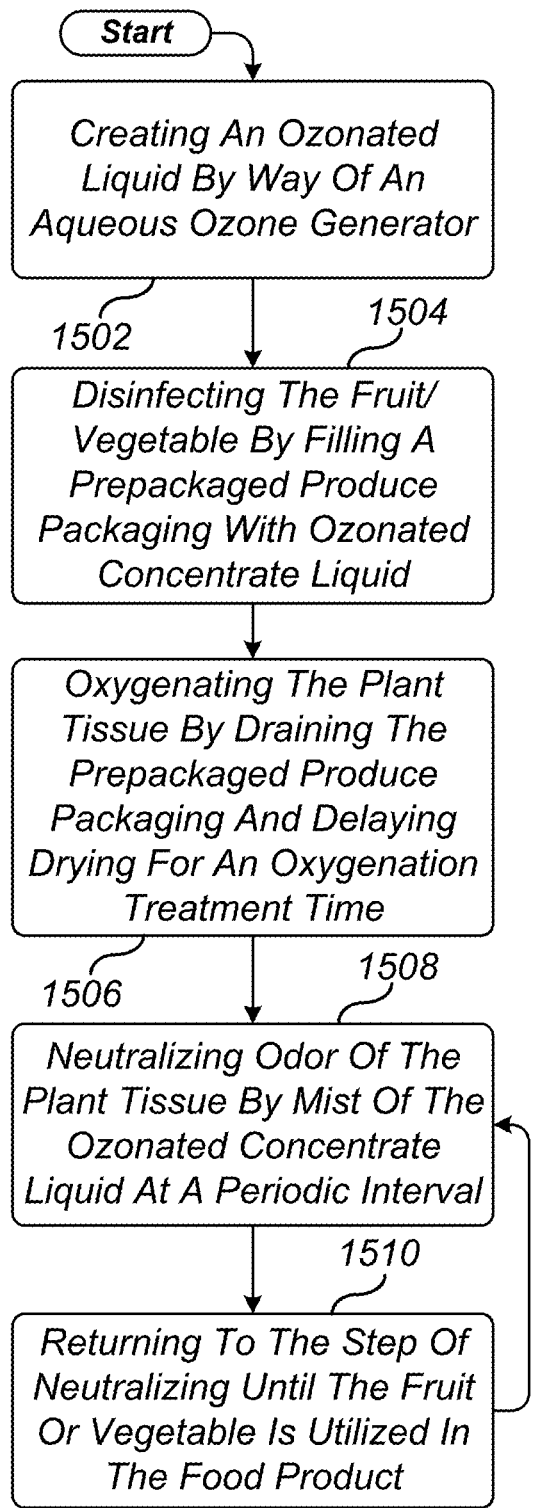

Referring to FIGS. 1H, and 20, there is illustrated one example of a post-harvest produce 318 which includes the lettuce treatment method. In an exemplary embodiment, a post-harvest lettuce 318 treatment method uses aqueous ozone to disinfect, extend vitality, and reduce the amount of lettuce 318 needed during the preparation of a food item 326. The post-harvest lettuce treatment method begins in step 1502 by creating an ozonated concentrate liquid 118 by way of an aqueous ozone generator 530. The aqueous ozone generator 530 receives a water source 102 and generates from the water source 102 the ozonated concentrate liquid 118. The method then moves to step 1504.

The method continues in step 1504 by disinfecting one or more lettuce 318 by filling 478 a prepackaged produce packaging 324, which comprises the lettuce, with the ozonated concentrate liquid 118, immersing (to fill line 482) the lettuce 318 in the ozonated concentrate liquid 118 for a disinfection treatment time 470. Each of the lettuce 318 comprises a plant tissue 326. The method then moves to step 1506.

The method continues in step 1506 by oxygenating the plant tissue 326 by draining 480 the prepackaged produce packaging and delaying before drying the lettuce 318 for an oxygenation treatment time 472, enhancing the metabolic processes of the plant tissue 326.

In an exemplary embodiment, such drying of the lettuce can be by blotting with a towel 320, forced air flow 322, air-drying, spinning the produce 318 in a device to use centripetal force to remove excess water, or by other suitable methods as may be required and or desired in a particular embodiment. The method then moves to step 1508.

The method continues in step 1508 by neutralizing the odor of the plant tissue 326 by misting the ozonated concentrate liquid 118 onto the plant tissue 326, at periodic mist intervals 474 and for each of the periodic mist intervals 472, a mist duration treatment time. The method then moves to step 1510.

The method continues in step 1510 by returning to step 1508 of neutralizing at the periodic mist interval 474 until lettuce 318 is utilized in the preparation of food item 328. The method is the exited.

Figure 21:
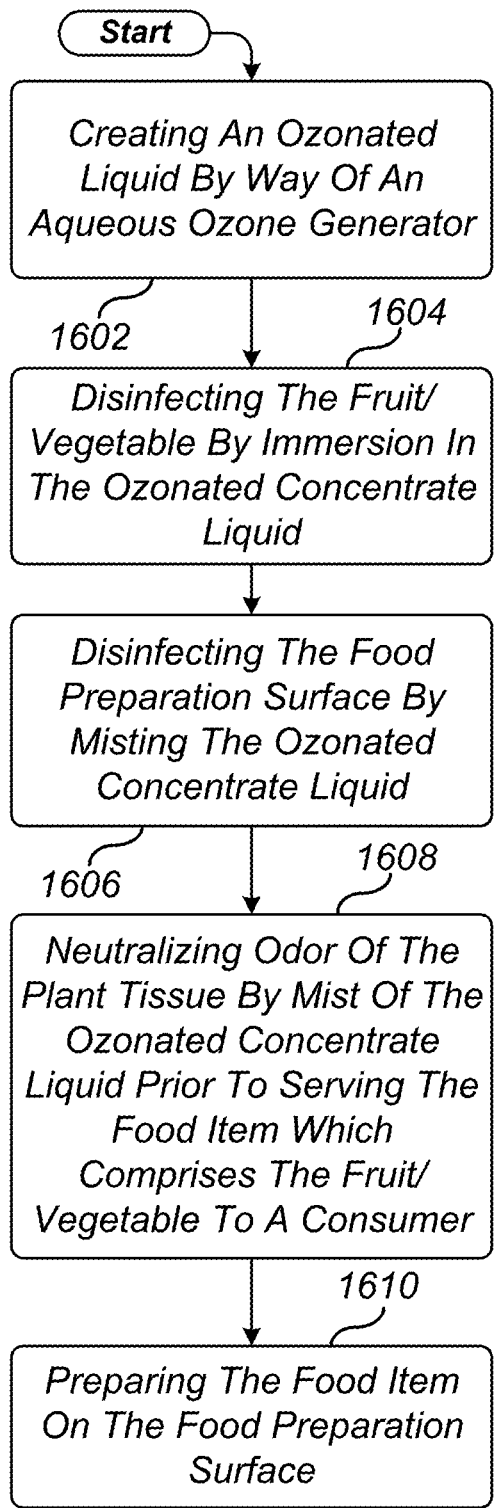
FIGS. 21-24 illustrate examples of a food preparation disinfection treatment method.

Referring to FIGS. 1F and 21, there is illustrated one example of a food preparation disinfection treatment method. In an exemplary embodiment, a food preparation disinfection treatment method disinfects fruits or vegetables 318, and food preparation surfaces 314 during the preparation of food item 328 in a restaurant 312 environment. In an exemplary embodiment, the method begins in step 1602 by creating an ozonated concentrate liquid 118 by way of an aqueous ozone generator 530. The aqueous ozone generator 530 receives a water source 102 and generates from the water source 102 the ozonated concentrate liquid 118. The method then moves to step 1604.

The method continues in step 1604 by disinfecting one or more fruits 318 or one or more vegetables 318 by immersion in the ozonated concentrate liquid 118 for a disinfection treatment time 470. Each of the fruit and the vegetable 318 comprises a plant tissue 326. The method then moves to step 1606.

The method continues in step 1606 by disinfecting one or more food preparation surface 314 by misting the ozonated concentrate liquid 118 onto the food preparation surface 314 and waiting a surface disinfection treatment time, better illustrated in at least FIG. 1A reference 'B', before using the food preparation surface 314. The method then moves to step 1608.

The method continues in step 1608 by neutralizing the odor of the plant tissue 326 by misting the ozonated concentrate liquid 118 onto the plant tissue 326, at a periodic mist interval 474 and for each of the periodic mist interval 474, a mist duration treatment time. Repeating 466, the step until the fruit or vegetable 318 is used in a food item 328. The method then moves to step 1610.

The method continues in step 1610 by preparing the food item 328 on the food preparation surface 314. Food item 328 comprises the fruit or the vegetable 318. The method is then exited.

Figure 22:
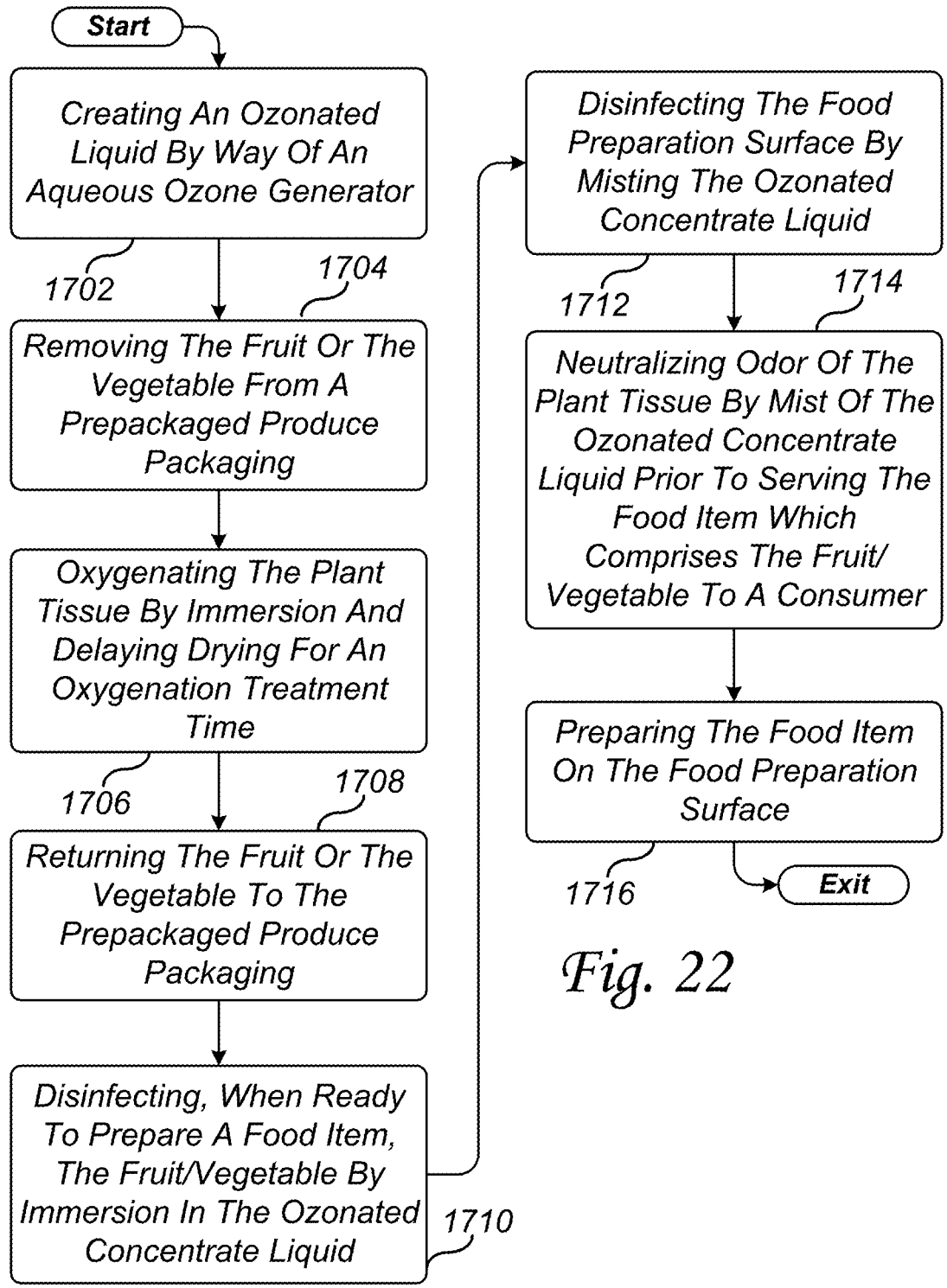

Referring to FIGS. 1F and 22, there is illustrated one example of a food preparation disinfection treatment method. In an exemplary embodiment, a food preparation disinfection treatment method disinfects fruits or vegetables 318, and food preparation surfaces 314 during the preparation of food item 328 in a restaurant 312 environment. In an exemplary embodiment, the method begins in step 1702 by creating an ozonated concentrate liquid 118 by way of an aqueous ozone generator 530. The aqueous ozone generator 530 receives a water source 102 and generates from the water source 102 the ozonated concentrate liquid 118. The method then moves to step 1704.

The method continues in step 1704 by removing one or more fruits 318 or one or more vegetables 318 from a prepackaged produce packaging 324. Each of the fruit and the vegetable 318 comprises a plant tissue 326. The method then moves to step 1706.

The method continues in step 1706 by oxygenating the plant tissue 326 by immersion and delaying drying for an oxygenation treatment time 472, enhancing the metabolic processes of the plant tissue 326. The method then moves to step 1708.

The method continues in step 1708 by returning the fruit 318 or the vegetable 318 to the prepackaged produce packaging 324 for storage until needed for preparing the food item 328. The method then moves to step 1710.

The method continues in step 1710 by disinfecting, when ready to prepare the food item 328, the fruit 318, or the vegetable 318 by immersion in the ozonated concentrate liquid 118 for a disinfection treatment time 470. The method then moves to step 1712.

The method continues in step 1712 by disinfecting one or more food preparation surface 314 by misting the ozonated concentrate liquid 118 onto the food preparation surface 314 and waiting a surface disinfection treatment time, better illustrated in at least FIG. 1A reference 'B', before using the food preparation surface 314. The method then moves to step 1714.

The method continues in step 1714 by neutralizing the odor of the plant tissue 326 by misting the ozonated concentrate liquid 118 onto the plant tissue 326, at a periodic mist interval 474 and for each of the periodic mist interval 474, a mist duration treatment time. Repeating 466, the step until the fruit or vegetable 318 is used in a food item 328. The method then moves to step 1716.

The method continues in step 1716 by preparing the food item 328 on the food preparation surface 314. The food item 328 comprises the fruit 318 or the vegetable 318. The method is the exited.

Figure 23:
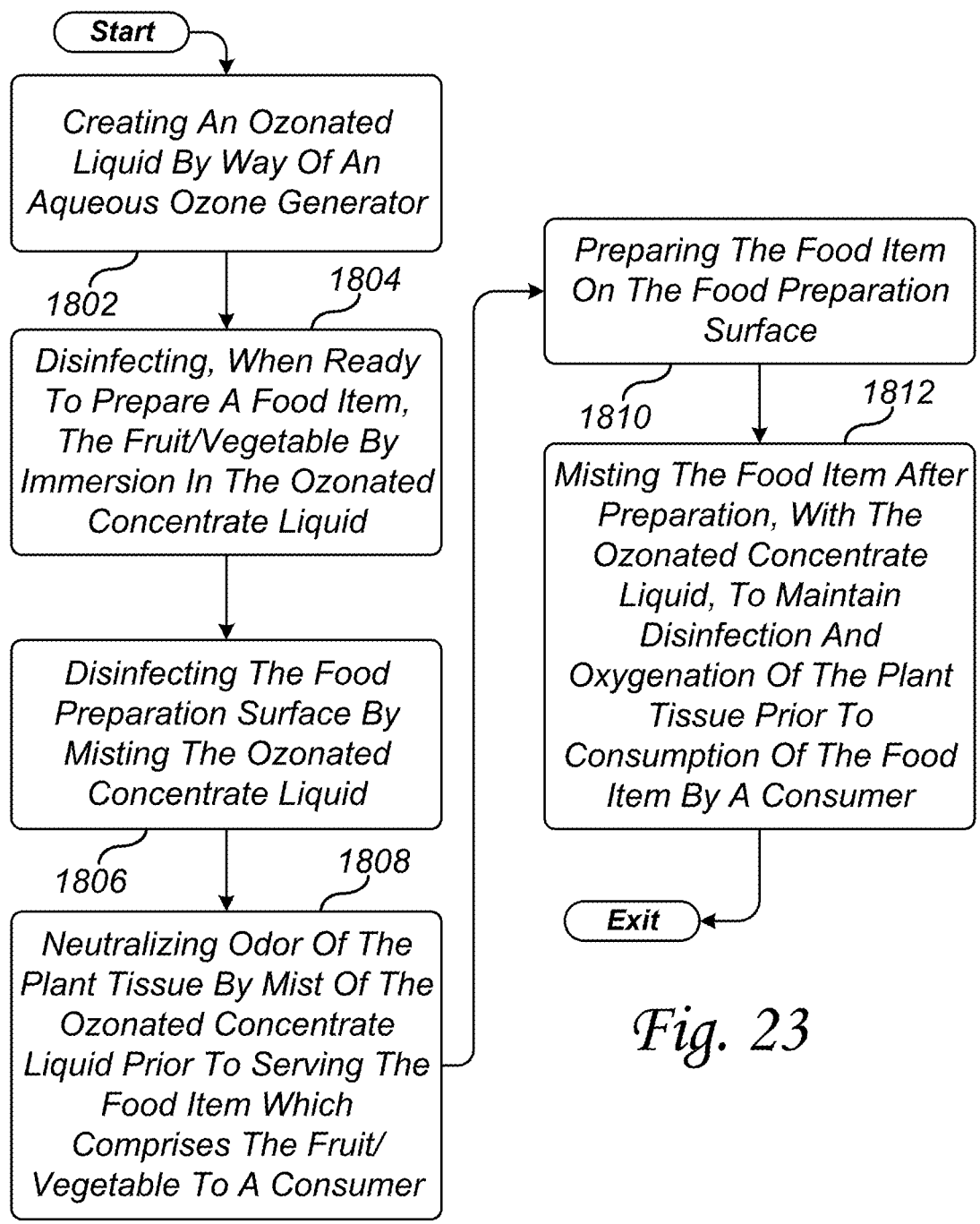

Referring to FIGS. 1F and 23, there are illustrated examples of a food preparation disinfection treatment method. In an exemplary embodiment, a food preparation disinfection treatment method disinfects fruits or vegetables 318, and food preparation surfaces 314 during the preparation of food item 328 in a restaurant 312 environment. In an exemplary embodiment, the method begins in step 1802 by creating an ozonated concentrate liquid 118 by way of an aqueous ozone generator 530. The aqueous ozone generator 530 receives a water source 102 and generates from the water source 102 the ozonated concentrate liquid 118. The method then moves to step 1804.

The method continues in step 1804 by disinfecting one or more fruits 318 or one or more vegetables 318 by immersion in the ozonated concentrate liquid 118 for a disinfection treatment time 470. Each of the fruit 318 and the vegetable 318 comprises a plant tissue 326. The method then moves to step 1806.

The method continues in step 1806 by disinfecting one or more food preparation surface 314 by misting the ozonated concentrate liquid 118 onto the food preparation surface 314 and waiting a surface disinfection treatment time, better illustrated in at least FIG. 1A reference 'B', before using the food preparation surface 314. The method then moves to step 1808.

The method continues in step 1808 by neutralizing the odor of the plant tissue 326 by misting the ozonated concentrate liquid 118 onto the plant tissue 326, at a periodic mist interval 474 and for each of the periodic mist interval 474, a mist duration treatment time. The method then moves to step 1810.

The method continues in step 1810 by preparing the food item 328 on the food preparation surface 314. The food item 328 comprises the fruit 318 or the vegetable 318. The method then moves 464 to step 1812.

The method continues in step 1812 by maintaining disinfection and oxygenation of the plant tissue 326 by misting the food item 328, with the ozonated concentrate liquid 118, after preparation and prior to consumption of the food item 328 by a consumer 310. The method is the exited.

Figure 24:
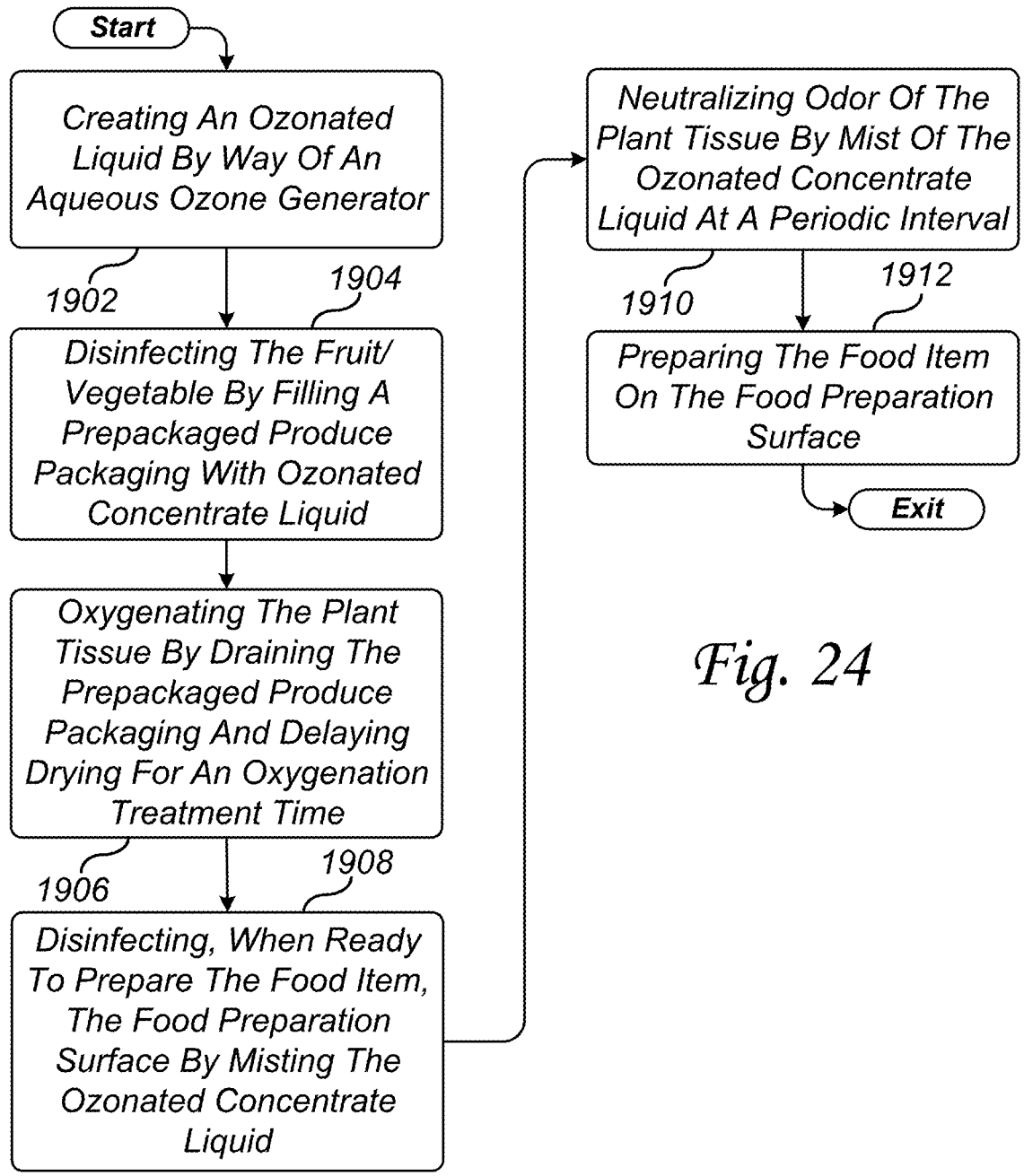

Referring to FIGS. 1H and 24, there is illustrated one example of a food preparation disinfection treatment method. In an exemplary embodiment, a food preparation disinfection treatment method disinfects fruits or vegetables 318, and food preparation surfaces 314 during the preparation of food item 328 in a restaurant 312 environment. In an exemplary embodiment, the method begins in step 1902 by creating an ozonated concentrate liquid 118 by way of an aqueous ozone generator 530. The aqueous ozone generator 530 receives a water source 102 and generates from the water source 102 the ozonated concentrate liquid 118. The method then moves to step 1904.

The method continues in step 1904 by disinfecting one or more fruit 318 or one or more vegetable 318 by filling 478 a prepackaged produce packaging 324, which comprises the fruit 318 or the vegetable 318, with the ozonated concentrate liquid 118, immersing (to fill line 482) the fruit 318 or the vegetable 318 in the ozonated concentrate liquid 118 for a disinfection treatment time 470. Each of the fruit 318 and the vegetable 318 comprises a plant tissue 326. The method then moves to step 1906.

The method continues in step 1906 by oxygenating the plant tissue 326 by draining 480 the prepackaged produce packaging 324 and delaying before drying the fruit 318 or the vegetable 318 for an oxygenation treatment time 472, enhancing metabolic processes of the plant tissue 326. The method then moves to step 1908.

The method continues in step 1908 by disinfecting, when ready to prepare the food item 328, one or more food preparation surface 314 by misting the ozonated concentrate liquid 118 onto the food preparation surface 314 and waiting a surface disinfection treatment time, better illustrated in at least FIG. 1A reference 'B', before using the food preparation surface 314. The method then moves to step 1910.

The method continues in step 1910 by neutralizing the odor of the plant tissue 326 by misting the ozonated concentrate liquid 118 onto the plant tissue 326, at a periodic mist interval 474 and for each of the periodic mist interval 474, a mist duration treatment time. The method then moves to step 1912.

The method continues in step 1912 by preparing the food item 328 on the food preparation surface 314. The food item 328 comprises the fruit 318 or the vegetable 318. The method is then exited.

Referring to FIGS. 1G and 1H, there are illustrated examples of disinfection by immersion and oxygenation by delayed drying. In an exemplary embodiment, FIG. 1G, reference 'A' illustrates a timeline that details how a pesticide residue removal from produce 318 can occur by spraying with the ozonated concentrate liquid 118 for a pesticide residue removal treatment time 468 and that the pesticide residue removal treatment time 468 can be in the range of a few seconds. The produce 318 can then be disinfected by immersion in the ozonated concentrate liquid for disinfection treatment time 470 and the disinfection treatment time can be in the range of less than one minute. The produce 318 can then be oxygenated by delay drying allowing the ozonated concentrate liquid to rest on the plant tissue 326 absent agitation or removal for an oxygenation treatment time 472 and that the oxygenation treatment time 472 can be in the range of greater than one minute and then the produce 318 can be dried. Finally, the produce 318 is misted with the ozonated concentrate liquid at a periodic mist interval 474 and for each of the periodic mist intervals 474, a mist duration treatment time. In an exemplary embodiment, the periodic mist interval 474 can be in the range of hourly to daily or even extending to every two or three days depending on the environmental condition the produce 318 is kept prior to use in a food item 328. Additionally, the mist duration treatment time which is the duration of misting the ozonated concentrated liquid onto the plant tissue 326 can be in the range of a few seconds. In a plurality of exemplary embodiment, treatment time of the various steps above can be adjusted based on the environment and other factors the produce is stored or otherwise maintained prior to use in a food item 328 as may be required and/or desired in a particular embodiment.

An advantage, in the present invention, in an exemplary embodiment, with regards to the steps of disinfection by immersion for a disinfection treatment time 470 and oxygenating by delayed drying for an oxygenation treatment time 472 these steps can be combined 476 with the aid of an immersion bucket 154.

In this regard, and as illustrated in reference 'B' the produce 318 can be placed into the immersion bucket 154 up to the produce fill line 168. The immersion bucket 154 can then be filled with the ozonated concentrate liquid 118 up to the ozonated concentrate liquid fill line 166. In operation, an egress port 164 in the bottom 170 of the immersion bucket 154 is adjustable and configured to allow the ozonated concentrate liquid to drain from the immersion bucket 154 at a time rate 478 which is equivalent to the disinfection treatment time 470. In this regard, without operator intervention the immersion bucket 154 self-drains through the egress port 164 moving 478 the water line from the ozonated concentrate liquid fill line 166 to the produce fill line 168 in the time period equivalent to disinfection treatment time 470 thus keeping the produce 318 immersed in the ozonate concentrate liquid for the disinfection treatment time 470.

The aperture of the egress port 164 is designed to be adjustable, allowing precise control over the flow rate at which the ozonated concentrate liquid 118 exits the immersion container 154. By adjusting the size of the egress port's opening, the flow rate can be tailored to match a specified time rate 478 for the disinfection process. This feature can be critical to maintaining the proper immersion time for produce 318 within the ozonated concentrate liquid 118, ensuring that produce 318 remains fully submerged for the duration of the disinfection treatment time 470.

In an exemplary embodiment, the ability to control the flow rate through the adjustable egress port 164 can be essential for achieving the desired disinfection treatment time 470. By precisely regulating how quickly the ozonated concentrate liquid 118 drains, the system ensures that produce 318 is subjected to the ozonated concentrate liquid 118 for the desired time required for effective disinfection. This prevents premature, too fast, or too slow draining, which could compromise the immersion process, or overly slow draining, which could extend the treatment time beyond the optimal range, potentially affecting produce 318/326 quality.

Additionally, the controlled flow rate allows for smooth transitioning from the disinfection phase 470 to the delay drying period 472, ensuring that produce 318/326 can properly undergo oxygenation without unnecessary delays in the removal of the ozonated concentrate liquid 118. The adjustable egress port 164, therefore, plays a pivotal role in synchronizing the stages of the treatment process and ensuring that each step is carried out in a controlled and efficient manner.

The drying platform 172 is designed to be placed inside the immersion container 154, providing a versatile base for holding the produce during the immersion, oxygenation, and drying processes. The platform can be configured as a flat surface, basket, or other suitable container, depending on the type of produce being treated. The spinning motor 546 is operationally related to the drying platform 172 and is responsible for controlling its rotational speed. The platform is sized to fit securely within the immersion container 154, allowing for easy placement and removal when needed. Additionally, the platform may be equipped with support structures or grips to stabilize it during immersion and ensure proper rotation during agitation, helping to keep the produce securely in place throughout the treatment cycle.

The various produce agitation 548 mechanisms, including the ultrasonic vibrator 540, mechanical vibrator 542, airflow blower 544, spinning motor 546, or other suitable agitators can be securely fitted or otherwise fastened to the immersion container 154 to facilitate their operation. These mechanisms may be integrated into the container's structure or attached via mounting points designed to ensure stability during use. For example, the ultrasonic and mechanical vibrators can be affixed to the base or sides of the container to deliver consistent vibrations to the drying platform 172 and the produce placed upon it. Similarly, the airflow blower and spinning motor can be installed in positions that allow them to interact effectively with the drying platform, providing airflow and rotational motion as needed. Each mechanism is strategically positioned to optimize the dislodging of residual ozonated concentrate liquid 118 from produce 318/326, while maintaining the overall integrity and functionality of the immersion container 154.

During the immersion process, the drying platform 172 holds the produce securely while the ozonated concentrate liquid 118 fills the container to the desired level, ensuring that produce 318 is fully submerged for the disinfection treatment time 470. After the disinfection phase, the platform remains stationary as the ozonated concentrate liquid 118 drains from the immersion container 154 through an egress port, allowing produce 318 to rest on the platform while the excess liquid is removed.

Once the ozonated concentrate liquid 118 has drained, the drying platform 172 serves as the base for various produce agitation 548 mechanisms. Depending on the treatment method chosen, the platform may be agitated using vibration, airflow, or spinning to dislodge any remaining liquid. In the case of the spinning motor 546, the drying platform 172 is connected to the motor, which rotates the platform at a controlled speed, generating centrifugal force to dislodge liquid from the surface of the produce 318/326.

Alternatively, the platform can remain stationary while the airflow blower 544 or vibrators (540, 542) provide additional agitation to remove excess moisture. The drying platform 172 can be designed with slotted or perforated surfaces to allow air or water to circulate freely, ensuring efficient drying. For delicate produce, such as leafy greens, the platform's structure minimizes direct contact with the container's walls, preventing bruising or damage during the drying phase.

Once the drying process is complete, the produce can be easily removed from the drying platform 172, ready for storage or further processing. The platform's design allows for easy cleaning and reuse, ensuring hygiene standards are maintained between treatment cycles.

In an exemplary embodiment, the drying platform 172 can be specifically designed to facilitate efficient drying of produce 318 after it has been immersed in the ozonated concentrate liquid 118 and during the subsequent drying and oxygenation phases. To optimize the drying process, the drying platform 172 can be configured with a slotted or perforated surface 176, which allows both air and liquid to circulate freely around produce 318. The openings 176 in the surface of the drying platform 172 are carefully designed to be large enough to promote the free flow of air and liquid but small enough to prevent the produce from slipping through or becoming damaged.

The slotted 176 or perforated design enhances airflow during drying, ensuring that all sides of produce 318/326 are exposed to circulating air, whether it is natural or forced air from an airflow blower 544. This enhanced airflow around the produce minimizes the risk of moisture retention, which could result in uneven drying, mold growth, or spoilage. Additionally, the perforations 176 help ensure that any residual ozonated concentrate liquid 118 that drains from produce 318/326 is able to pass through the drying platform 172 without pooling around produce 318, further promoting an even drying process.

During the immersion phase, the slotted or perforated surface 176 also allows the ozonated concentrate liquid 118 to flow freely over and around produce 318, ensuring thorough coverage during disinfection. As the ozonated concentrate liquid 118 drains from the immersion container, the perforations 176 ensure that the ozonated concentrate liquid 118 is not trapped on the drying platform 172, allowing it to exit the container smoothly through the egress port 164. This feature also helps to maintain a consistent flow of the ozonated concentrate liquid 118 during the disinfection phase and prevents any unnecessary retention of the ozonated concentrate liquid 118 that could interfere with the timing of the process.

The configuration of the slotted or perforated surface 176 can vary based on the type of produce 318 being treated. For example, larger slots may be used for bulky, firm produce 318 like apples, while finer perforations 176 may be applied for more delicate items like lettuce or leafy greens. In this way, the drying platform 172 can be adaptable to different types of produce 318, ensuring that each type is optimally supported and exposed to the necessary air and ozonated concentrate liquid 118 circulation for effective treatment.

The immersion bucket 154 continues to self-drain until all of the ozonated concentrate liquid is drained leaving the produce 318 to rest in a wetted state absent agitation or removal of the surface coating of the ozonated concentrate liquid 118 for the oxygenation treatment time 472. Food service personnel can then remove and dry the produce 318 ready for storage and/or use in preparing food items 328.

In an exemplary embodiment, as illustrated in FIG. 1G, reference 'A,' the process for treating produce 318 begins with the removal of pesticide residues through the application of ozonated concentrate liquid 118. This is performed by spraying the produce 318 for a pesticide residue removal treatment time 468, typically lasting a few seconds. Once the pesticide residues are removed, the produce 318 is submerged in the ozonated concentrate liquid 118 for a disinfection treatment time 470, which can range from less than a minute to other suitable durations based on the type of produce.

For disclosure purposes, produce agitation 548 refers to any combination of ultrasonic vibrator 540, mechanical vibrator 542, airflow blower 544, spinning motor 546, or other suitable mechanisms used to remove the remaining liquid. These components are operationally related to the produce agitator controller 538 and provide versatile and adaptable methods for ensuring thorough drying and treatment of the produce 318/326.

The ultrasonic vibrator 540 can enhance the immersion process by generating high-frequency vibrations while the produce is still submerged in the ozonated concentrate liquid 118. These vibrations create microscopic bubbles that collapse near the surface of the produce in a process known as cavitation. This increases the interaction between the ozonated liquid and the produce surface, dislodging contaminants and ensuring comprehensive cleaning, even in crevices. Ultrasonic vibration is gentle yet effective, making it particularly suitable for delicate produce that could be damaged by more physical agitation methods.

Following disinfection 470, the produce 318 is subjected to an oxygenation treatment time 472 by delaying the drying process. This allows the ozonated concentrate liquid 118 to remain on the plant tissue 326, enhancing the metabolic processes of the produce cells. The oxygenation period typically exceeds one minute, depending on the desired level of revitalization. After oxygenation, the produce 318 is prepared for drying, during which residual ozonated concentrate liquid 118 is dislodged using various produce agitation 548 techniques, each tailored to the type of produce.

Depending on the type of produce and desired agitation method, one or more of the following can be implemented: mechanical vibrator 542, airflow blower 544, spinning motor 546, or other suitable agitation technique.

After the ozonated concentrate liquid 118 has drained from the immersion container 154, the mechanical vibrator 542 can apply gentle vibrations to the drying platform 172, helping to dislodge any remaining liquid from the surface of the produce. This method is especially effective for firmer produce such as apples, which benefit from stationary, controlled agitation. The vibrations ensure that the produce is dried thoroughly, preventing moisture retention that could lead to spoilage, all without the need for manual intervention.

The airflow blower 544 can generate a steady airstream to blow off any remaining ozonated concentrate liquid 118 after draining and oxygenation are complete. The airflow blower 544 can work in conjunction with the spinning motor 546, which slowly rotates the drying platform 172, allowing the airstream to reach all sides of the produce. This method ensures uniform drying and is particularly effective for leafy greens like lettuce, which tend to trap moisture on their broad surfaces. The airflow provides a gentle, non-invasive method of drying, preserving the integrity of the produce while ensuring effective moisture removal.

The spinning motor 546 can rotate the drying platform 172 at a controlled speed to generate centrifugal force, which dislodges any remaining ozonated concentrate liquid 118 from the surface of the produce. This method is especially suited for leafy greens, such as lettuce, where broad leaves can trap liquid. The spinning ensures rapid and efficient drying, reducing the need for manual handling, and preventing damage to delicate produce. The speed of the spinning motor 546 can be adjusted to accommodate various types of produce, ensuring optimal drying for different items.

In operation, the produce agitation 548 mechanisms work seamlessly under the control of the produce agitator controller 538, transitioning between the disinfection, oxygenation, and drying stages automatically. This ensures a consistent and efficient drying process, tailored to the specific needs of produce 318/326, while reducing the need for manual labor.

In an exemplary embodiment, an immersion container 154 is provided for treating produce with an ozonated concentrate liquid 118. The immersion container 154 is configured to hold produce up to a produce fill line 168 and ozonated concentrate liquid up to an ozonated concentrate liquid fill line 166, which is positioned above the produce fill line to ensure that the produce is fully immersed during treatment. The immersion of produce in the ozonated concentrate liquid facilitates disinfection and other treatment processes, such as oxygenation and drying.

At the base of the immersion container 154, an adjustable egress port 164 is provided. The egress port is configured to allow the ozonated concentrate liquid to drain at a controlled time rate 478. This time rate corresponds to a disinfection treatment time 470, during which the produce remains fully immersed in the ozonated concentrate liquid. The controlled drainage helps ensure that the produce remains in contact with the liquid for the optimal time necessary for effective disinfection.

A drying platform 172 is positioned within the immersion container 154. The drying platform is configured to support the produce during the immersion, oxygenation, and drying processes. The drying platform 172 can take various forms, such as a slotted or perforated surface 176, which allows liquid and air to circulate freely during the drying process, ensuring even drying and effective removal of the ozonated concentrate liquid.

The system includes one or more produce agitation mechanisms 548, which can be operationally related to either the drying platform 172 or the immersion container 154. These agitation mechanisms are designed to operate either while the produce is immersed in the ozonated concentrate liquid 118, enhancing liquid interaction with the surface of the produce, or at the conclusion of the delay drying period, to dislodge any remaining ozonated concentrate liquid from the produce's surface.

In one exemplary embodiment, the produce agitation mechanism comprises an ultrasonic vibrator 540, configured to generate high-frequency vibrations during immersion. These vibrations help to enhance the interaction of the ozonated concentrate liquid with the surface of the produce and dislodge any contaminants that may adhere to the produce during immersion. This ensures thorough disinfection and cleaning of the produce.

In another exemplary embodiment, the produce agitation mechanism comprises a mechanical vibrator 542, which is configured to apply mechanical vibrations to the drying platform 172 after the ozonated concentrate liquid 118 has drained. The vibrations help to dislodge residual liquid from the surface of the produce, ensuring that it is thoroughly dried and prepared for storage or further processing.

In yet another embodiment, the produce agitation mechanism comprises an airflow blower 544, which is configured to generate an airstream that blows across the surface of the produce after immersion. The drying platform 172 can be rotated by a spinning motor 546 to ensure that all sides of the produce are exposed to the airstream. This configuration enables efficient drying of the produce by ensuring that no residual liquid remains on any part of the produce.

In some embodiments, immersion container 154 also includes a spinning motor 546, operationally related to the drying platform 172. The spinning motor is configured to spin the platform at a sufficient rotational speed to generate centrifugal force, which helps dislodge any remaining ozonated concentrate liquid from the produce. This method is particularly useful for treating leafy greens or other produce that requires rapid drying and removal of surface liquid.

Additionally, the aperture of the egress port 164 can be adjusted, allowing the flow rate of the ozonated concentrate liquid to be controlled. By adjusting the flow rate, the system can precisely regulate the disinfection treatment time, ensuring that the produce remains immersed in the ozonated concentrate liquid for the optimal period.

In this exemplary embodiment, the ozonated concentrate liquid 118 is generated from water by way of an electrochemical generator 502. The electrochemical generator comprises an ion exchange material and is configured to receive water and an electrolyte, forming a mixture. The generator processes this mixture to produce the ozonated concentrate liquid, which is then supplied to the immersion container 154 for produce treatment.

A method of using the immersion container 154 is also provided. The method involves placing produce inside the immersion container 154 up to the produce fill line 168, followed by filling the container with ozonated concentrate liquid 118 up to the ozonated concentrate liquid fill line 166. The ozonated concentrate liquid is generated from water using the electrochemical generator 516. The produce is maintained in immersion for a disinfection treatment time, after which the egress port 164 is adjusted to drain the ozonated concentrate liquid 118 at a controlled time rate. Once drained, the produce rests on the drying platform 172 during a delay drying period 472, allowing the produce to oxygenate. One or more produce agitation mechanisms 548 are then employed to enhance the interaction of the ozonated concentrate liquid with the produce during immersion or dislodge any remaining liquid at the conclusion of the delay drying period.

In another exemplary embodiment, an immersion container 154 is provided for treating produce 318/326 with an ozonated concentrate liquid 118. The immersion container 154 is configured to hold produce 318/326 up to a produce fill line 168 and the ozonated concentrate liquid 118 up to an ozonated concentrate liquid fill line 166, which is positioned above the produce fill line to ensure full immersion of the produce during the disinfection process.

An adjustable egress port 164 is located at the base of the immersion container 154, allowing the ozonated concentrate liquid to drain at a controlled time rate. The time rate corresponds to a disinfection treatment time 470, during which the produce remains completely immersed in the ozonated concentrate liquid 118 to ensure thorough treatment and disinfection.

The immersion container 154 further includes a drying platform 172, which is positioned within the immersion container 154 to support produce 318/326 during the disinfection immersion 470, delayed drying oxygenation 472, and drying processes. The drying platform 172 may take various forms, such as a slotted or perforated surface 176, to allow liquid and air to circulate freely, ensuring even drying of produce 318/326.

The system also includes one or more produce agitation mechanisms 548, which are operationally related to either the drying platform 172 or the immersion container 154. These agitation mechanisms are configured to operate either during immersion, to enhance the interaction of the ozonated concentrate liquid 118 with the surface of the produce 318/326 and dislodge contaminants, or at the conclusion of the delay drying period 472, to dislodge any remaining liquid from the surface of the produce 318/326.

In this embodiment, the system is further enhanced by an aqueous ozone generator 504. The aqueous ozone generator 530 is configured to receive water 102 and generate ozonated concentrate liquid 118 from the water. The aqueous ozone generator 530 is fluidly connected to the immersion container 154, ensuring that a consistent supply of ozonated concentrate liquid 118 is available for produce 318/326 treatment.

The ozonated concentrate liquid 118 is generated from water by way of an electrochemical generator 516, which forms part of the aqueous ozone generator. The electrochemical generator 516 comprises an ion exchange material 534 and is configured to receive both water 102 and an electrolyte 140, forming a mixture 102/140 that undergoes electrochemical processing to produce ozonated concentrate liquid 118. The resulting ozonated concentrate liquid 118 is then supplied to immersion container 154 for the disinfection and treatment of produce 318/326.

In some embodiments, the system includes a flow governor 120/144/148. The flow governor 120/144/148 is configured to regulate the aqueous ozone production dwell time of the mixture 102/140 as it passes through the electrochemical generator 516. By controlling this dwell time, the flow governor 120/144/148 ensures that the ozone concentration level of the ozonated concentrate liquid 118 is maintained within the desired ozone concentration range 440. This level of control allows for optimized disinfection by maintaining the ideal ozone concentration in the liquid for effective produce 318/326 treatment.

The flow governor 120/144/148 plays a critical role in ensuring that the electrochemical generation of the ozonated concentrate liquid 118 is finely tuned to produce the correct ozone levels, based on the specific needs of the produce being treated. For example, certain produce 318/326 may require higher or lower ozone concentrations for effective disinfection and treatment. The flow governor 120/144/148 enables this adjustment by regulating the amount of time the mixture remains in the electrochemical generator, thereby allowing the ozone concentration levels to reach and maintain the desired concentration 440.

After the disinfection treatment time has elapsed, the adjustable egress port 164 allows the ozonated concentrate liquid 118 to drain from the immersion container 154, leaving the produce resting on the drying platform 172. During this phase, the produce 318/326 is allowed to rest in a wetted state for a delay drying period 472, during which oxygenation occurs. After this period, one or more produce agitation mechanisms 548 are activated to dislodge any remaining ozonated concentrate liquid from the surface of produce 318/326.

The system provides an efficient and controlled method of treating produce with an ozonated concentrate liquid, ensuring that the produce is thoroughly disinfected, dried, and oxygenated, with the liquid concentrations carefully regulated for optimal performance.

In an exemplary embodiment, a treatment system can comprise an immersion container 154, which is configured to hold produce 318/326 up to a produce fill line 168 and an ozonated concentrate liquid 118 up to an ozonated concentrate liquid fill line 166. The ozonated concentrate liquid fill line 166 is positioned above the produce fill line 168 to ensure that produce 318/326 is fully immersed during treatment 470. Full immersion in the ozonated concentrate liquid 118 is crucial for achieving thorough disinfection and treatment of the produce.

The system further includes an aqueous ozone generator 530, which is in fluid communication with the immersion container 154. The aqueous ozone generator 530 is configured to receive water and generate ozonated concentrate liquid 118 from the water. The generated ozonated concentrate liquid 118 is then supplied to immersion container 154 to maintain the appropriate level of liquid for produce 318/326 immersion. The use of the aqueous ozone generator 530 ensures effective disinfection of the produce 318/326 by generating high concentrations of ozone directly from and into the liquid.

To ensure that the ozone concentration level in the ozonated concentrate liquid 118 remains within a desired range 440, the system includes a flow governor 120/142/146. The flow governor 120/142/146 controls the flow of the ozonated concentrate liquid into the immersion container 154, ensuring that the concentration of ozone in the liquid is consistent and optimized for the disinfection process. By maintaining a precise ozone concentration, the flow governor 120/142/146 enhances the effectiveness of the produce 318/326 treatment, ensuring that harmful contaminants are efficiently neutralized.

At the base of the immersion container 154 is an adjustable egress port 164, which is configured to allow the ozonated concentrate liquid 118 to drain at a controlled time rate 478. This time rate corresponds to a disinfection treatment time 470, during which the produce remains fully immersed in the ozonated concentrate liquid 118. The controlled drainage of the liquid ensures that the produce is immersed for the optimal duration, allowing the ozonated concentrate liquid 118 to perform its disinfecting function before being drained.

Positioned within the immersion container 154 is a drying platform 172, which supports produce 318/326 during the immersion 470, oxygenation 472, and drying phases. The drying platform 172 can be configured with slotted or perforated surfaces 176 to facilitate air and liquid circulation, ensuring even drying of produce 318/326 and preventing the pooling of liquid.

The system also incorporates one or more produce agitation mechanisms 548, which are operationally related to either the drying platform 172 or the immersion container 154. These agitation mechanisms are configured to operate in two modes: (1) during the immersion of the produce 318/326 in the ozonated concentrate liquid 118, they enhance the liquid's interaction with produce 318/326 to dislodge contaminants from the produce's surface; and (2) at the conclusion of the delay drying period 472, they dislodge any remaining ozonated concentrate liquid 118 from the surface of produce 318/326, ensuring that produce 318/326 is properly dried and free of residual liquid.

The system is further equipped with a produce treatment controller 538, which is configured to automatically adjust the operation of the flow regulator 120/142/146, the adjustable egress port 164, and the produce agitation mechanisms 548 based on the type of produce 318/326 and the stage of the treatment process. The produce treatment controller 538 ensures that the system operates in an optimized manner, adjusting key parameters such as flow rate, immersion time, and agitation based on the specific produce being treated. For example, leafy greens may require different agitation and drying techniques compared to non-leafy produce like apples.

The produce treatment controller 538 also enables the system to dynamically respond to changes in the treatment cycle, ensuring that the flow of ozonated concentrate liquid 118 is maintained at the correct level during immersion, the egress port 164 drains the liquid at the correct time rate, and the appropriate agitation mechanisms are activated when necessary. This automation enhances the efficiency of the treatment process by reducing the need for manual intervention and ensuring consistent results.

In operation, the system follows a specific sequence for treating produce 318/326. First, produce 318/326 is placed in the immersion container 154 up to the produce fill line 168. The aqueous ozone generator 504 generates ozonated concentrate liquid 118 from water, which fills the immersion container up to the ozonated concentrate liquid fill line 166. The produce 318/326 is then immersed in the liquid for a disinfection treatment time 470, during which the flow governor 120/142/146 maintains the correct ozone concentration 440, and the produce agitation mechanisms 548 enhance liquid interaction with produce 318/326. As the disinfection treatment time 470 is elapsing, the egress port 164, while keeping the produce 318/326 immersed in the ozonated concentrate liquid 118, allows the ozonated concentrate liquid 118 to drain at a controlled time rate, leaving the produce to rest on the drying platform 172 in a wetted state during a delay drying period 472. At the conclusion of the delay drying period 472, the produce agitation mechanisms 548 are activated to dislodge any remaining ozonated concentrate liquid 118 from produce 318/326, ensuring that it is properly dried.

This system provides an efficient and automated method for treating produce 318/326 with an ozonated concentrate liquid 118, ensuring that produce 318/326 is thoroughly disinfected 470, oxygenated 472, and dried. The inclusion of the aqueous ozone generator 530, flow regulator 120/142/146, and produce treatment controller 538 enables precise control over the treatment process, resulting in consistently high-quality produce treatment outcomes.

Referring to FIG. 1H, reference 'A' a timeline that details how a pesticide residue removal from produce 318 can occur by spraying with the ozonated concentrate liquid 118 for a pesticide residue removal treatment time 468 and that the pesticide residue removal treatment time 468 can be in the range of a few seconds. The produce 318 can then be disinfected by immersion in the ozonated concentrate liquid for disinfection treatment time 470 and the disinfection treatment time can be in the range of less than one minute. The produce 318 can then be oxygenated by delay drying allowing the ozonated concentrate liquid to rest on the plant tissue 326 absent agitation or removal for an oxygenation treatment time 472 and that the oxygenation treatment time 472 can be in the range of greater than one minute and then the produce 318 can be dried. Finally, the produce 318 is misted with the ozonated concentrate liquid at a periodic mist interval 474 and for each of the periodic mist intervals 474, a mist duration treatment time. In an exemplary embodiment, the periodic mist interval 474 can be in the range of hourly to daily or even extending to every two or three days depending on the environmental condition the produce 318 is kept prior to use in a food item 328. Additionally, the mist duration treatment time which is the duration of misting the ozonated concentrated liquid onto the plant tissue 326 can be in the range of a few seconds. In a plurality of exemplary embodiment, treatment time of the various steps above can be adjusted based on the environment and other factors the produce is stored or otherwise maintained prior to use in a food item 328 as may be required and/or desired in a particular embodiment.

An advantage, in the present invention, in an exemplary embodiment, with regards to the steps of disinfection by immersion for a disinfection treatment time 470 and oxygenating by delayed drying for an oxygenation treatment time 472 these steps can be combined 476 with the aid of an immersion bucket 154.

In this regard, prepackaged produce packaging 324 can be opened and the packaging 324 filled 478 with the ozonated concentrate liquid 118 to a fill line 482 immersing the produce 318 for a disinfection treatment time 470. At the conclusion of the disinfection treatment time 470 the packaging 324 can be drained 480 leaving the produce 318 to rest in a wetted state absent agitation or removal of the surface coating of the ozonated concentrate liquid 118 for the oxygenation treatment time 472. Food service personnel can then remove, dry, and/or reseal the produce 318 in the packaging 324 ready for storage and/or use in preparing food items 328.

In an exemplary embodiment, such drying of the lettuce can be by blotting with a towel 320, forced air flow 322, air-drying, spinning the produce 318 in a device to use centripetal force to remove excess water, or by other suitable methods as may be required and or desired in a particular embodiment.

Figure 2A:
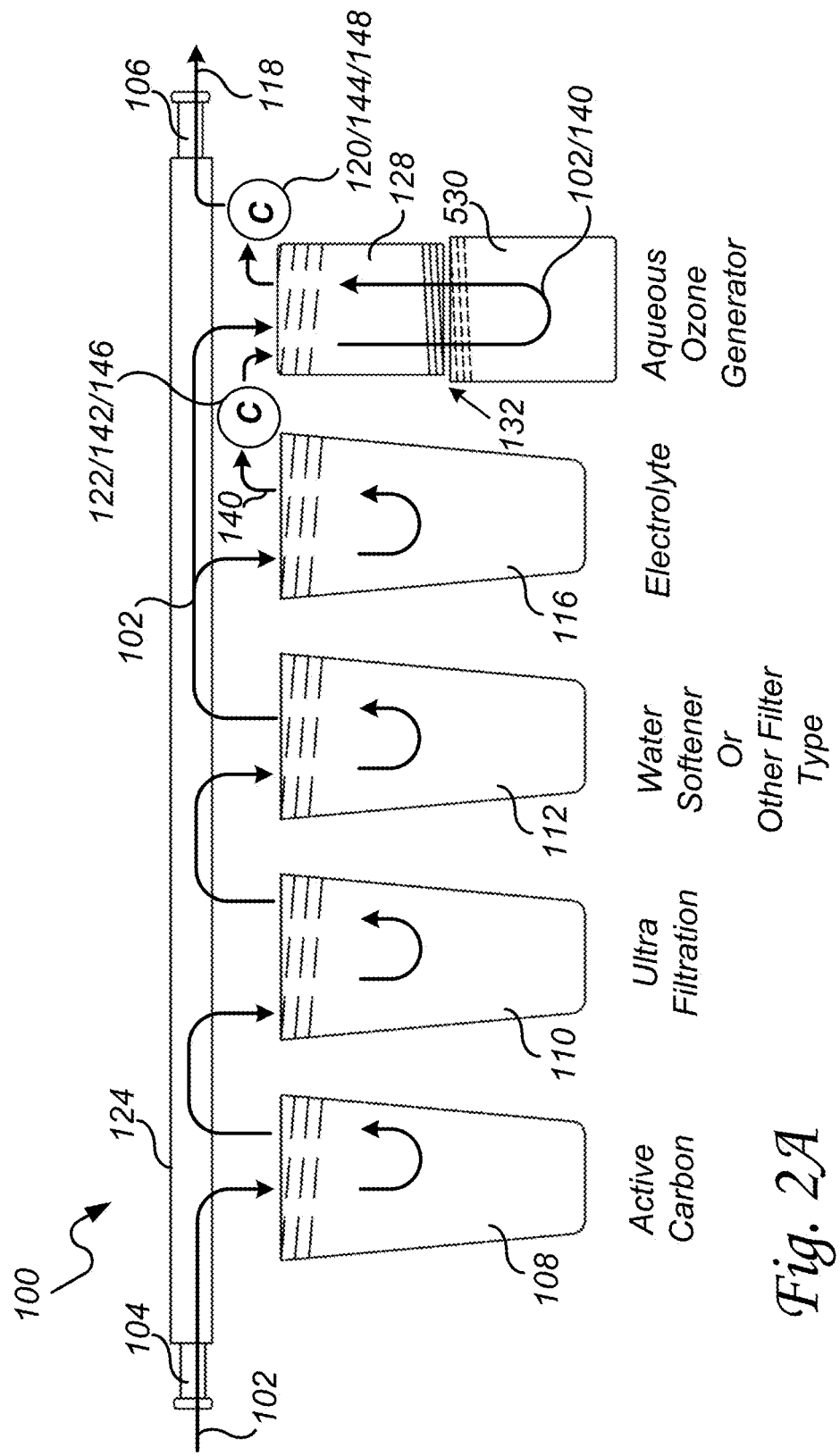
FIGS. 2A-2B and 3 illustrate examples of an aqueous ozone disinfection system.

Referring to FIG. 2A, there is illustrated one example of an aqueous ozone ($O_3$) disinfection system 100. In an exemplary embodiment, in applications such as food preparation and other applications, a manifold 124 can be interconnected with a source of water 102. Since water quality can vary, other filters may be in use for various purposes, such as filters 108/110/112 electrochemical generator performance may vary based on the conductivity of the water, as well as other factors. Since electrochemical generation from the water relies, in part, on electrolysis when the water is too soft, indicating low total dissolved solids (TDS), in particular ions, the conductivity of the water between the electrochemical electrodes is poor, causing low current flow between the electrodes and as such electrochemical generation can be impaired.

In operation, to exacerbate the shortcomings of soft water, prefiltering such as active carbon, ultrafine filtration, and other water treatments seek to remove particulates and molecules such as chlorine and others to make the water purer, chemical-free, odor-free, and pathogen-free, it does, however, make it softer (lower TDS ions and less conductive) which is even more unsuitable for electrochemical generation. Furthermore, while clean water in food contact and human consumption applications is a priority the water loses its ability to disinfect primarily by the added chlorine in municipal water. To this end, responsive to low water conductivity conditions, the present invention adjusts the conductivity of the water such that aqueous ozone can be electrochemically produced, in a continuous flow manner, in a predictable rate of production amount and dispensed at a sufficient and reliable ozone concentration level to disinfect food and surfaces that come in contact with the ozonated water.

As an example and not a limitation, such ozone concentrations suitable for food washing and food preparation surfaces can be in the range of 0.5 parts per million (PPM) to 1.5 PPM, or other suitable ozone concentration as may be required and or desired in a particular embodiment.

An advantage, in the present invention, is that soft water conditions that inhibit the electrochemical generation can be mitigated by the dosing of an electrolyte in an amount just needed to adjust the conductivity of the water in order to achieve optimal performance of the electrochemical generation. In addition, the dwell time of the mixture of water and electrolyte, within the aqueous ozone generator 530, can be adjusted to allow sufficient time in which for the electrochemical generator to ozonate the water in a continuous flow manner.

In this regard, the conductivity of the water is improved by a dosing of an electrolyte, in a ratiometric amount, in a continuous flow manner, allowing electrochemical generation of aqueous ozone to be produced at a desired concentration level with varying water input conditions. In operation, the present invention controls the dosing of the amount of electrolyte by way of an electrochemical medium catalyst governor 122/142/146. Additionally, a flow governor 120/144/148 controls the flow rate of the mixture of water and electrolyte through the aqueous ozone generator, in effect controlling the dwell time the electrochemical generator has to produce the ozone at the desired ozone concentration level. In this regard, slowing the mixture flow rate increases the dwell time, and increasing the flow rate decreases the dwell time.

As better illustrated in at least FIG. 5 governers 120/122 can be an electronic pump/valve/orifice control, each 120/122 of which can be automatically adjusted by way of control system 500. Governers 142/144 can be a fixed adjust washer style with variable size orifice that self-regulated with fluid pressure. Governors 146/148 can be manually adjustable style allowing a technician 302 or other authorized person to manually adjust the dosing rate of the electrolyte 122/142/146 into the water 102 and the mixture of the water and the electrolyte flow rate 120/144/148 controlling the dwell time of the mixture within the aqueous ozone generator 530 in a continuous flow manner. Additionally, other types or kinds of suitable governors can be used, as may be required and/or desired in a particular embodiment.

Figure 2B:
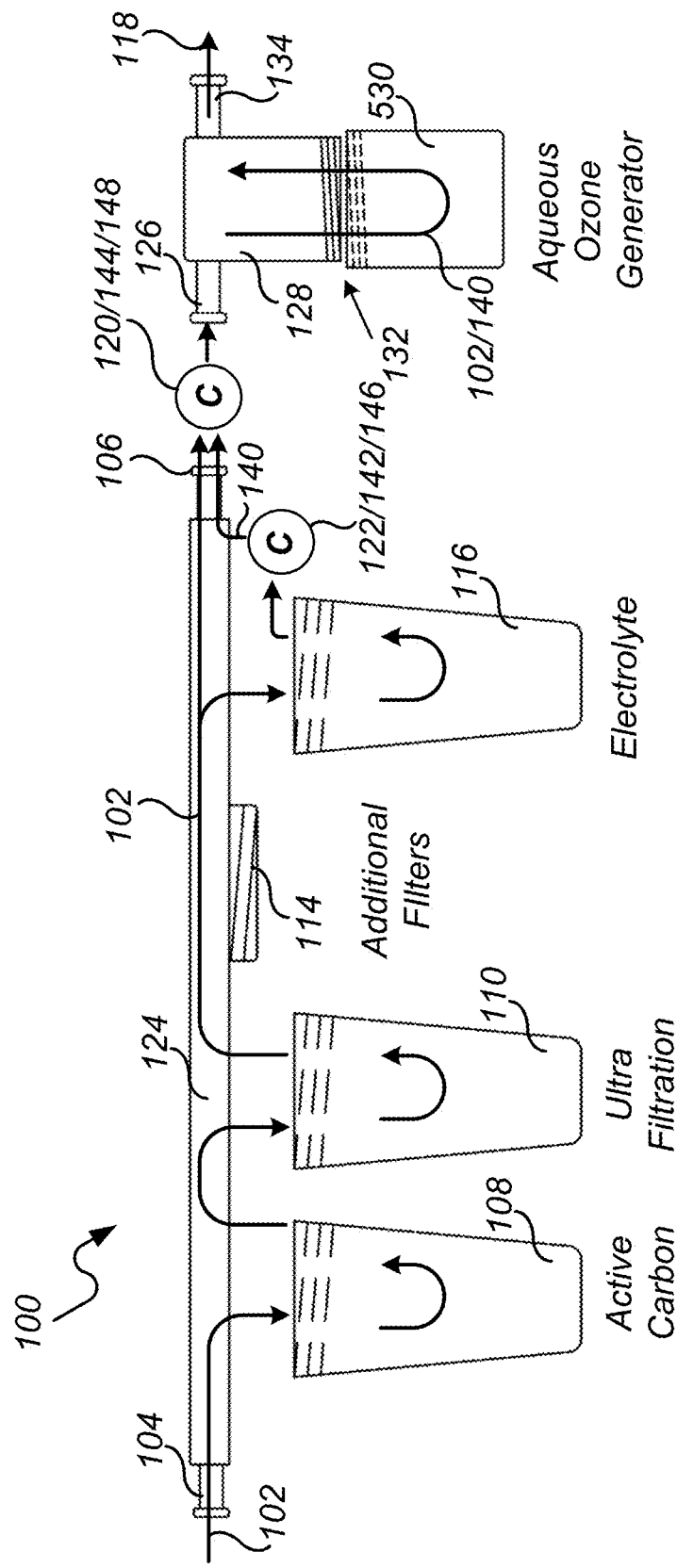

In operation, as better illustrated in at least FIG. 2B, a manifold 124 can have a plurality of cartridge receive adapters 114, in fluid communication, in which one or more compatible filters 108/110/112, electrolyte cartridges 116, aqueous ozone generators 530, or other types and or kinds of compatible cartridges and devices can be attached. In operation, water 102 can enter the manifold 124 and can sequentially pass in and out of each of the filters 108/110/112, electrolyte cartridges 116, aqueous ozone generator 530, or other cartridges. A concentrated ozone liquid 118 is dispensed, in a continuous flow manner, from the manifold 124 and can be used in a disinfecting manner for food washing, food preparation, surface cleaning, and other disinfection cleaning and washing purposes.

An advantage, in the present invention, is that aqueous ozone production happens within water and in the absence of air or oxygen gas traditionally used on corona discharge ozone production. The advantage of aqueous ozone is that it forms ozone $O_3$ molecules in large quantities on demand from the water with the help of an ion exchange material. The ozone molecules are produced in high concentration levels and well distributed throughout the water and tend not to break out of the water which makes the aqueous ozone concentration slow to dissipate with a half-life in the range of 20-30 minutes. In this regard, spraying aqueous ozone on food, food preparation areas and surfaces, food preparation equipment, and in other areas and leaving it undisturbed and/or allowing it to dry slowly means that the ozone treatment time can range from many minutes to tens of minutes. It is the long half-life time of aqueous ozone in combination with treating food and food preparation equipment and surfaces, and other areas at sufficient ozone concentration that enables the present invention to reach achieve oxidation levels in the range of 5 log reduction in pathogens including odor-causing pathogens, disease-causing pathogens, and others on food, food preparation equipment and surface, and in other areas.

In contrast, corona discharge systems create ozone gas (and a bunch of human-harmful nitrogen species molecules) that then has to be dissolved or dispersed into the water at a low concentration level which easily breaks out of the water and dissipates before any real disinfection benefits can be realized on the surface. Additionally, the ozone purity level in aqueous ozone is in the range of 28% whereas corona discharge techniques yield ozone purity in the mid-single digits to low teens with corona discharge in air having lower purity than corona discharge in oxygen.

For disclosure purposes, food washing can include all types of food including vegetables, fruits, meats, and other items. In operation, washing food in ozonated water, of the present invention, disinfects the surface of the food including killing bacteria and other pathogens. An added benefit and advantage, of the present invention, is that food washed/disinfected with ozonated water tends to extend the length of time food stays fresh1 as food-destroying surface bacteria and other organisms that can rapidly shorten the freshness and quality of the food are neutralized by the ozonated water.

For disclosure purposes food washing, food washing surfaces, and food preparation devices can be generally referred to as food preparation surfaces 204 and are not particularly limited and can include slicing machines, cutting machines, ovens, toasters, microwaves, bins, containers, refrigerators, other devices, surfaces of all kinds including tables, countertops, floors and walls around food preparation areas, and/or other types and kinds of surfaces, as may be required and/or desired in a particular embodiment.

An advantage, in the present, is that varying types of water with varying levels of TDS can be used as input water to the system. In operation, a portion of the input water 102 is mixed with a dosing of the electrolyte 140 (as needed and in an amount needed) in a ratiometrically mixed manner (ratio of water 102 and electrolyte 140) to adjust the conductivity of the mixture of the water 102 and electrolyte 140 such that the electrochemical generator 516 within the aqueous ozone generator 530 can produce aqueous ozone at a desired concentration ($O_3$ ppm) level. Even when the source of water 102 is soft, absent sufficient TDS ion the electrolyte dosing adjusts the conductivity of the water to the desired level for electrochemical production of aqueous ozone at the desired production rate so the ozonated water, in a continuous flow manner, is dispensed at the desired ozone concentration level.

In the present invention the term "ratiometric" or "ratiometrically" is intended to mean a system in which an output is directly proportional to the ratio of two or more inputs. In this regard, the input to an electrochemical generator is a mixture of electrolyte and water in a predetermined ratio and the output is an ozonated concentrate liquid at a desired ozone concentration level. An advantage, in the present invention, is the ozonated concentrate liquid can be produced from water that has low conductivity (high resistance between the electrodes) by ratiometrically mixing it with an electrolyte before electrochemical production. Additionally, the flow rate of the mixture (water and electrolyte) can be controlled to optimize the dwell time within the aqueous ozone generator allowing sufficient time for the electrochemical generator to produce the aqueous ozone at the desired ozone concentration level. This approach is also an advantage as the electrochemical generator ages with use and efficiency begins to change. In this regard, the mixture flow rate can be adjusted to set the dwell time accordingly to extend the useful life of the electrochemical generator.

Another advantage, in the present invention, is that instead of batch-type techniques, no matter what volume of outflow of ozonated water is needed ratiometrically mixing the water and electrolyte as well as controlling the mixture flow rate/dwell time, ozonated water can be produced at the needed volume at the right ozone concentration accurately at any on-demand volume level.

An advantage, in the present invention, is that the aqueous ozone generator 530 produces ozone through water electrolysis and ion exchange techniques. In this regard, part of the aqueous ozone generator 530 can comprise an electrochemical generator 516. During normal operation, the process of generating aqueous ozone can degrade the aqueous ozone generator 530. In addition, water quality can have an impact on the aqueous ozone generator 530 including causing premature scaling of certain components. This creates the need to track the service life of the aqueous ozone generator 530 and components such as the electrochemical generator 516. The present invention does this in a couple of different ways.

In an exemplary embodiment, in one example, technician 302 can test the ozonated water manually data communicating the results by way of computing device 732 such as a laptop, smartphone, tablet, or other suitable computing device for recording on a remote data processing resource 702 such as a server 702. Ozone production, use of the aqueous ozone generator, and ozone concentration levels can then be tracked remotely over time. When data shows that service or replacement is needed notification can be sent to technician 302 or administrator 304 and the aqueous ozone generator 530 serviced or replaced.

In another exemplary embodiment, the control system 500 can comprise an ozone sensor 522 and communication interface 508 that can automatically monitor ozone production and the use of the aqueous ozone generator 530. The results can be data communicated by way of the communication interface 508 to remote data processing resources 702 for recording. When data shows that service or replacement is needed notification can be sent to technician 302 or administrator 304 and the aqueous ozone generator 530 serviced or replaced.

Figure 11:
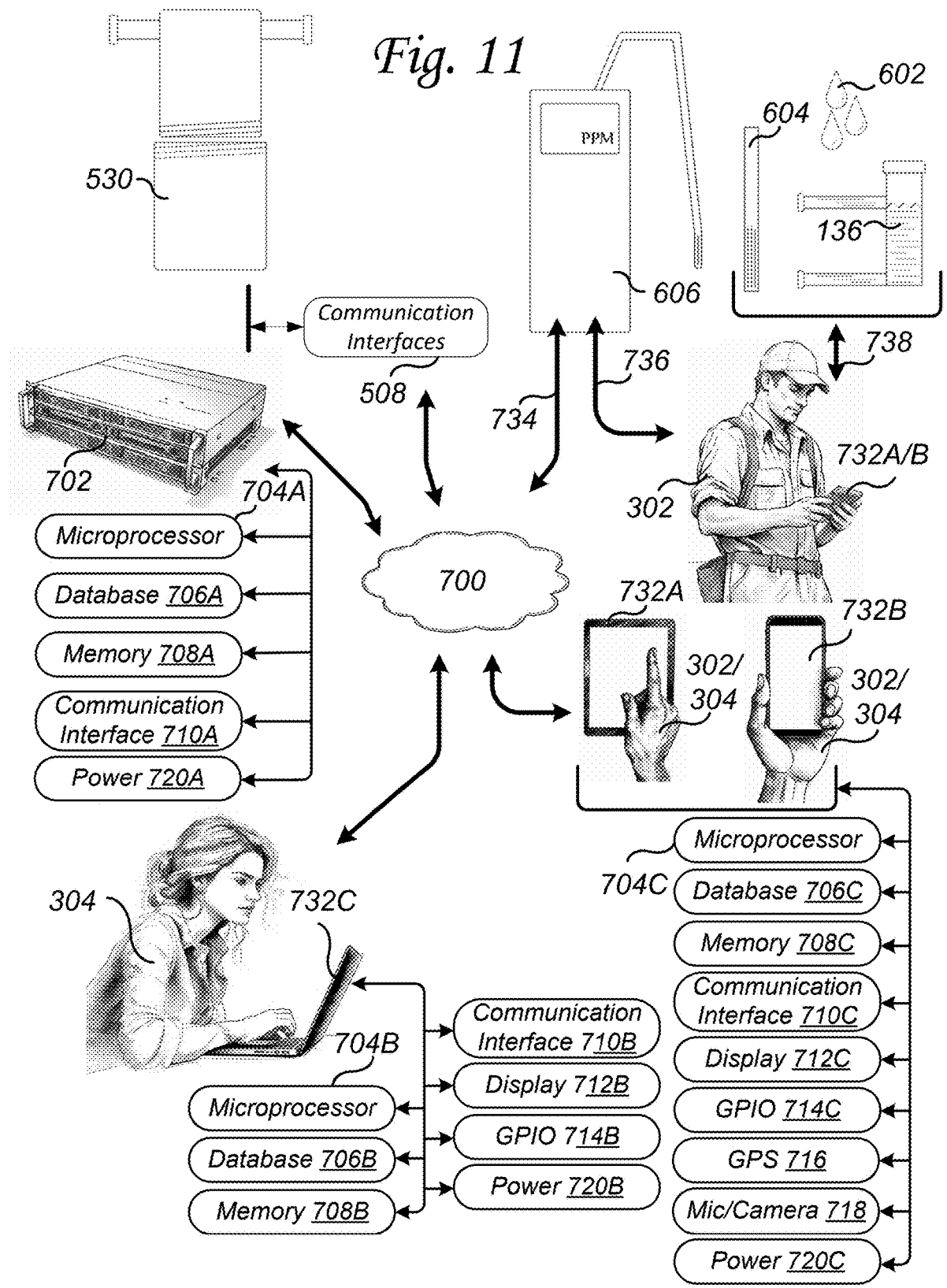
FIG. 11 illustrates one example of a system and network diagram.

Another advantage, in the present invention, and with reference to at least FIG. 11, is that the control system 500 can comprise a global positioning system (GPS) 514. In this regard, the GPS location of the aqueous ozone generator 520 can be tracked, and data communicated by way of the communication interface to the remote data processing resource 702. Reports, maps, and other information can then be used to inform where located, when/how used, and other details related to the aqueous ozone generator 530, as may be required and/or desired in a particular embodiment.

With reference to FIG. 5, there is illustrated a system diagram of the aqueous ozone disinfection system. During operation, water 102 and electrolyte 140 are routed to an aqueous ozone generator 530. Through electrolysis and ion exchange techniques the aqueous ozone generator 530 produces an ozonated concentrate liquid 118. The concentration of the ozonated concentrate liquid 118 can be dispensed through a valve, faucet, nozzle, or other, for disclosure purposes all referred to as a nozzle 142.

In an exemplary embodiment, an aqueous ozone disinfection system 100 can comprise an aqueous ozone generator 530 that receives a portion of a water source 102 and electrolyte 140 and generates from the mixture (water 102 and electrolyte 140 which improves the conductivity of the water (lower resistance between the electrodes, enabling better electrical current flow between the electrodes) and as such aqueous ozone production) an ozonated concentrate liquid 118. Such aqueous ozone production can be by way of an electrochemical generator 516. The electrochemical generator 516 can be integrated into the aqueous ozone generator 530. Additionally, the electrochemical generator 516 can comprise an ion exchange material 534 that facilitates ozone molecule formation/production. In operation, the aqueous ozone generator 530 can use electrolysis in combination with the ion exchange material 534, other coatings, electronic control signals, pulse width modulation, and/or other techniques, technologies, and signal processing to produce an ozonated concentrate liquid in the range of 1 part per million ozone (ppm) or other desired lower limit to 10 ppm or other desired upper limit depending on several factors. Such factors can include the aqueous ozone generator 530, electrochemical generator 516 construction, the quantity of ozonated concentrate liquid 118 produced at a time, the amount of time allowed (dwell time) for the aqueous ozone generator 530 to produce the ozonated concentrate liquid 518, the amount of electrical current passed between electrodes (enhanced by the electrolyte 140) and the surface area of the electrodes, and other factors.

While the type and kind of components in the aqueous ozone generator 530 and in particular the electrochemical generator 516 are selected to promote a maximum service life of the electrochemical generator 516, the process of making ozonated concentrate liquid 118 can consume certain of the materials in the aqueous ozone generator 530 and/or the electrochemical generator 516 thus there is a useful service life of the aqueous ozone generator 530 that needs to be monitored.

In addition, during normal use of the aqueous ozone generator 520 and/or electrochemical generator 517, the type or kind of water used in the generator can influence aqueous ozone production (quantity and production rate) as well as create undesirable scaling of the electrodes which to can adversely impact the production of ozonated concentrate liquid 118.

In an exemplary embodiment, the control system 500 by way of an electrical current sensor 520 can monitor and adjust the electrical current pass between electrodes. In this regard, adjustments to the amount of electrical current supplied to the aqueous ozone generated to overcome minor degradation of consumable electrodes, and other factors that would normally and through the water during aqueous ozone production.

While adjusting the electrical current aids in the generation of consistent and reliable aqueous ozone production at desired ppm concentrations, the control system 500 can determine how much it has to compensate over a nominal state, such as when the aqueous ozone generator 530 was newly installed. Such electrical current monitoring and adjustment details can be reported or otherwise data communicated, by way of communication interface 508, to a remote data processing resource 702 such as a server 702. Such monitoring and tracking of electrical current use and changes over time plus other factors can be used to predict the service life of the aqueous ozone generator 530 and provide notifications to technicians 302 or administrators 304 when it is time to schedule maintenance and/or replacement of the aqueous ozone generator 530.

In addition to predictive maintenance and service life notifications of the aqueous ozone production components, changes in water 102 quality, or detection of water mineral scale buildup on the aqueous ozone generator 530 components can be detected and technicians 302 or administrators 304 can be notified to take the necessary corrective action.

In operation, the predetermined post-hygienic ozone treatment concentration is selected to achieve sterilization or near sterilization conditions, achieving oxidation levels in the range of 5 log reduction in pathogens on the food and food preparation surfaces 204.

Figure 3:
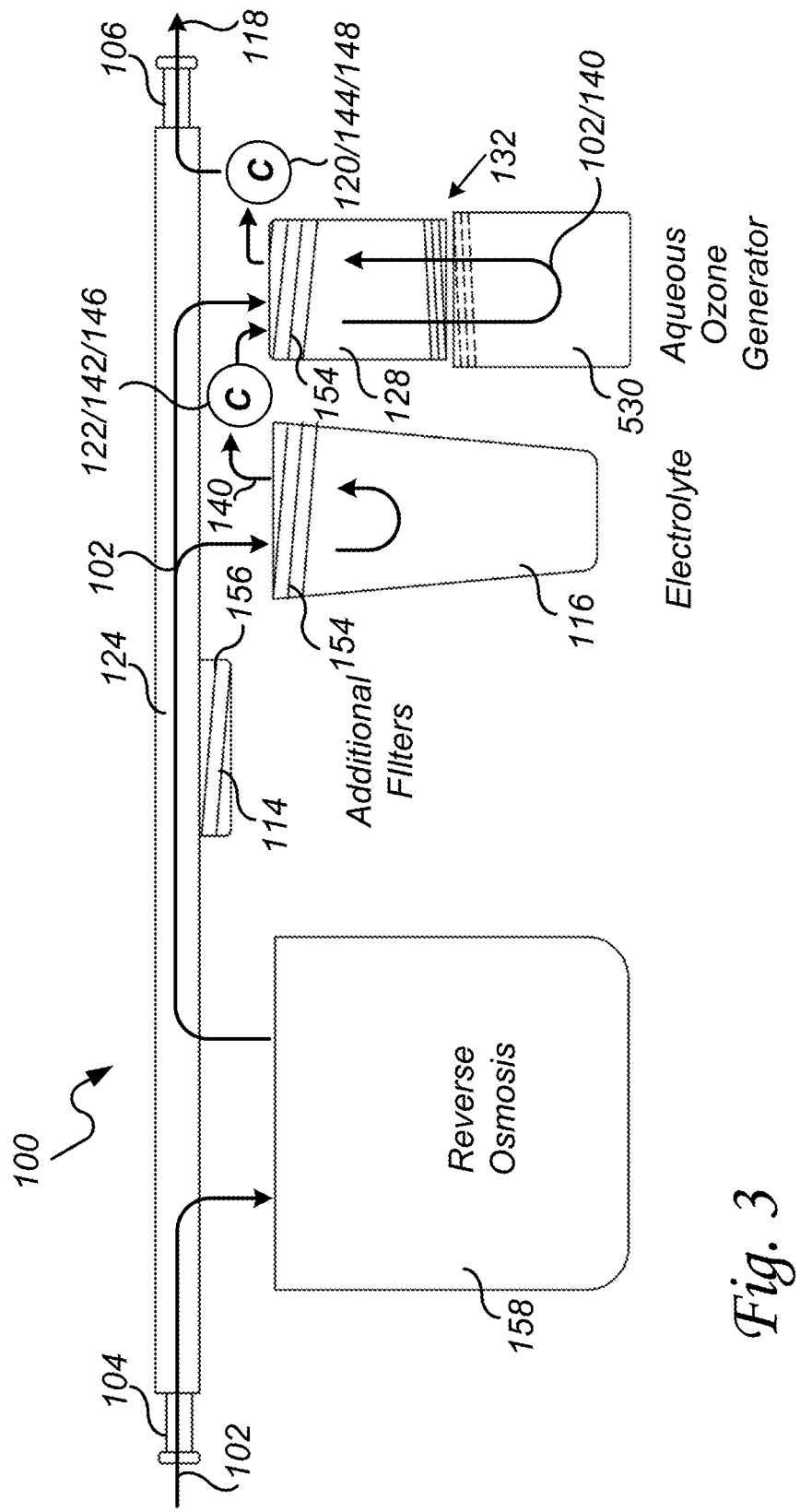

In an exemplary embodiment, and with reference to FIGS. 1-3, an aqueous ozone disinfection system 100 can comprise an aqueous ozone generator 530 that receives water 102 and an electrochemical medium catalyst 140 such as an electrolyte that is combined forming a mixture. As desired, a manifold 124 can provide fluid connectivity to a series of filters 108/110/112 as well as the electrochemical medium catalyst cartridges 116 and the aqueous ozone generator 530. At least FIG. 2B illustrates that the aqueous ozone generator can be separated from the manifold by being fluidly connected. FIG. 3 illustrates that different kinds of water filtration technology such as reverse osmosis devices 158 or other devices can be interconnected with the present invention. In a plurality of exemplary embodiment, combinations of filters 108/110/112, reverse osmosis devices 158, or other water purification and/or filtration devices can be interchangeably used with the present invention.

In operation, such filters and devices can be connected in series, as needed, allowing source water to ingress and egress from each connected filter 108/110/112, and devices 158 to process the inlet water. Once processed, the water 102 then progresses through the electrochemical medium catalyst 140 cartridges and aqueous ozone generator. The manifold 124 can aid in easy connection and disconnect of these filters 108/110/112/devices 158/electrochemical medium catalyst cartridges 116/aqueous ozone generator 530, as may be required and/or desired in a particular embodiment.

In an exemplary embodiment, and better illustrated in at least FIG. 4, the aqueous ozone disinfection system 100 can further comprise an electrochemical generator 516. The electrochemical generator 516 operates on the mixture of water 102 and the electrochemical medium catalyst 140 to produce aqueous ozone. In this regard, the electrochemical generator 516 can comprise an ion exchange material 534. The electrochemical generator can be integrated into the aqueous ozone generator 530. In operation, the electrochemical generator 516 receives the mixture of water and electrochemical medium catalyst 140 and generates from the mixture an ozonated concentrate liquid.

In an exemplary embodiment, and with reference to FIGS. 1-3 and 5-6, the aqueous ozone disinfection system 100 can also comprise an electrochemical medium catalyst governor 122/142/146. The electrochemical medium catalyst governor 122 regulates the ratiometric mixture of the amount of the electrochemical medium catalyst 140 in the water 102. In this regard, a ratiometric mixture (electrochemical medium catalyst-electrolyte to water) controls the conductivity of the water 102, within a desired conductivity range 430, enhancing electrochemical production of aqueous ozone by the electrochemical generator 516.

In an exemplary embodiment, a flow governor 120/144/148 regulates an aqueous ozone production dwell time which is the amount of time the mixture is inside the aqueous ozone generator 530 being operated on by the electrochemical generator 516. In this regard, the dwell time is the amount of time (aqueous ozone generation time) it takes a portion of the mixture to pass through the electrochemical generator 516. In operation, the dwell time controls an ozone concentration level of the ozonated concentrate liquid within a desired ozone concentration range 440.

In an exemplary embodiment, and with reference to FIGS. 2A-B, and 3, the electrochemical medium catalyst governor 122/142/146 can be positioned to control the amount of electrolyte to flow into the aqueous ozone generator 530. Additionally, the flow governor 120/144/148 can be positioned to control the mixture (water and electrolyte) flow rate (dwell time) through the aqueous ozone generator 530.

In an exemplary embodiment, the electrochemical medium catalyst 140 can be an electrolyte. Such an electrolyte can be potassium bicarbonate KHCO3 or other suitable electrolytes such as Potassium Carbonate (K2CO3), Potassium Citrate, Sodium Bicarbonate (Baking Soda-NaHCO3), or others. For disclosure purposes potassium bicarbonate KHCO3 can also be referred to as potassium hydrogen carbonate, or potassium acid carbonate.

In an exemplary embodiment, preferably potassium bicarbonate can be used. Potassium bicarbonate is an alkaline mineral. The FDA recognizes potassium bicarbonate as a safe substance in bottled water when used appropriately. There are no adverse side effects of this substance in bottled water. Potassium bicarbonate decomposes into $HCO_3^-$, $K^+$, $OH^-$, etc., in an aqueous solution. It is cheaper and more easily soluble in water than food additives containing phosphorus, and used in meat and meat products, dough, and other foods to improve their processing characteristics and flavor.

For disclosure purposes, electrochemical medium catalyst 140 can also be referred to as electrolyte 140.

With reference to FIG. 5, there are illustrated examples of electrochemical medium catalyst governors 122/144/148 controlling the flow of electrolyte 140 and flow governors 120/142/146. In an exemplary embodiment, governers 120/122 can be an electronic pump/valve/orifice control, each 120/122 of which can be automatically adjusted by way of control system 500. Governers 142/144 can be a fixed adjust washer style with variable size orifice that self-regulated with fluid pressure. Governors 146/148 can be manually adjustable style allowing a technician 302 or other authorized person to manually adjust the dosing rate of the electrolyte 122/142/146 into the water 102 and the mixture of the water and the electrolyte flow rate 120/144/148 controlling the dwell time of the mixture within the aqueous ozone generator 530 in a continuous flow manner. Additionally, other types or kinds of suitable governors can be used, as may be required and/or desired in a particular embodiment.

In operation, in an exemplary embodiment, the flow governor can be an orifice washer 142 and can have an orifice hole 152 therethrough through which the flow rate of the mixture (102A+140A) flows through (102B+140B) through the electrochemical generator 516 is controlled. The diameter of the orifice hole 152 can be decreased, resulting in increasing the aqueous ozone production dwell time 442 of the mixture through the electrochemical generator 516, which increases the ozone concentration level of the ozonated concentrate liquid to be within the desired ozone concentration range 440. The diameter can also be increased as appropriate to modulate the ozonated concentration level.

Additionally, an electrochemical medium catalyst governor can be an orifice washer 144 and can have an orifice hole 152 therethrough through which the electrochemical medium catalyst flows 140A/140B. The diameter of the orifice hole 152 can be increased responsive to a decrease in conductivity of the water resulting in an increase in conductivity of the water 102A to within the desired conductivity range 430.

The diameter can also be decreased as appropriate to modulate the conductivity of the water 102 or mixture 102/140.

In another exemplary embodiment, the flow governor 146 can be a manually adjusted valve that has a valve opening therethrough through which the flow rate of the mixture (102A+140A) through (102B+140B) the electrochemical generator 516 can controlled. The diameter of the valve opening can be decreased, by adjusting the manually adjusted valve, resulting in increasing the aqueous ozone production dwell time 442 of the mixture (102+140) through the electrochemical generator 516, which increases the ozone concentration level of the ozonated concentrate liquid to be within the desired ozone concentration range 440. The diameter can also be increased as appropriate to modulate the ozonated concentration level.

In an exemplary embodiment, the electrochemical medium catalyst governor 148 can be a manually adjusted valve that has a valve opening through which the electrochemical medium catalyst flows 140A/140B. In this regard, the valve can be opened to increase, by adjusting the manually adjusted valve 148, responsive to to a decrease in conductivity of the water 102, resulting in an increase in conductivity of the water 102 to within the desired conductivity range 430. The diameter can also be decreased as appropriate to modulate the conductivity of the water 102 or mixture 102/140.

In an exemplary embodiment, the aqueous ozone disinfection system can comprise a manifold 124. The manifold can comprise an inlet 104 that is connected to a source water 102 and more than one cartridge receiving adapter 114. Additionally, an electrolyte cartridge 116 can comprise the electrochemical medium catalyst 140. The electrolyte cartridge 116 can attach to one of the cartridge receiving adapters 114, receive a portion of the water 102, and discharge the electrochemical medium catalyst 140 into the water 102.

Referring to FIG. 4, there is illustrated one example of a control system 500 for an aqueous ozone disinfection system 100. In an exemplary embodiment, control system 500 can be integrated into and be responsive to food washing and food preparation area 204 needs including on-demand and continuous flow of ozonated water for food wash disinfection and food preparation 204 disinfection. In addition, control system 500 can be a web-enabled control system.

The term "web-enabled" or "web-enabled control system" or "web-enabled control system 500" in the present invention is intended to mean an Internet-of-things device. In this regard, a device that is capable of connecting a physical device such as an aqueous ozone disinfection system to the digital world. Stated differently, web-enabling is equipping a device with the necessary electronics to be monitored, and controlled, and data communicate locally and remotely with other data-communicating devices. Such other data-communicating devices can be smartphones, tablets, laptops, mobile communication devices, other web-enabled devices, remote data processing resources, servers, and similar devices.

In addition, and with reference to at least FIG. 11, such data communicating devices 732 can data communicate with remote data processing resources 702 and store and retrieve data from databases 706A-C, and other data processing resources, as may be required and/or desired in a particular embodiment. Laptops, smartphones, smartwatches, tablets, desktop computers, servers, mobile communication devices, and other types and kinds of data communication devices can all be data communicating devices 732 also referred to as computing devices 732.

In operation, a technician 302, an administrator 304, or other authorized people can use computing device 732 to interact with the aqueous ozone generator 100. In this regard, a technician 302 can be a person who operates, maintains, cleans, configures, repairs, and performs other functions on or with the aqueous ozone generator 100 or food wash and/or food preparation surfaces/areas 204. An administrator 304 can be a person who administers, provides remote service or technical support, or be other types or kinds of authorized user, as may be required and/or desired in a particular embodiment.

In an exemplary embodiment, technician 302 can record 736/738 ozone test results and receive data related to the aqueous ozone disinfection system 100. Such test results can be taken or otherwise generated with ozone concentration test implements 602/604/606 which can include an ozone concentration test strip 604, an ozone concentration test drops 602, or an ozone concentration test device 606 to test for dissolved ozone, or other types and/or kinds of ozone concentration test implement. Technician 302 can manually enter the test results in a computing device 732A/B. As better illustrated in at least FIG. 13, a software application or website can be used in combination with the computing device 732A/B to identify the aqueous ozone disinfection system 100, record the test results, and see other useful data by way of data communicating with a remote data processing resource 702. In some embodiments, certain ozone concentration test devices 606 may have the ability to data communicate 734 directly with a remote data processing resource 702, eliminating the need for computing device 732A/B to act as an intermediary device to record test results on the remote data processing resource 702.

Such data processing resources can be servers or other types and kinds of data processing resources. Furthermore, data communicating devices 732, remote data processing resources 702, data storage resources 706A-C, and other types and kinds of data communicating devices can data communicate over a global network 700. The Internet is a global network 700.

In an exemplary embodiment and with reference to at least FIG. 2B, the aqueous ozone generator 100 can be equipped with a web-enabled control system 500. Such a web-enabled control system 500 can comprise a microcontroller 502 which is operationally related to a memory 504, a display 506, a plurality of communication interfaces 508, general purpose input and outputs (GPIO), a plurality of sensors 512, a global position system (GPS) 514, an electrochemical generator 516, a plurality of motion sensors 518, a plurality of electrical current sensors 520, a plurality of ozone sensors 522, an accelerometer 524, a power supply 526, one or more TDS Sensor, one or more water conductivity sensor, a plurality of pumps/valves 528A-B, an aqueous ozone generator 530, and a produce agitator controller 538. Additionally, the produce agitator controller 538 is operationally related to an ultrasonic vibrator 540, a vibrator 542, an airflow blower 544, and a spinning motor 546.

The microcontroller 502 can be INTEL, ZILOG, MICROCHIP, AMD, ARM, and/or other types or kinds of microcontrollers.

The memory 504 can be a combination of RAM, ROM, flash, hard drives, solid-state drives, USB flash drives, and/or other types and kinds of memory.

The display 506 can be an LCD, OLED, LED, as well as have touch input capabilities and/or other types and kinds of displays and user inputs as may be required and/or desired in a particular embodiment.

The communication interface 508 can be LAN, WAN, USB, Ethernet, RS232, RS485, serial, WiFi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

In an exemplary embodiment, the communication interface 508 is operationally related to the microcontroller 502. The control system by way of the communication interface 508 data communicates with the remote data processing resource 702, data communication devices 732, and other data processing resources in a local area network environment or a wide area network environment across a global network 700 in a wired or wireless manner as may be required and/or desired in a particular embodiment. The Internet is a global network 700.

The GPIO 510 can be TTL, CMOS, transistors, buffers, relays, pushbuttons, switches, and/or other types and kinds of GPIO circuits.

The sensors 512 and/motion sensor 518 can be passive infrared (PIR) motion sensors, infrared, thermal, Doppler radar, ultrasonic, capacitance, touch-type, optical, Hall effect, switch, fingerprint, and other types of biometric sensors, and/or other types and kinds of sensors. Additionally, sensor 512 can be ambient condition sensors such as temperature, moisture, humidity, sunlight, and/or other types and kinds of sensors.

In an exemplary embodiment, analog-type sensor determinations can be converted to digital values so that the microcontroller 502 can process the data. Alternatively, the microcontroller 502 can perform analog-to-digital conversions if equipped to perform such functions.

The electrochemical generator 516 can be an electrolysis-based device that utilizes ion exchange material 534 and other devices and processes to produce chemical compounds from water such as ozone $O_3$.

The current sensor 520 can be configured to measure the supply electrical current to the electrochemical generator 516, the aqueous ozone generator 530, a combination 516/530 thereof, and/or other devices and systems, as may be required and/or desired in a particular embodiment.

The ozone sensor 522 can be configured to monitor the ozone concentration of the ozonated concentrate liquid 118, as may be required and/or desired in a particular embodiment.

The accelerometer 524 can be configured to monitor the motion systems and devices, as required and/or desired in a particular embodiment.

The power supply 526 can be AC, DC, battery, solar, and/or other types and kinds of power supplies.

The total dissolved solids (TDS) sensor 532 can be a conductivity-based sensor or other types or kinds of TDS sensor, as may be required and/or desired in a particular embodiment.

The water conductivity sensor 536 can be a contacting, inductive, or other types or kinds of TDS sensor, as may be required and/or desired in a particular embodiment.

For disclosure purposes, the ultrasonic vibrator 540, mechanical vibrator 542, airflow blower 544, spinning motor 546, and any other suitable mechanisms that are used to dislodge the ozonated concentrate liquid 118 from the surface of the produce can be collectively referred to as produce agitation 548. These components, individually or in combination, provide various methods of agitation to accommodate different types of produce and ensure effective drying and dislodging of residual liquid. The specific type of produce agitation 548 employed is selected based on the characteristics of the produce being treated, allowing for flexibility and adaptability in the system.

The ultrasonic vibrator 540 is integrated into the system to provide high-frequency vibration within the immersion container 154, designed to enhance the ozonated concentrate liquid 118 in dislodging contaminants from the surface of the produce while it remains submerged. The ultrasonic vibrator 540 is controlled by the produce agitator controller 538, allowing it to be precisely activated during the immersion phase to create additional agitation in the ozonated concentrate liquid 118.

When activated, the ultrasonic vibrator 540 generates high-frequency sound waves that propagate through the ozonated concentrate liquid 118. These sound waves create rapid pressure changes in the liquid, forming microscopic bubbles that collapse near the surface of the produce in a process known as cavitation. This cavitation effect increases the agitation of the liquid surrounding the produce, ensuring more thorough contact between the ozonated concentrate liquid 118 and the produce's surface, particularly in hard-to-reach areas such as crevices or irregular surfaces.

The benefits of using the ultrasonic vibrator 540 during immersion are significant:

Enhanced Disinfection: The ultrasonic vibration improves the penetration of the ozonated concentrate liquid 118 into micro-crevices and other areas of the produce, where contaminants such as bacteria or pesticides may reside. This results in more thorough disinfection compared to passive immersion alone;

Improved Liquid Coverage: The cavitation process helps the ozonated concentrate liquid 118 spread more evenly across the produce's surface, ensuring that all parts of the produce are uniformly exposed to the disinfection process. This is particularly beneficial for delicate or irregularly shaped produce;

Reduced Treatment Time: The increased agitation caused by the ultrasonic vibrator 540 can reduce the time needed for effective disinfection, as the enhanced liquid movement accelerates the interaction between the ozonated concentrate liquid 118 and the contaminants on the produce; and Gentle Treatment for Delicate Produce: Despite the powerful dislodging effect, ultrasonic vibration is gentle enough to be used on fragile produce without causing physical damage to the surface or tissue. This makes it especially suitable for delicate fruits and vegetables that may not tolerate more aggressive physical agitation methods like spinning; and By using the ultrasonic vibrator 540, the system provides an additional level of precision in controlling the disinfection process, ensuring that the ozonated concentrate liquid 118 is able to thoroughly interact with the produce, leading to superior cleaning and revitalization results.

The mechanical vibrator 542 is designed to provide post-immersion agitation for the drying platform 172, controlled by the produce agitator controller 538. This component is activated after the ozonated concentrate liquid 118 has drained from the immersion container 154 and during the delayed drying period. The mechanical vibrator 542 applies gentle, controlled vibrations to the drying platform 172, effectively dislodging any remaining ozonated concentrate liquid 118 from the surface of the produce.

The mechanical vibration ensures that excess liquid is removed without the need for physical contact or manual handling, reducing the risk of damaging the produce. The following are key benefits of the mechanical vibrator 542:

Efficient Liquid Removal: Once the immersion process is complete and the ozonated concentrate liquid 118 has drained, the mechanical vibrations dislodge residual liquid that may still cling to the produce, ensuring that the produce is adequately dried without pooling liquid on its surface;

Adaptability for Different Produce Types: The mechanical vibrator 542 is particularly effective for produce that may not tolerate more dynamic liquid removal methods, such as spinning. For firmer fruits like apples, the vibrations are gentle yet effective, preventing bruising while ensuring proper drying;

Prevention of Mold and Spoilage: By removing remaining moisture, the mechanical vibrations help prevent the buildup of moisture, which can lead to spoilage or mold growth. This is particularly important during the delayed drying period, where liquid could otherwise linger on the produce;

Enhanced Produce Quality: The vibrations ensure that the produce retains its visual and textural quality, as any remaining ozonated concentrate liquid 118 is dislodged without causing damage to the surface or tissue. This preserves the integrity and freshness of the produce, especially for delicate items that require careful handling during drying;

Hands-Free Operation: The mechanical vibrator 542 operates automatically under the control of the produce agitator controller 538, eliminating the need for manual drying techniques such as wiping or blotting. This not only improves efficiency but also reduces labor requirements in commercial settings; and Consistency in Liquid Removal: The controlled vibrations ensure uniform liquid removal across the surface of the produce, reducing the likelihood of uneven drying or moisture retention. This consistency is important for maintaining high-quality results across different batches of produce.

The mechanical vibrator 542 offers an effective solution for removing residual ozonated concentrate liquid 118 during the drying phase, particularly for produce that benefits from stationary, gentle agitation. This feature ensures that produce is thoroughly dried and prepared for storage or use, without compromising its quality.

The airflow blower 544, controlled by the produce agitator controller 538, is employed during the final stages of the drying process to ensure thorough removal of residual ozonated concentrate liquid 118 from the surface of the produce. After the ozonated concentrate liquid 118 has drained from the immersion container 154 and at the end of the delayed drying period, the airflow blower 544 generates a steady airstream directed at the produce on the drying platform 172. To maximize the effectiveness of the airflow, the spinning motor 546 can be activated to slowly rotate 174 the drying platform 172, ensuring that the airstream reaches all sides of the produce for even and consistent drying.

The use of the airflow blower 544 and spinning motor 546 provides several key benefits:

Efficient Drying: The airstream produced by the airflow blower 544 accelerates the evaporation of the remaining ozonated concentrate liquid 118, ensuring that the produce is adequately dried in a shorter time. This reduces the risk of moisture-related spoilage, especially in environments where produce must be processed quickly;

Uniform Airflow Coverage: By rotating the drying platform 172 with the spinning motor 546, the system ensures that the airstream reaches all sides of the produce, including areas that may otherwise retain moisture. This uniform airflow coverage helps prevent uneven drying, which could lead to lingering moisture in hard-to-reach areas of the produce;

Preservation of Produce Quality: The airflow blower 544 provides a non-invasive method of drying the produce, reducing the need for physical contact that could damage delicate items. The gentle airflow is sufficient to remove excess liquid without affecting the texture or appearance of the produce, making it ideal for fragile fruits and vegetables;

Prevention of Mold and Spoilage: By efficiently removing any remaining ozonated concentrate liquid 118, the airflow system helps prevent moisture accumulation on the surface of the produce. This minimizes the risk of mold growth or spoilage, ensuring that the produce retains its freshness during storage or further processing;

Flexible Operation: The combination of the airflow blower 544 and spinning motor 546 is versatile, allowing for adjustment based on the type of produce being treated. For leafy greens like lettuce, a slow rotation of the drying platform 172 ensures thorough drying without damaging the delicate leaves. For firmer produce, such as apples, the airflow system works equally well without needing significant rotation; and Hands-Free and Efficient Drying: The entire drying process can be automated under the control of the produce agitator controller 538, eliminating the need for manual intervention. This not only improves efficiency in high-volume commercial settings but also ensures a consistent drying process across multiple batches of produce.

The combination of the airflow blower 544 and the spinning motor 546 provides a reliable and effective method for removing residual ozonated concentrate liquid 118 from produce surfaces. This ensures that the produce is optimally prepared for storage or immediate use, with high-quality results maintained throughout the drying process.

The spinning motor 546, controlled by the produce agitator controller 538, is utilized after the ozonated concentrate liquid 118 has drained from the immersion container 154 and during the final stages of the delayed drying period. The spinning motor 546 rotates 174 the drying platform 172—which may be configured as a basket, platform, or other suitable container—at a controlled speed, creating sufficient centrifugal force to effectively dislodge any remaining ozonated concentrate liquid 118 from the surface of the produce.

This spinning process offers a highly efficient method for removing excess liquid, particularly for leafy green produce such as lettuce, which tends to retain moisture on its broad, uneven surfaces. The following are key benefits of using the spinning motor 546:

Effective Liquid Displacement via Centrifugal Force: The spinning motor 546 spins the drying platform 172 at a sufficient RPM to generate centrifugal force, causing the remaining ozonated concentrate liquid 118 to be propelled off the surface of the produce. This process ensures that moisture is efficiently removed without the need for manual handling or contact;

Ideal for Leafy Produce: Leafy greens like lettuce, which have large, flat surfaces that easily retain water, particularly benefit from this spinning method. The centrifugal force effectively dislodges liquid from the crevices and folds of the leaves, leaving the produce well-dried and fresh for further processing or storage;

Quick Drying Process: The spinning method allows for rapid drying, significantly reducing the time needed to remove the ozonated concentrate liquid 118. This is especially valuable in high-volume processing environments where time efficiency is crucial;

Minimal Physical Contact: The use of centrifugal force eliminates the need for physical drying methods, such as wiping or blotting, which can damage delicate produce. By keeping the drying process hands-free, the system ensures that the quality and structural integrity of the produce are maintained;

Consistent Drying Results: The spinning motor 546 ensures that the drying platform 172 rotates evenly, providing consistent drying across the entire surface of the produce. This is particularly important for items like lettuce, where uniform drying prevents pooling of liquid and helps maintain freshness;

Reduced Risk of Spoilage: By thoroughly dislodging excess liquid, the spinning process helps prevent moisture buildup that can lead to mold or spoilage. The complete removal of liquid ensures that the produce retains its freshness for a longer period, making it ideal for commercial processing or retail use; and Adaptable for Various Produce Types: While the spinning motor 546 is particularly well-suited for leafy produce, it can be adapted to different speeds or configurations based on the type of produce being treated. This versatility allows the system to accommodate a wide range of fruits and vegetables, ensuring optimal performance across different applications.

The spinning motor 546 provides an efficient, non-invasive drying solution, particularly for produce like lettuce, where centrifugal force effectively removes moisture. This feature ensures high-quality drying results, with the added benefits of speed, consistency, and preservation of produce integrity.

The pumps and/or valves 528A-B, in addition to performing their fluid handling tasks, can be actuated and/or controlled by way of a relay, MOSFET, or other types and kinds of controlling devices. In addition, other pumps and/or valves 528/532 can be integrated into the system as may be required and/or desired in a particular embodiment.

The aqueous ozone generator 530 receives water 102 and electrolyte 140 as an input and uses the electrochemical generator 516 which is integrated into the aqueous ozone generator 530 to produce high concentrations of aqueous ozone molecules. Such concentrations of aqueous ozone can range from 1 ppm to 10 ppm or other desired range, as may be required and/or desired in a particular embodiment.

In an exemplary embodiment, a user interface for the aqueous ozone disinfection system 100 comprises at least one of the following a display 506, a display 506 with touchscreen, a communication interface 508 configured to data communicate with a remote data processing resource 702 such as a server 702 and/or a computing device 732.

The user interface for the aqueous ozone disinfection system 100 can further comprise a plurality of button input capabilities by way of the GPIO 510, or other user interfaces. The user interface is operationally related to the microcontroller 502.

In an exemplary embodiment, and with reference to FIG. 4, the aqueous ozone disinfection system 100 can comprise a control system 500. The control system 500 can comprise a microcontroller 502, a memory 504, the electrochemical generator 516, a first orifice control 528B which controls the diameter of a first orifice through which the electrochemical medium catalyst 140 flows, and a second orifice control 528A which controls the diameter of a second orifice through which the flow rate of the mixture (water 102+electrochemical medium catalyst 140) through the electrochemical generator 516 is controlled. The microcontroller 502 is operationally related to the memory 504, the electrochemical generator 516, the first orifice 528B, and the second orifice 528A.

In operation, the memory 504 can be encoded with instructions that when executed by the microcontroller 502 perform the steps of increasing the diameter of the first orifice by way of the first orifice control 528B, responsive to a decrease in conductivity of the water 100, resulting in an increase in the conductivity of the water 102 to within the desired conductivity range 430.

The steps continue by decreasing the diameter of the second orifice by way of the second orifice control 528A, resulting in an increase in the aqueous ozone production dwell time 442 of the mixture through the electrochemical generator 516, which increases the ozone concentration level of the ozonated concentrate liquid 118 to be within the desired ozone concentration range 440.

In another exemplary embodiment, the control system can comprise an ozone sensor 522 and a water conductivity sensor 536. The ozone sensor 522 and the water conductivity sensor 536 can be operationally related to the microcontroller 502. In operation, the memory can be encoded with instructions that when executed by the microcontroller perform the steps of determining the conductivity of the water 102 by way of the conductivity sensor 536 and determining the ozone concentration level of the ozonated concentrate liquid 118 by way of the ozone sensor 522. In this regard, both the water conductivity of the water and/or mixture (water 102+electrolyte 140) and the ozone concentration of the concentrated ozone liquid 118 can be determined by sensors, as may be required and/or desired in a particular embodiment.

In an exemplary embodiment, the control system 500 can comprise a communication interface 508 that is operationally related to the microcontroller 502. The memory 504 can be encoded with instructions that when executed by the microcontroller 502 perform the steps of data communication, by way of the communication interface 508, the ozone concentration level of the ozonated concentrate liquid 118, or conductivity of the water 102 or the mixture (water 102+electrolyte 140) to a remote data processing resource 702. The steps continue by receiving, from the remote data processing resource 702, by way of the communication interface 508 a plurality of aqueous ozone generator service life data. Such service life data can include install date, installed equipment, location, number of service hours, other operating conditions, and other types and/or kinds of service life data, as may be required and/or desired in a particular embodiment.

Referring to FIG. 6, there is illustrated one example of the relationship between water conductance 420, electrical current 422, and ozone concentration 424 of the concentrated ozone liquid. In an exemplary embodiment, there is an optimal range 426 between water conductance 420, electrical current 422 that flows between the electrochemical generator electrodes through the water, and ozone concentration 424.

In reference 'A', since input water conditions can vary and soft water (low ions) can be particularly difficult to work with, the present invention can dose an electrolyte 140 adding ions 428 into the water 102 to improve water conductivity, keeping it within a desired conductivity range 430.

In reference 'B', the control system 500 including the electrochemical generator 516 is designed to operate between a minimum and a maximum operating range 434 of electrical current that passes through the water mixture.

In reference 'C', the desired ozone ppm range 440 of the ozonated concentrate liquid 118 is selected to achieve the desired disinfection level and/or desired log reduction. As an example and not a limitation, ozonated concentrate liquid 118 with a concentration level between a minimum 0.5 ppm and a maximum 1.5 ppm is often desired for food wash and food preparation surface 204 disinfection, though other concentrations can be selected, as may be required, and/or desired in a particular embodiment. To adjust the ozonated concentration 438A-C the mixture 102/140 flow rate can be adjusted 442. In this regard, decreasing the flow rate allows the electrochemical generator 516 to operate on each portion of the mixture 102/140 longer increasing 438A the aqueous ozone concentration. Conversely, increasing the flow rate of the mixture 102/140 reduces the amount of time the electrochemical generator 516 has to operate on each portion of the mixture 102/140, decreasing 438C the aqueous ozone concentration.

In operation, the control system 500 and electrochemical generator 516 can modulate the current 436 flow through the mixture 102/140 between the minimum and maximum. In this regard, automatically adjusting, in a constant current manner, based on the conductance of the mixture 102/140.

The variable of water conductance is managed by the dosing of the electrolyte 140. As the electrical current applied by the electrochemical generator 156 begins to reach the maximum operating range 434, the control system 500 and/or orifice setting of the electrolyte 140 can be changed to add more electrolyte to the water improving mixture conductance and the control system can reduce or other modulate the electrical current applied to the mixtures to operate in range. Conversely, too much electrolyte is not needed, and as such dosing can be reduced as needed and the electrical current modulated accordingly.

The variable of ozone concentration can be controlled by adjusting the flow rate of the mixture 102/140 which adjusts the dwell time of the mixture passing through the aqueous ozone generator 530 including the electrochemical generator 516, in a continuous flow manner. Such can be controlled by modulating an orifice size either fixed, manual, or controlled by the control system 500 and associated pumps/valves/orifices.

During normal operation conditions, each of the water conductance 420, electrical current 422, and ozone concentration 424 are operating within the optimal range 426. When a circumstance occurs where the aqueous ozone disinfection system 100 can't compensate to keep the parameters within the optimal range 426 an alarm condition can be triggered, notifications displayed locally of the alarm condition, and the alarm condition can be data communicated remotely to a data processing resource 702. Such alarm conditions can occur when the supply of electrolytes runs out, the electrochemical generator is at an end or service life, scale buildup on the electrodes prevents satisfactory operation, or for other reasons.

Figure 7:
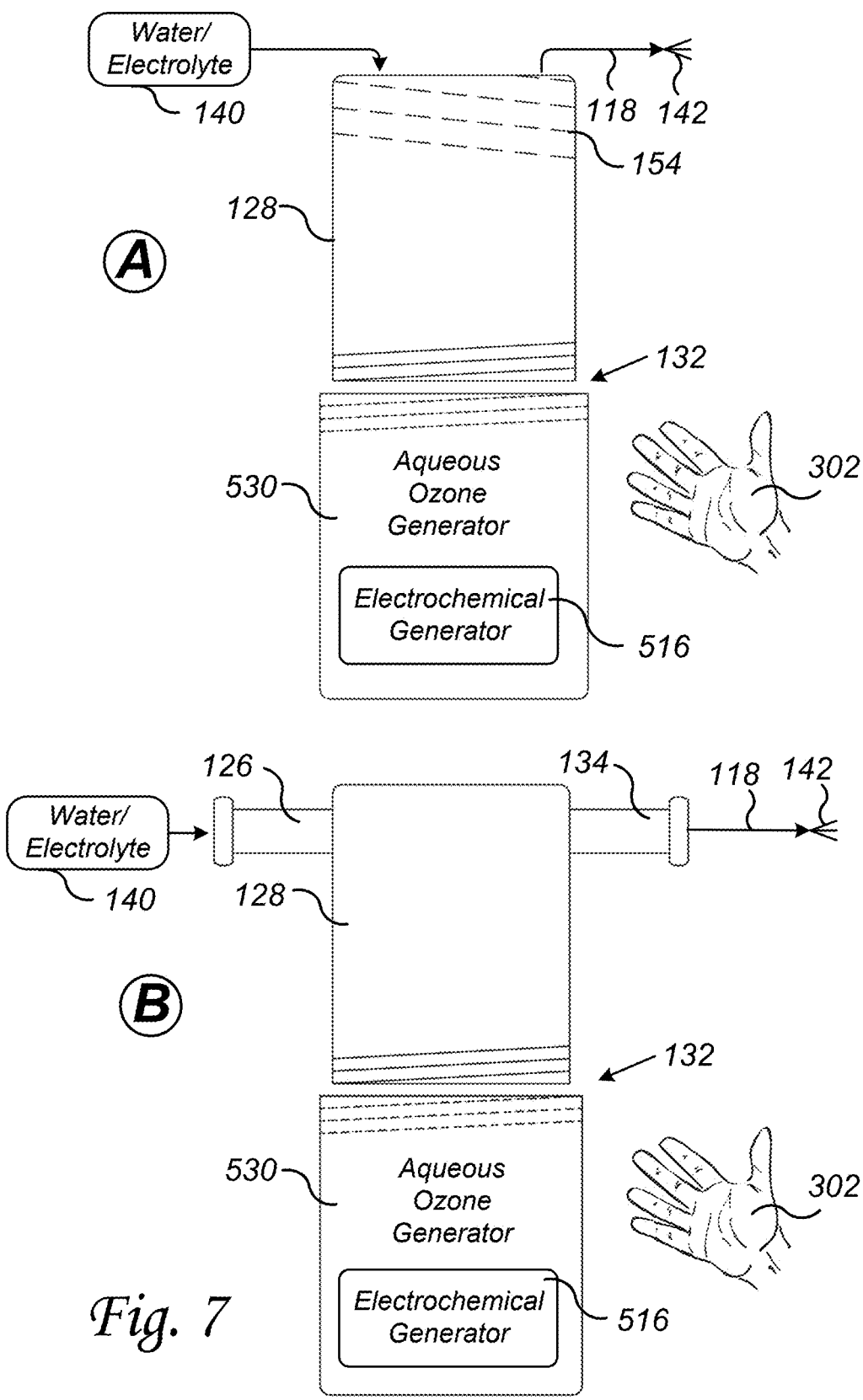
FIG. 7 illustrates one example of a plumbed housing interconnected with an aqueous ozone generator configured housing.

Referring to FIG. 7, there are illustrated examples of a plumbed housing 128 interconnected with an aqueous ozone generator 530. In an exemplary embodiment, in reference 'A' the plumbed housing 128 can be configured to attach to manifold 124 by way of a cartridge receiving adapter 114. In this regard, the filter 108/110/112, the electrochemical medium catalyst 140 cartridges, and/or the aqueous ozone generator 530 can by way of attachment threads 156/158, or other suitable methods attach, in a removable manner to the cartridge receiving adapter 114 allowing ingress and egress of fluids between the manifold and the filters/cartridges/aqueous ozone generator without leaks.

In reference 'B', In an exemplary and exemplary embodiment while some of the filters and cartridges may attached to a manifold 124 cartridge receiving adapter 114 the aqueous ozone generator 520 can be attached by inlet 126 to the manifold 124 by tube, pipe, or other suitable methods. Additionally, outlet 134 can be plumbed as necessary to deliver the concentrated ozone liquid 118 through nozzle 142 or other dispense points to effectuate food wash disinfection, food preparation surface 204 disinfection, and for other purposes, as may be required and/or desired in a particular embodiment.

In an exemplary embodiment, aqueous ozone production involves electrolysis and an ion exchange material 534 which consumes certain components and materials during the process. Thus, when the service life of the aqueous ozone generator 530 and/or electrochemical generator 516 is over the generators 516/530 need to be replaced. To ease and speed generator 516/530 exchange by technician 302 a plumbed housing 128 can be permanently plumbed or otherwise fastened in place and the aqueous ozone generator 530 screwed 132 on to or otherwise fastened 132 in a removable manner to the plumbed housing 128. In this regard, the aqueous ozone generator 530 can be easily and quickly removed and exchanged for a new aqueous ozone generator 530 and electrochemical generator 516 when the aqueous ozone generator 530 and/or electrochemical generator 516 need to be replaced.

An advantage, in the present invention, is that once the plumbed housing 128 is installed and the liquid lines connected, the liquid lines don't need to be removed or disconnected to change the aqueous ozone generator 530. This saves technician 302 time, and cost, and reduces the chance of creating leaks in the system by having to disconnect/reconnect liquid carrying hoses.

In an exemplary embodiment, in operation, a plumbed housing 128 is fastened in fluid communication pathways with the inlet of the mixture (water 102+electrolyte 140) and the outlet of the ozonated concentrate liquid 118. An electrochemical generator 516 is integrated into the aqueous ozone generator 530. The electrochemical generator 516 comprises an ion exchange material 534. The aqueous ozone generator 530 is interchangeable and removably fastened to the plumbed housing 128.

In an exemplary embodiment, an electrochemical generator 516 can be integrated into the aqueous ozone generator 530. The electrochemical generator comprises an ion exchange material 534. A computing device 732, operated by technician 302, can data communicate the test ozone concentration to a remote data processing resource 702, and receive from the remote data processing resource 702, by way of the computing device 732 a plurality of aqueous ozone generator service life data that corresponds to the remaining service life 826 of the electrochemical generator 516.

In an exemplary embodiment, the aqueous ozone generator 530 can comprise a plumbed housing 128 that is fastened in fluid communication pathways with the inlet of the water 102 or the mixture 102/140 and discharge of the ozonated concentrate liquid 118. The aqueous ozone generator 530 can be interchangeable and removably fastened to the plumbed housing 128.

Figure 8:
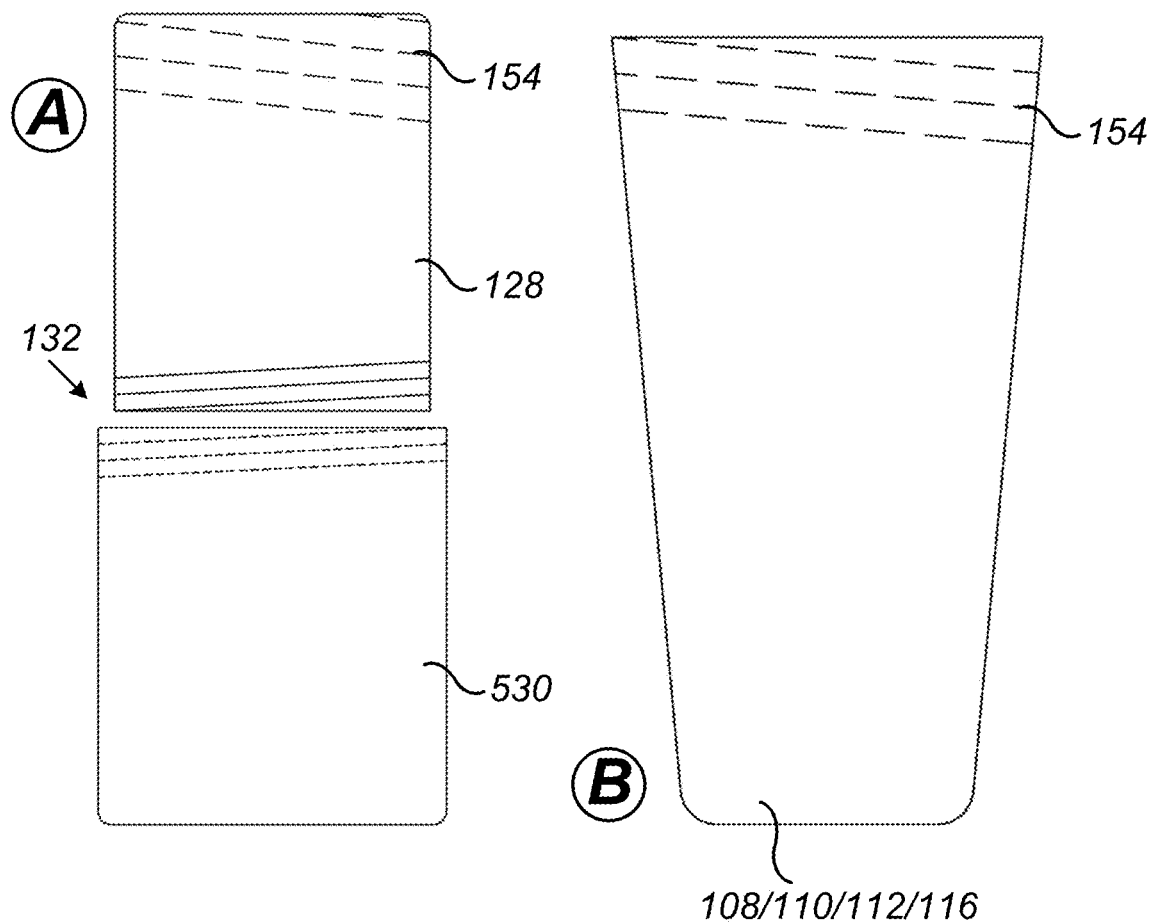
FIG. 8 illustrates examples of attaching a plumbed housing to a manifold.

Referring to FIG. 8, there is illustrated a plumbed housing 128 to a manifold. In an exemplary embodiment, in references 'A' and 'C' the aqueous ozone generator 530 plumbed housing 128 can attach 154 to the onto the manifold 124 cartridges receiving adapter 114/156 by threaded connection, lock in a bayonet style, slide on the plumbed housing and rotate to lock, or interconnect in other suitable ways, as may be required and or desired in a particular embodiment. In reference 'B', the coupling end of the plumbed housing 128/154 of the aqueous ozone generator, the cartridge receiving adapter 114/156, the filters 108/110/112/154, electrochemical medium catalyst cartridges 116/154, and other filters, devices, and components can be sized similarly and attached in a similar manner such that each can be interchangeably attached in a removable manner to the manifold 114 cartridges receiving adapter 114/156.

In an exemplary embodiment, an aqueous ozone disinfection system 100 can comprise a manifold 124. The manifold 124 can comprise an inlet 104 that receives water and more than one cartridge receiving adapter 114. Additionally, an electrolyte cartridge 116 can comprise an electrochemical medium catalyst 140. The electrolyte cartridge 116 attaches to one of the cartridges receiving adapter 114, receives a portion of the water 102, and discharges a mixture of an electrochemical medium catalyst 140 and water 102.

Continuing, an aqueous ozone generator 530 receives the mixture 102/140, and an electrochemical generator 516. The electrochemical generator 516 can comprise an ion exchange material 534. The electrochemical generator 516 can be integrated into the aqueous ozone generator 530. The electrochemical generator 516 receives the mixture 102/140 and generates from the mixture 102/140 an ozonated concentrate liquid 118.

Continuing, an electrochemical medium catalyst governor 122/144/148 regulates ratiometric mixture of the amount of the electrochemical medium catalyst 140 in the water 102, controlling the conductivity of the water 102, within a desired conductivity range 430, and enhancing the electrochemical production of aqueous ozone by the electrochemical generator 516. A flow governor 120/142/146 regulates an aqueous ozone production dwell time 442 of the mixture 102/140 through the electrochemical generator (in a continuous flow manner), controlling an ozone concentration level of the ozonated concentrate liquid 118 within a desired ozone concentration range 440.

Figure 9:
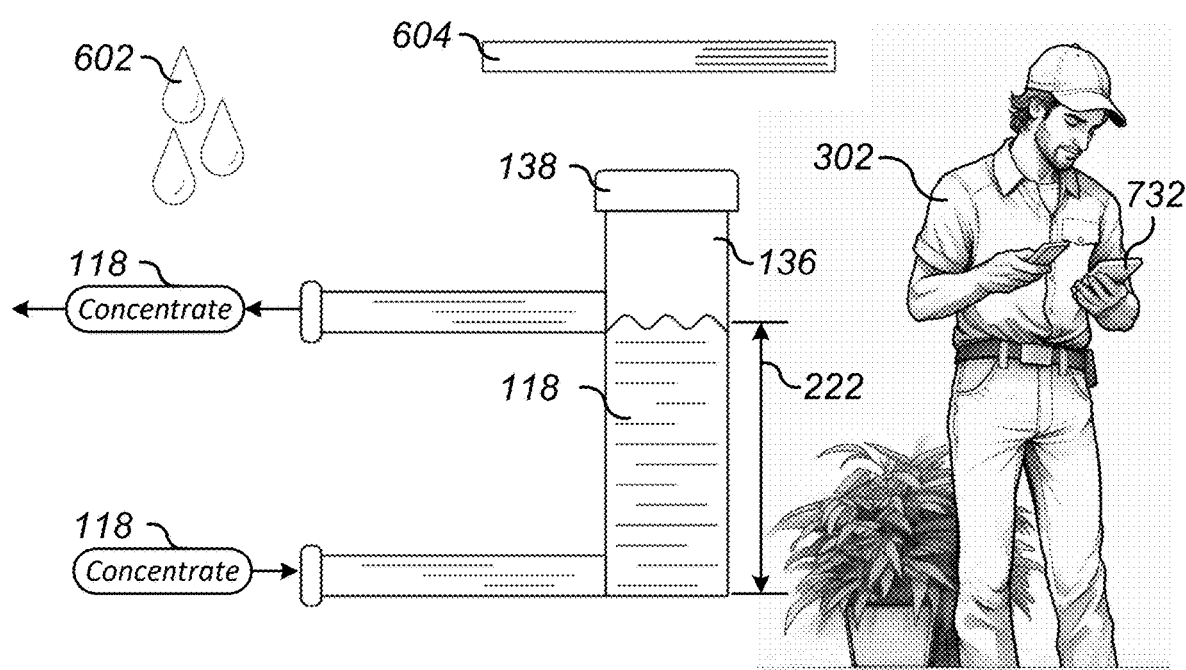
FIG. 9 illustrates one example of a fixed-volume inspection chamber.

Referring to FIG. 9, there is illustrated one example of a fixed-volume inspection chamber 136. In an exemplary embodiment, a fixed-volume inspection chamber 136 receives a continuous flow and maintains a fixed-volume portion 222 of the ozonated concentrate liquid 118, or other ozonated flow. The amount 222 of the fixed-volume is predetermined by test requirements of an ozone concentration test implement 602/604/606. Such amount 222 can be in the range of 200 milliliters (ml), or other amount as may be required and/or desired in a particular embodiment.

In a plurality of exemplary embodiments, more than one of the fixed-volume inspection chambers 136 can be used in an embodiment. In this regard, the fixed-volume inspection chambers 136 can incorporated at several places throughout the system 100 so that dissolved ozone concentrations can be checked. Such places can include ozonated concentrate liquid 118 lines or other places throughout system 100 as may be required and/or desired in a particular embodiment.

In operation, the ozone concentration test implement 602/604/606 can include an ozone concentration test strip 604, an ozone concentration test drops 602, or an ozone concentration test device 606 to test for dissolved ozone, or other types and/or kinds of ozone concentration test implement. The ozone concentration test implements 602/604/606 can be manually used by technician 302 to determine a test ozone concentration of the ozonated concentrate liquid 118 by inserting the ozone concentration implement 602/604/606 into the fixed-volume inspection chamber 136 and then reading the test ozone concentration of ozonated concentrate liquid within.

For disclosure purposes, such ozone concentration test strip 604 can be SENSAFE type or brand, MACHERY-NAGEL type or brand, or other suitable types or brands. Such ozone concentration test drops 602 can be CHEMETRICS type or brand, or other suitable types or brands.

In an exemplary embodiment, where access to the ozonated concentrate liquid 118 within the fixed-volume inspection chamber 136 is required an inspection chamber lid 138 can be configured to be open and closable as required and/or desired in a particular embodiment.

In an exemplary embodiment, a fixed-volume inspection chamber 136 receives a continuous flow and maintains a fixed-volume portion 222 of the ozonated concentrate liquid 118. The amount of the fixed-volume portion 222 is predetermined by the test requirements of an ozone concentration test implement 602/604/604.

In a plurality of exemplary embodiments, more than one of the fixed-volume inspection chambers 136 can be used in an embodiment. In this regard, the fixed-volume inspection chamber 136 can be incorporated at several places throughout system 100 so that dissolved ozone concentrations can be checked. Such places can include ozonated concentrate liquid 118 lines or other places throughout system 100 as may be required and/or desired in a particular embodiment.

In operation, the ozone concentration test implement 602/604/606 can include an ozone concentration test strip 604, an ozone concentration test drops 602, an ozone concentration test device 606 to test for dissolved ozone or other suitable ozone concentration test implement. The ozone concentration test implements 602/604/606 are manually used by technician 302 to determine a test ozone concentration of the ozonated concentrate liquid within the fixed-volume inspection chamber 136 by inserting the ozone concentration implement 602/604/606 into the fixed-volume inspection chamber 136 and then reading the test ozone concentration of ozonated concentrate liquid 118 within.

Figure 13:
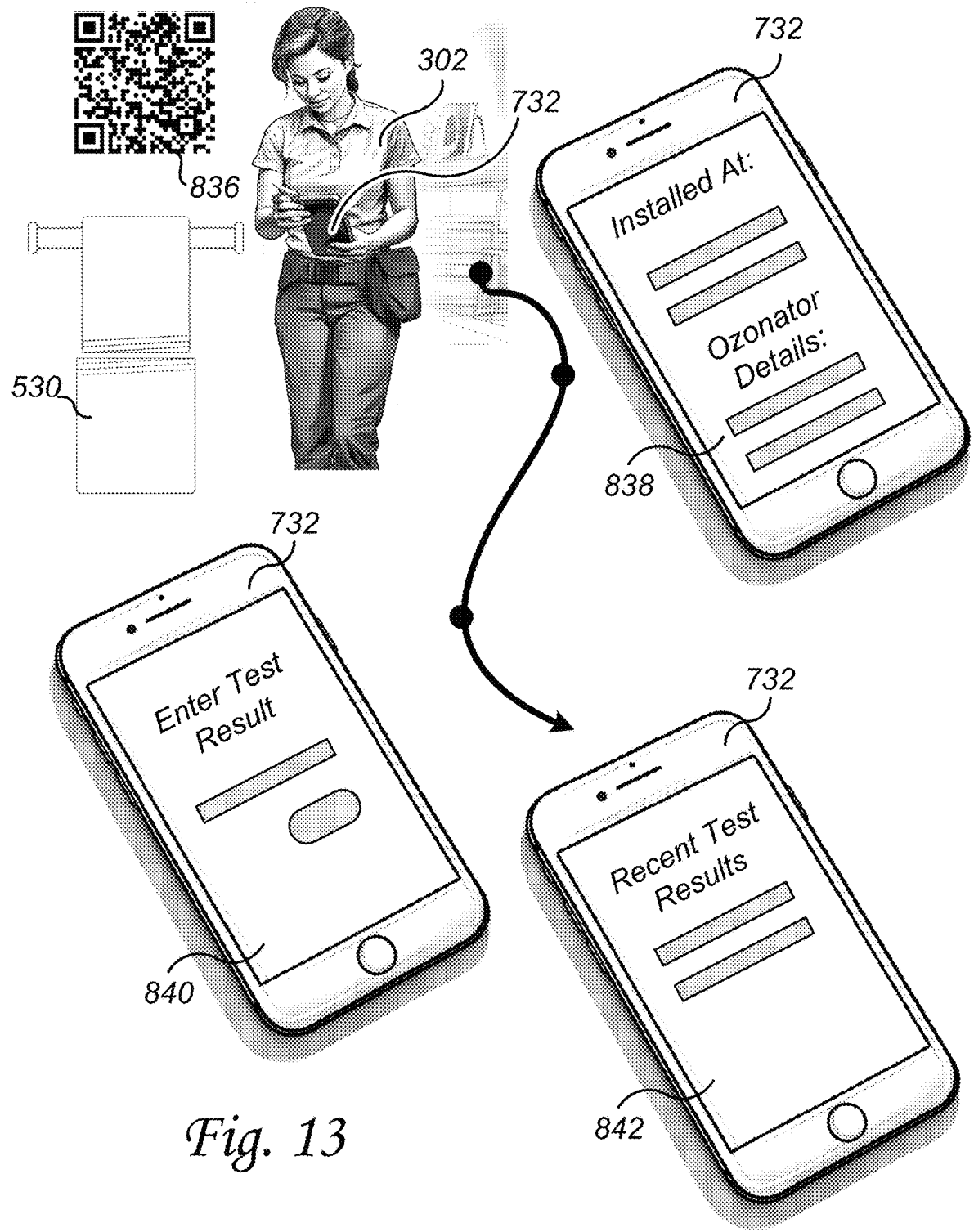
FIG. 13 illustrates one example of a technician's use of a software application.

In an exemplary embodiment and with reference to at least FIG. 13, a computing device 732, operated by technician 302, data communicates the test ozone concentration to a remote data processing resource 702, and receives from the remote data processing resource 702, by way of the computing device 732 a plurality of aqueous ozone generator service life data that corresponds to the remaining service life 826 of the electrochemical generator 516.

In an exemplary embodiment, in operation, technician 302 can scan a QR code 836 or other suitable identifier to identify the specific aqueous ozone disinfection system 100.

In screenshot 832, the specific aqueous ozone disinfection system 100 identification can be data communicated to the remote data processing resource 702 and received in return from the remote data processing resource 702 data related to where the specific aqueous ozone disinfection system 100 is installed, detailed information about the specific aqueous ozone disinfection system 100, and other relevant information, as may be required and/or desired in a particular embodiment.

In screenshot 840, technician 302 can enter the test ozone concentration reading just taken and data communicate the test ozone concentration reading to the remote data processing resource 702 where the test ozone concentration reading can be recorded.

In screenshot 842, received from the remote data processing resource is a plurality of aqueous ozone generator service life data related to specific aqueous ozone disinfection system 100. Such plurality of aqueous ozone generator service life data can comprise prior test results (time/date, ozone concentration, other data), the technicians who made those prior readings, an estimation of the remaining service life 826, maintenance information, service information, warning or alerts, and other relevant information, as may be required and/or desired in a particular embodiment.

In an exemplary embodiment, technician 302 can use an ozone sensor that is attached either temporarily or permanently to the control system 500. In this regard, in operation, a control system 500 can comprise a microcontroller 504, a memory 504, an ozone sensor 522 (attached temporarily to make a reading or permanently where test ozone readings can be initiated automatically and/or remotely), and a communication interface 508. The microcontroller 502 is operationally related to the memory 504, the ozone sensor 522, and the communication interface 508.

The memory 504 can be encoded with instructions that when executed by the microcontroller 502 perform the steps of recording, by way of the ozone sensor 522, a test ozone concentration of the ozonated concentrate liquid. By way of the communication interface, the test ozone concentration can be data communicated to a remote data processing resource 702. Confirmation of the recording of the test result by the remote data processing resource 702 can be the receiving, by way of the communication interface 508 of a plurality of aqueous ozone generator service life data. Such plurality of aqueous ozone generator service life data can comprise prior test results (time/date, ozone concentration, other data), the technicians who made those prior readings, an estimation of the remaining service life 826, maintenance information, service information, warning or alerts, and other relevant information, as may be required and/or desired in a particular embodiment.

In an exemplary embodiment, a fixed-volume inspection chamber 136 can receive a continuous flow and maintain a fixed-volume portion 222 of the ozonated concentrate liquid 118. The amount of the fixed-volume portion 222 can be predetermined by one of the test requirements of an ozone concentration test implement 602/604/606. In operation, the ozone concentration test implements 602/604/606 can include an ozone concentration test strip 604, an ozone concentration test drop 602, an ozone concentration test device 606, or other suitable test implements. The ozone concentration test implements 602/604/606 can be manually used by a technician 302 to determine a test ozone concentration of the ozonated concentrate liquid 118 within the fixed-volume inspection chamber 136 by inserting the ozone concentration test implement 602/604/606 into the fixed-volume inspection chamber 136 and then reading the test ozone concentration of the ozonated concentrate liquid 118.

Continuing, a computing device 732, operated by technician 302, data communicates the test ozone concentration to a remote data processing resource 702, and receives from the remote data processing resource 702, by way of the computing device 732 a plurality of aqueous ozone generator service life data that corresponds to the remaining service life of the electrochemical generator 516.

Referring to FIG. 10, there is illustrated one example of mixing pulse sequence 400 by way of transitioning between pump/valve 528A and 528B activation pulses. The mixer pulse sequence 400 can be represented as a square wave 402/404 that indicated a time period 418 that an electronic pump/valve 528A is energized 'ON' or 'OPEN' 410/412 to control the ozone concentration of the ozonated liquid 118 by controlling the flow rate of the mixture 102/140 through the aqueous ozone generator 530 or in standby 'OFF' or "CLOSED" abating mixture 102/140 flow.

In an exemplary embodiment, the mixing pulse sequence 400 is one or more of the pump/valves 528B being energized and/or otherwise 'OPENED' for a predetermined amount of time to allow electrolyte 140 to be dosed into the water 102. A longer 'OPEN' increases the dosing of electrolyte 140. In operation, the dosing amount of the electrolyte is determined to be the amount needed to modify the conductivity of the mixture (water 102+electrolyte 140) to within the desired conductivity range 430.

In an exemplary embodiment, in reference 'A' 414 initially electronic pump/valve 528A is energized allowing the water source 102 to enter the aqueous ozone generator 530. The mixer pulse sequence 400 then continues in reference 'B' 416 by energizing electronic pump/valve 528B allowing the electrolyte 140 to enter the inlet water stream and enter as a mixture 102/140 into the aqueous ozone generator for a predetermined time period 412.

The mixer pulse sequence 400 repeats as needed. Each mixer pulse sequence 400 ratiometrically blends the water source 102 and the electrolyte 140 as well as controls the dwell time of the mixture 120/140 within the aqueous ozone generator 530.

In an exemplary embodiment, a pressure equalization pause 406 can be inserted between transition signals 402/404. In this regard, each time a pump/valve 528A-B is turned 'OFF' or 'CLOSED' a pressure equalization pause 406 can occur before turning the next pump/valve 528A-B 'ON' or 'OPENING'. This pressure equalization pause 406 allows pressures in the coupled lines to the pump/valve 528A-B and system, in general, to stabilize so that when the next pump/valve 528A-B is turned 'ON' or 'OPENED' the pressure is the same as prior sequence cycle and the flow during the timing sequence is predictable and accurate each sequence cycle for the water 120, electrolyte 140, mixture 102/140, and the ozonated concentrate liquid 118 being passed into and through the system 100.

In another exemplary embodiment, the memory 504 can be encoded with instructions that when executed by the microcontroller 502 perform the steps of mixing the water 102 and electrolyte 140 in the predetermined mixture by transitioning between activating the pump 528A for a mixture dwell time pulse 402 width period 410, allowing the mixture 102/140 to flow into/through the aqueous ozone generator 530 during the pulse 402 width period 410. And, activating the electrolyte pump 532B for a pulse 404 width period 412, dosing the water 102 with a predetermined amount of electrolyte 140 during the pulse width 404 period 412. In operation, the pulse 402 width period 410 and the pulse 404 width period 412 are selected to produce a mixture 102/140 at a predetermined desired conductivity range and to control the flow (establishing a desired dwell time for the mixture 102/140 within the aqueous ozone generator in a continuous flow manner) of the mixture 102/140 to a generate a predetermined desired ozone PPM range.

Referring to FIG. 11, there is illustrated one example of a system and network diagram. In an exemplary embodiment, users of the platform and network can include technicians 302, administrators 304, or other authorized persons.

Each of the users uses computing devices 732A-C to data communicate over a global communication network 700 with one or more data processing resources 702. The computing devices 732A-C can be laptop computers, desktop computers, smartphones, tablets, or other types and kinds of computing devices, as may be required and/or desired in a particular embodiment. For disclosure purposes, computing devices 732A-C can be referred to as computing devices 732. Additionally, laptop and desktop types of computing devices 732 can be referred to as computing devices 712C, computing devices 732 such as smartphones can be referred to as computing devices 732B, and computing devices 732 such as tablets can be referred to as computing devices 732A. In operation, any of the users can use any of the types of computing devices 732A-C, without limitation to the type or kind of computing device 732, as may be required and/or desired in a particular embodiment. The global communication network 700 can be the Internet.

The computing devices 732 can comprise a microprocessor 704B/704C, a database 706B/706C, memory 208C, a communication interface 710B/710C, a display 712B/712C, and a plurality of general-purpose inputs and outputs (GPIO) 714B/714C.

Additionally, mobile type of computing device 732A/732B (tablets, smartphones, and others) can comprise a global positioning system (GPS) 716, and a microphone and/or camera 718.

In general, computing devices 232 can be configured with other functions and features, as may be required and/or desired in a particular embodiment.

In an exemplary embodiment, the microprocessor 704B is operationally related to database 706B, memory 708B, communication interface 710B, display 712B, and GPIO 714B In an exemplary embodiment, the microprocessor 704C is operationally related to database 706C, memory 708C, communication interface 710C, display 712C, GPIO 714C, and if equipped with GPS 716, and microphone and/or camera 718. The computing devices 732 each rely on a suitable power source 720B/720C which can include a rechargeable battery, external power supply, or other types and/or kinds of power sources.

Microprocessor 704B/704C can be INTEL, ZILOG, MICROCHIP, AMD, ARM, and/or other types or kinds of microprocessors.

Database 706B/706C can be SQL, MYSQL, MARIADB, ORACLE, MS ACCESS, network-accessible storage, flat files, a combination thereof, or other types and kinds of databases.

Memory 708B/708C can be a combination of RAM, ROM, flash, hard drives, solid-state drives, USB flash drives, micro-SD cards, or other types of removable memory, and/or other types and kinds of memory.

The communication interfaces 710B/710C can be LAN, WAN, USB, Ethernet, RS232, RS485, serial, Wi-Fi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

Display 712B/712C can be a liquid crystal display (LCD), light emitting diode (LED), organic light emitting diode (OLED), or other types and kinds of displays.

The general-purpose inputs and outputs (GPIO) 714B/714C can be TTL, CMOS, MOSFET, transistors, buffers, relays, pushbuttons, switches, and/or other types and kinds of GPIO circuits. In an exemplary embodiment, some of the GPIO 214 lines can be used to drive a touch screen input, biometric input devices, keyboards, and/or types and kinds of computing device input devices.

Global positioning system (GPS) device 716 can be used to determine the geographic location of technician 302 and others who are carrying a computing device 732 equipped with a GPS 716. In this regard, such computing devices 732 are typically mobile computing devices such as tablets 732A, smartphones 732B, and other similar types and/or kinds of mobile computing devices 732.

Microphone and/or camera 718 can be used to record audio, and video, and take pictures. In this regard, users 304/306 can use their computing devices equipped with a microphone and/or camera 718 to make digital media records that can be selectively shared as appropriate including on social media and other digital media outlet locations.

With reference to FIG. 11, the data processing resource 702 can be a server, network storage device, or other types and kinds of data processing resources. Such data processing resources can be AMAZON WEB SERVICES (AWS), MICROSOFT AZURE, or other types and kinds of hosted data processing resource services. For disclosure purposes, a remote data processing resource 702 can also be referred to as server 702.

The data processing resource 702 can comprise a microprocessor 704A, a database 706A, memory 708A, and a communication interface 710A. The microprocessor 704A is operationally related to database 706A, memory 708A, and communication interface 710A.

The microprocessor 704A can be INTEL, ZILOG, MICROCHIP, AMD, ARM, and/or other types or kinds of microprocessors.

The database 706A can be SQL, MYSQL, MARIADB, ORACLE, MS ACCESS, network accessible storage, flat files, a combination thereof, or other types and kinds of databases.

The memory 708A can be a combination of RAM, ROM, flash, hard drives, solid-state drives, USB flash drives, micro-SD cards, or other types of removable memory, and/or other types and kinds of memory.

The communication interfaces 710A can be LAN, WAN, USB, Ethernet, RS232, RS485, serial, Wi-Fi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

Figure 12:
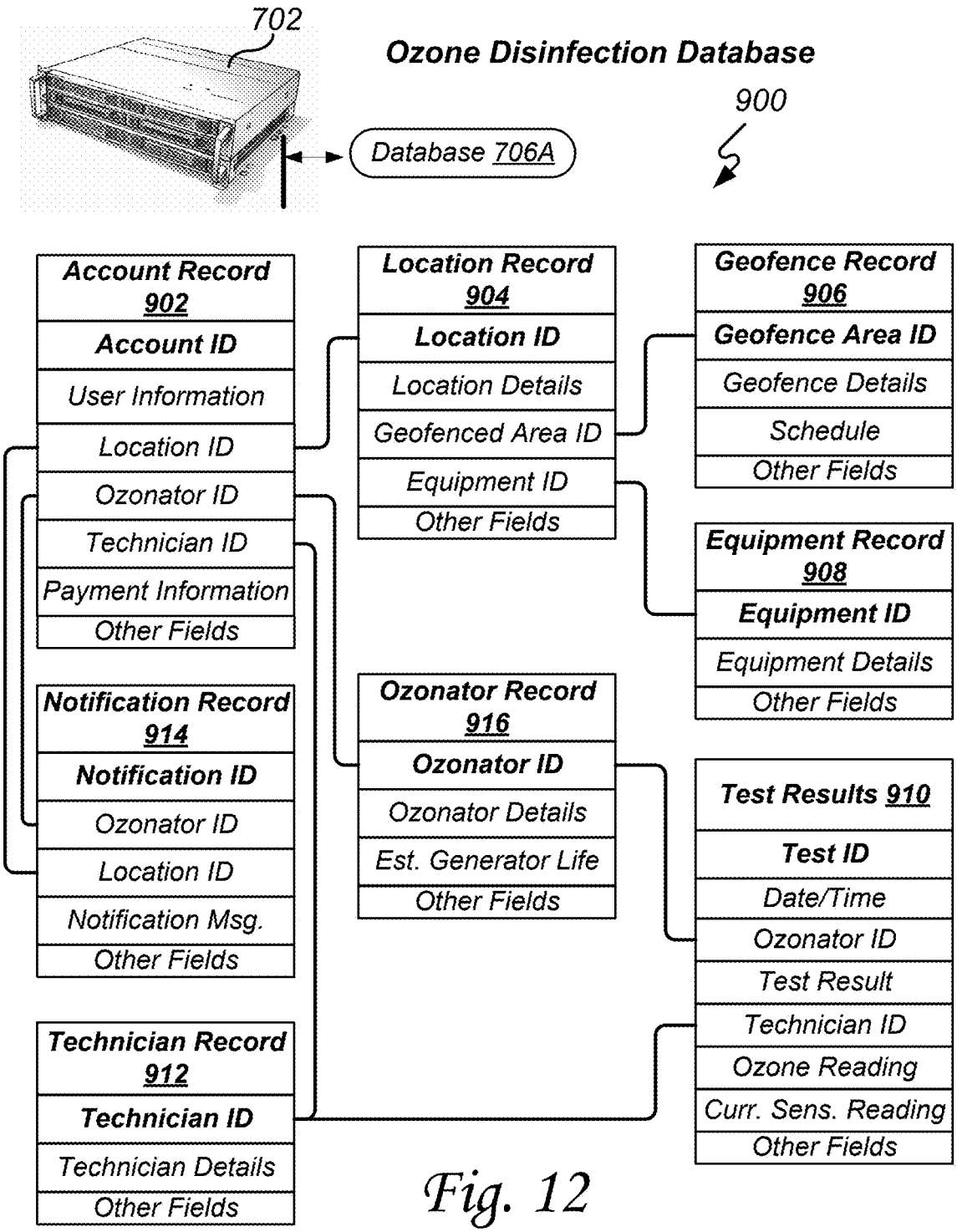
FIG. 12 illustrates one example of an ozone disinfection database structure.

Referring to FIG. 12, there is illustrated one example of an ozone disinfection database structure 900. In an exemplary embodiment, at least one database 706A/706B/706C can be implemented on at least one of the data processing resources 702 also referred to as server 702, or computing devices 732. In operation, one or more databases 706A/706B/706C can be accessed/created/managed/maintained as appropriate by more than one stakeholder. In this regard, in addition to system administrators and other authorized persons, other stakeholders can access/create/manage/maintain as appropriate.

In an exemplary embodiment, such databases 706A/706B/706C can be SQL, MYSQL, MARIADB, ORACLE, MS ACCESS, network-accessible storage, flat files, a combination thereof, or other types and kinds of databases.

In an exemplary embodiment, the ozone disinfection database 900 can reside on a remote data processing resource 702 in database 706A. In this regard, the ozone disinfection database 900 can comprise a series of tables, records, fields, and accounts that include account record 902, location record 904, geofence record 906, equipment record 908, test results 910, technician record 912, notification record 914, ozonator record 916, and/or other types or kinds of records as may be required and/or desired in a particular embodiment. The database structure illustrated in FIG. 12 also illustrates the relationship between the various tables.

In an exemplary embodiment, the data structure of account record 902 is illustrative and can be expanded and modified without particular limitation as needed and as appropriate to support the functionality and methods of the present invention and to support future functionality and methods of the present invention as it grows and evolves over time.

Figure 14:
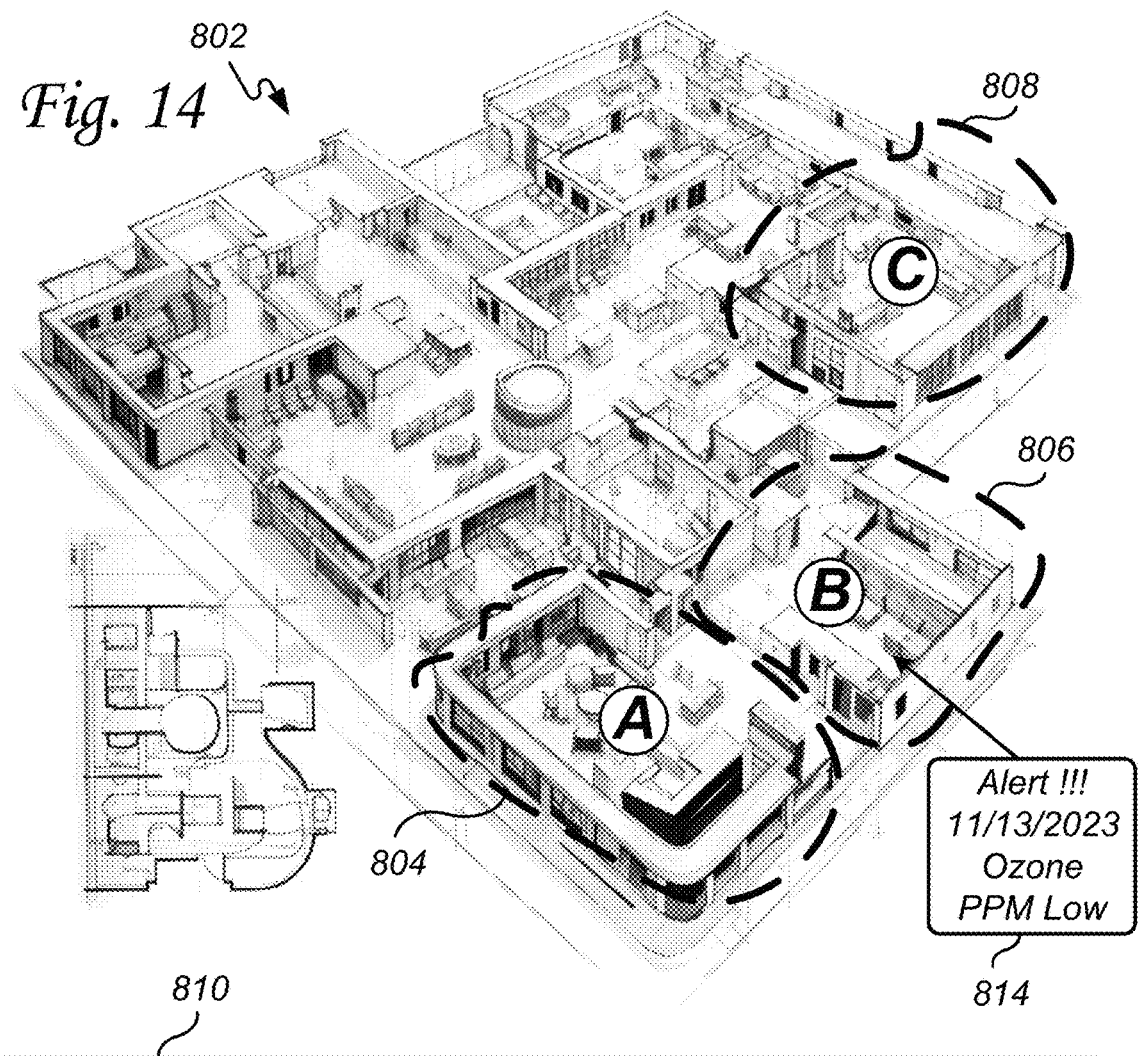
FIG. 14 illustrates one example of a floor plan to monitor geofenced areas that have been treated with the concentrated ozone liquid.

Referring to FIG. 14, there is illustrated one example of a floor plan 802 to monitor geofenced food wash areas and food preparation areas 804/806/808 that are services by a specific aqueous ozone generator 530. In an exemplary embodiment, by way of a global position system (GPS), 514 geofence areas 804/806/808 can be established around where the aqueous ozone generator 530 services and can be recorded. By way of the communication interface 508, the status of the aqueous ozone generator and thus the food wash and food preparation areas services by the aqueous ozone generator 530 can be monitored including the GPS location 804/806/808. This information can be data communicated to a remote data processing resource 702. In operation, the aqueous ozone generator 530, food wash, and food preparation surfaces 204 that are being treated can be remotely monitored.

Additionally, in an exemplary embodiment, alerts 812/814 can be generated when for example the aqueous ozone generator 530 and thus the food wash and/or food preparation surface are not being treated with a sufficiently high enough concentration of ozone to achieve adequate disinfection, or for other reasons as may be required and/or desired in a particular embodiment. Such alerts 812/814 can also be noted on reports 810.

In another exemplary embodiment, reports 810 can be generated to monitor, track, and summarize activities. Such reports 810 can include a plurality of aqueous ozone generator service life data, ozone concentration test results, geofenced surfaces 804/806/808 description, location, disinfection history, and other data as may be required and/or desired in a particular embodiment.

Referring to FIG. 15, there is illustrated one example of monitoring ozone concentration test results. In an exemplary embodiment in reference 'A', test ozone concentration of the ozonated concentrate liquid 118 can be generated by way of a plurality of ozone concentration test implement that include ozone concentration test strips 604, ozone concentration test drops 602, ozone concentration test device 606, and ozone sensor 520.

In reference 'B', such ozone concentration test results 816 can be recorded on a remote data processing resource and used to generate reports 818 such reports can be tailored as needed and can be referred to as a plurality of aqueous ozone generator service life data. Such plurality of aqueous ozone generator service life data can comprise prior test results (time/date, ozone concentration, other data), the technicians who made those prior readings, an estimation of the remaining service life 826, maintenance information, service information, warning or alerts, and other relevant information, as may be required and/or desired in a particular embodiment.

An advantage, in the present invention, and with reference to 'C', is that by tracking ozone concentration 822 test results over time 824 the remaining service life 826 also referred to as the service life status of the electrochemical generator 516 and/or the aqueous ozone generator 530 can be determined or otherwise predicted. In this regard, components and materials within the electrochemical generator 516 and/or the aqueous ozone generator 530 degrade over time under normal use. A metric that changes as the efficiency of the electrochemical generator 516 and/or the aqueous ozone generator 530 degrade can be the amount of ozone produced and thus changes in ozone concentrations ppm can be observed over time. This present invention can establish a range 828 where ozone concentration test results above 832 are considered acceptable and ozone concentration test results 820 are below 834 are considered unacceptable. Appropriate electrochemical generator 516 and/or the aqueous ozone generator 530 replacement notifications 830 can be sent to technician 302 and/or the administrator. Such replacement notification can inform technician 302, and/or administrator 304 that the electrochemical generator 516 and/or the aqueous ozone generator 530 need to be serviced or replaced.

In the case that the ozone concentration test results indicated premature degradation of the electrochemical generator 516 and/or the aqueous ozone generator 530 before a normal life expectancy, technician 302 and/or administrator 304 can be notified to check for water mineral scaling of the electrochemical generator 516 and/or the aqueous ozone generator 530 components and clean as appropriate. The ability of the present invention to detect mineral scaling which is cleanable can save the technician 302 and/or the administrator the cost of prematurely replacing the electrochemical generator 516 and/or the aqueous ozone generator 530.

In an exemplary embodiment, in operation, the service life status of the electrochemical generator 516 and/or the aqueous ozone generator 530 can be displayed on display 506/712B/712C. The service life status is based on the plurality of aqueous ozone generator service life data received from the remote data processing resource 702.

In an exemplary embodiment, in cases where the ozone concentration test results 826 are out of range 828 and/or are below 834 which is considered unacceptable, the system can be prevented from operating. In other words, if the plurality of aqueous ozone generator service life data indicates the aqueous ozone generator has reached the end of service life the system can be prevented from working until the electrochemical generator 516 and/or aqueous ozone generator 530 is serviced or replaced.

Figure 16:
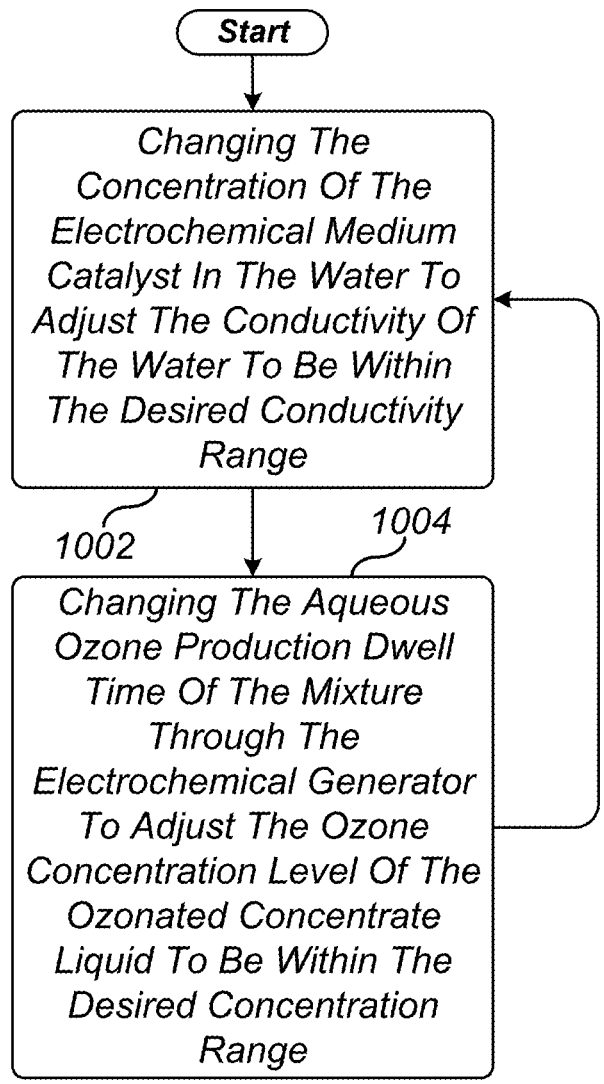
FIG. 16 illustrates one example of a method of using an aqueous ozone disinfection system.

Referring to FIG. 16, there is illustrated one example of a method of using an aqueous ozone disinfection system 100. In an exemplary embodiment, in step 1002, the method begins by changing the concentration of the electrochemical medium catalyst in the water to adjust the conductivity of the water 102 to be within the desired conductivity range 430. In this regard, water that is soft or otherwise has a below-desired conductivity can be adjusted by adding electrolyte 140 to the water 102 to improve the conductivity to within the desired conductivity range 430. Such adjustments improve or other maintain the desired electrochemical production of aqueous ozone molecules. The method then moves to step 1004.

In step 1004, the method continues by changing the aqueous ozone production dwell time 442 of the mixture through the electrochemical generator 516 to adjust the ozone concentration level of the ozonated concentrate liquid 118 to be within the desired ozone concentration range 440.

Figures 25, 26:
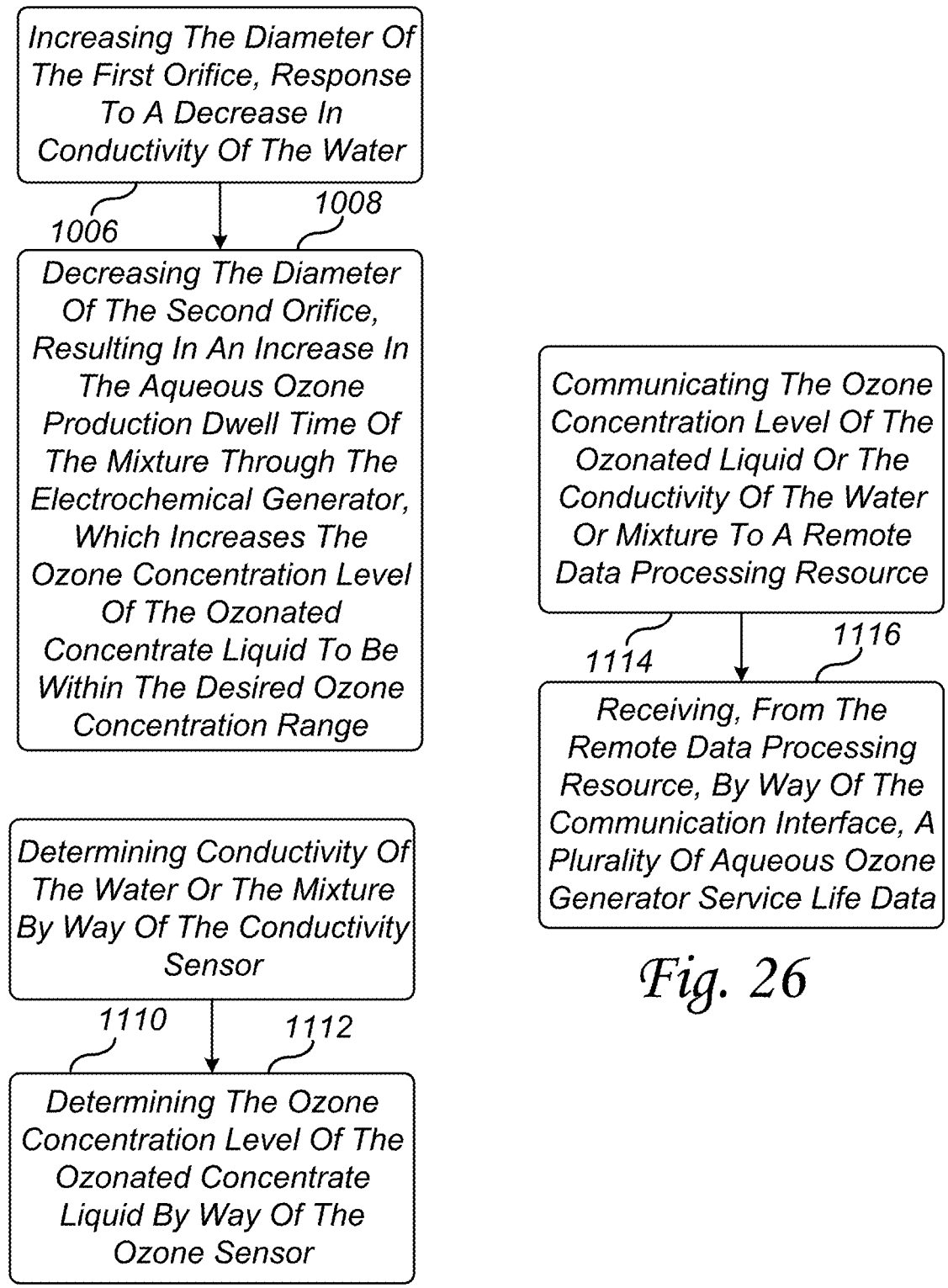

Referring to FIGS. 25-28, there are illustrated exemplary embodiments that can be interchangeably used with the methods of the present invention. With reference to FIG. 26, in an exemplary embodiment, in step 1006, the diameter of the first orifice which controls the amount of electrolyte 140 added to the water 102 can be increased, by way of the first orifice control, responsive to a decrease in the conductivity of the water 102, resulting in an increase in conductivity (lower resistance, electrical current flow more easily between the electrodes) of the water 102 to within the desired conductivity range 430. The method then moves to step 1008.

In step 1008, the diameter of the second orifice is decreased (slowing the flow of the mixture 102/140), by way of the second orifice control, resulting in an increase in the aqueous ozone production dwell time 442 of the mixture through the electrochemical generator 516, which increases the ozone concentration level of the ozonated concentrate liquid to be within the desired ozone concentration range 440.

In step 1010, the conductivity of the water 102 or the mixture 102/140 is determined by way of the conductivity sensor 532. The method then moves to step 1012.

In step 1012, the ozone concentration level of the ozonated concentrate liquid 118 is determined by way of the ozone sensor 522.

With reference to FIG. 26, in step 1014, the ozone concentration level of the ozonated concentrate liquid 118 or conductivity of the water 102 or the mixture 102/140 is data communicated, by way of the communication interface 508, to a remote data processing resource 702. The method then moves to step 1016.

In step 1016, a plurality of aqueous ozone generator service life data is received, from the remote data processing resource 702, by way of the communication interface 508.

Figure 27:
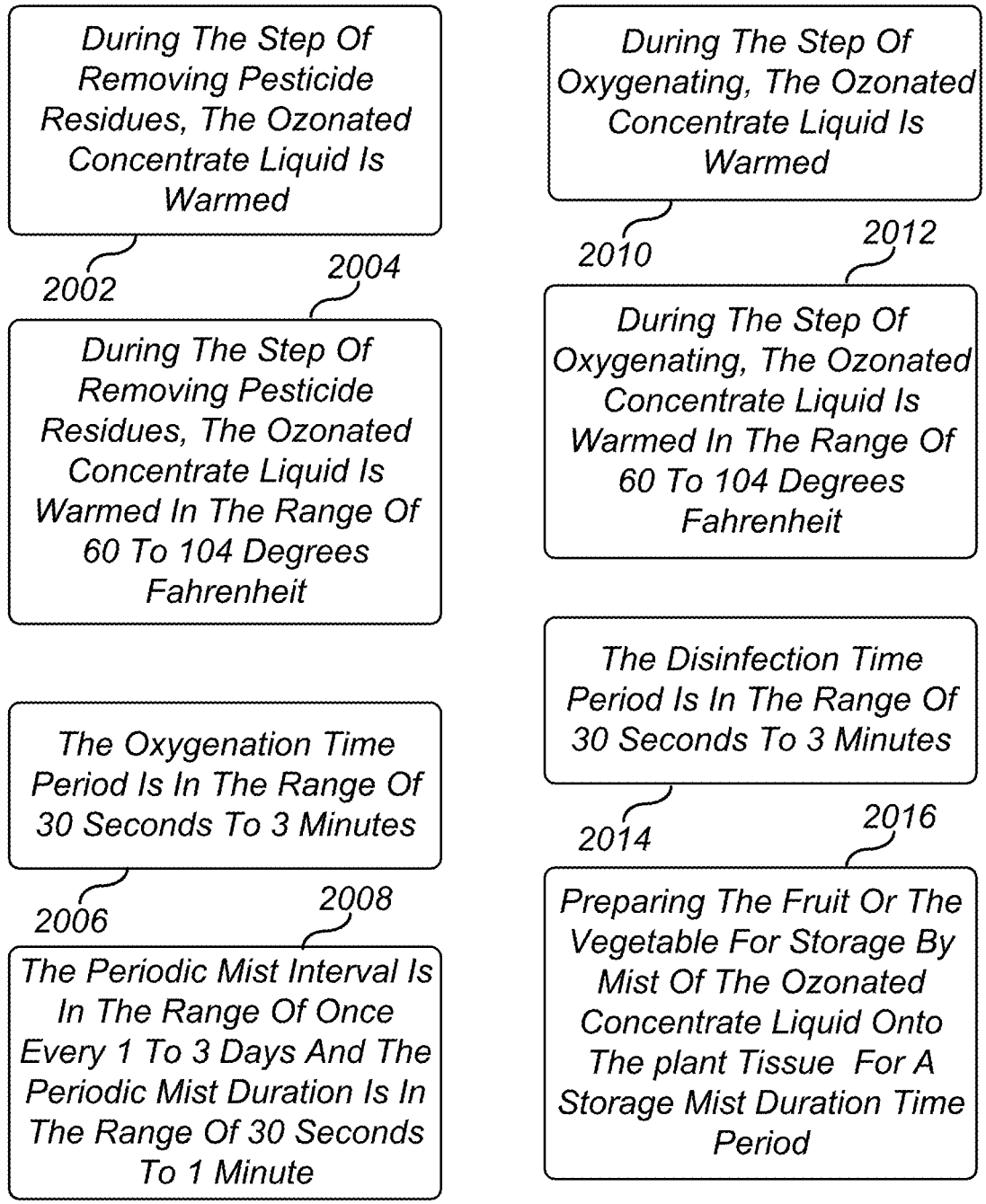

With reference to FIG. 27, in step 2002, during the step of removing pesticide residues, the ozonated concentrate liquid 118 is warmed, and in step 2004 the ozonated concentrate liquid 118 is warmed in the range of 60 to 104 degrees Fahrenheit. In operation, pesticide residue removal is enhanced, and harm to produce 318 which includes lettuce 318 is minimized.

An advantage, in the present invention, is that how warming the ozonated concentrate liquid 118 improves the efficacy in pesticide removal. Here are a few ways in which warming ozonated water may improve its efficacy:

Increased solubility: Warmer water generally has a higher solubility for gases, including ozone. This means that warmer water can dissolve more ozone, leading to a higher concentration of ozone in the water. A higher concentration of ozone results in more effective pesticide breakdown;

Enhanced chemical reactions: Temperature can influence chemical reactions, and warmer water facilitates the chemical reactions involved in the breakdown of pesticides by ozone. The increased kinetic energy of molecules at higher temperatures accelerates reaction rates; and Improved penetration: Warmer water improves the penetration of ozone into the porous surfaces of fruits and vegetables. Pesticide residues can be present not only on the surface but also within the produce. Improved penetration of ozonated water helps in reaching and breaking down residues that are more deeply embedded.

In step 2010, during the step of oxygenating, the ozonated concentrate liquid 118 is warmed, and in step 2012 the ozonated concentrate liquid 118 is warmed in the range of 60 to 104 degrees Fahrenheit. In operation, oxygenation of the plant tissue 326 is enhanced, and harm to the produce 318 which includes the lettuce 318 is minimized. Furthermore, in step 2006, the oxygenation treatment time 472 can be in the range of 30 seconds to 3 minutes, or other suitable time.

In step 2014, the disinfection treatment time 470 can be in the range of 30 seconds to 3 minutes, or other suitable time.

In step 2008, the periodic mist interval 474 can be in the range of once every 1 to 3 days and the periodic mist duration is in the range of 30 seconds to 1 minute, or other suitable times.

In step 2016, the produce 318 which includes the lettuce 318 can be prepared for storage by misting the ozonated concentrate liquid 118 onto the plant tissue 326 for a storage mist duration treatment time. Such storage mist duration treatment time can be in the range of less than one minute.

With reference to FIG. 28, in step 2102, the produce 318 which includes the lettuce 318 can be dried by air drying, salad spinning, blotting with a paper/cloth towel or clean kitchen towel, commercial salad dryers, a draining rack, or other suitable methods.

In step 2104, produce 318 which includes lettuce 318 can be spun dry prior to the step of returning the lettuce to the prepackaged lettuce packaging for storage.

In step 2106, the food item 328 can be a sandwich, a salad, a hamburger, a pizza, a taco, a burrito, or other type or kind of food item as may be required and/or desired in a particular embodiment.

In step 2108, pesticide residues can be removed from the fruit or the vegetable 318 by a rinse with the ozonated concentrate liquid for a pesticide residue removal treatment time 468. The ozonated concentrate liquid 118 used in the rinse is preferably not reused in other steps.

In step 2110, the produce 318 which includes the lettuce 318 can be removed from a prepackaged lettuce packaging 324, prior to the step of removing pesticide residues. And, in step 2112 the produce 318 which includes the lettuce 318 can be returned to the prepackaged lettuce packaging 324 for storage after the steps of removing, disinfecting, and oxygenating.

In step 2114, the plant tissue 326 can be oxygenated by removing the fruit or the vegetable from the immersion and delaying drying for an oxygenation treatment time 472, enhancing the metabolic processes of the plant tissue 326.

In step 2116, a customer 310 accessible one or more countertop 316 or one or more table 316 can be disinfected by misting the ozonated concentrate liquid 118 onto the surface of the countertop 316 or the table 316 and allowed to air drying absent agitation or removal, for at least a customer used surface treatment time. The customer-used surface treatment time can be in the range of less than one minute, or other suitable ranges.

The capabilities of the present invention can be implemented in software, firmware, hardware, or some combination thereof.

As one example, one or more aspects of the present invention can be included in an article of manufacture (e.g., one or more computer program products) having, for instance, computer-usable media. The media has embodied therein, for instance, computer-readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A container for treating produce with an ozonated concentrate liquid, comprising:
an aqueous ozone generator configured to generate the ozonated concentrate liquid from water;
a flow governor configured to regulate an ozonated concentrate liquid production dwell time of the water through the electrochemical generator, controlling an ozone concentration level of the ozonated concentrate liquid within a desired ozone concentration range;

an adjustable egress port at the base of a container, configured to allow the ozonated concentrate liquid to drain from the container at a controlled time rate, wherein the time rate corresponds to a disinfection treatment time; and one or more produce agitation mechanisms.

2. The container of claim 1, wherein the one or more produce agitation mechanisms comprise an ultrasonic vibrator and wherein the ozonated concentrate liquid is generated from water by way of an electrochemical generator.

3. The container of claim 1, wherein the one or more produce agitation mechanisms comprise a mechanical vibrator and wherein the ozonated concentrate liquid is generated from water by way of an electrochemical generator.

4. The container of claim 1, wherein the one or more produce agitation mechanisms comprise an airflow blower and wherein the ozonated concentrate liquid is generated from water by way of an electrochemical generator.

5. The container of claim 1, wherein the one or more produce agitation mechanisms comprise a spinning motor and wherein the ozonated concentrate liquid is generated from water by way of an electrochemical generator.

6. The container of claim 1, wherein an aperture of the egress port is adjustable.

7. The container of claim 1, wherein the container further comprises a drying platform that is configured as a slotted or perforated surface and wherein the ozonated concentrate liquid is generated from water by way of an electrochemical generator.

8. The container of claim 1, wherein the one or more produce agitation mechanisms are controlled by a produce agitator controller, configured to automatically activate one or more of the agitation mechanisms, and wherein the ozonated concentrate liquid is generated from water by way of an electrochemical generator.

9. A method of treating produce with an ozonated liquid using a container, the container comprising:

an adjustable egress port at the base, configured to allow an ozonated concentrate liquid to drain at a controlled time rate;

one or more produce agitation mechanisms, comprising at least one of an ultrasonic vibrator, a mechanical vibrator, an airflow blower, or a spinning motor;

a drying platform, configured as a slotted or perforated surface for post-treatment drying;

an aqueous ozone generator configured to generate the ozonated concentrate liquid from water; and a flow governor configured to regulate an ozonated concentrate liquid production dwell time of the water through the electrochemical generator, controlling an ozone concentration level of the ozonated concentrate liquid within a desired ozone concentration range, wherein the method comprises:

placing produce inside the container;

filling the container with the ozonated concentrate liquid;

adjusting the egress port to drain the ozonated concentrate liquid at the controlled time rate corresponding to a desired disinfection treatment time; and operating the one or more produce agitation mechanisms.

10. A container for treating produce with an ozonated concentrate liquid, comprising:

an immersion container configured to hold produce and an ozonated concentrate liquid;

an adjustable egress port at the base of the immersion container, configured to allow the ozonated concentrate liquid to drain at a controlled time rate, wherein the time rate corresponds to a disinfection treatment time;

one or more produce agitation mechanisms;

an aqueous ozone generator, configured to receive water and generate from the water the ozonated concentrate liquid; and a flow governor configured to regulate an ozonated concentrate liquid production dwell time of the water through the electrochemical generator, controlling an ozone concentration level of the ozonated concentrate liquid within a desired ozone concentration range.

11. The container of claim 10, wherein the aqueous ozone generator comprises an electrochemical generator, wherein the electrochemical generator comprises an ion exchange material.

12. The container of claim 11, further comprising a flow governor that is configured to regulate an aqueous ozone production dwell time of a mixture through the electrochemical generator, thereby controlling an ozone concentration level of the ozonated concentrate liquid within a desired ozone concentration range.

13. The container of claim 10, wherein the one or more produce agitation mechanisms comprise an ultrasonic vibrator.

14. The container of claim 10, wherein the one or more produce agitation mechanisms comprise a mechanical vibrator.

15. The container of claim 10, wherein the one or more produce agitation mechanisms comprise an airflow blower.

16. The container of claim 10, wherein the one or more produce agitation mechanisms comprise a spinning motor.

17. The container of claim 10, wherein an aperture of the egress port is adjustable.

18. The container of claim 10, wherein the container further comprises a drying platform that is configured as a slotted or perforated surface.

19. The container of claim 10, wherein the one or more produce agitation mechanisms are controlled by a produce agitator controller, configured to automatically activate one or more of the agitation mechanisms.

20. A method of treating produce with an ozonated liquid using a container, the container comprising:

an adjustable egress port at the base, configured to allow an ozonated concentrate liquid to drain at a controlled time rate;

one or more produce agitation mechanisms controlled by a produce agitator controller;

a drying platform for supporting produce post-treatment;

an aqueous ozone generator configured to generate the ozonated concentrate liquid from water; and a flow governor configured to regulate an ozonated concentrate liquid production dwell time of the water through the electrochemical generator, controlling an ozone concentration level of the ozonated concentrate liquid within a desired ozone concentration range, wherein the method comprises:

immersing produce in the container;

filling the container with the ozonated concentrate liquid;

activating the one or more produce agitation mechanisms via the produce agitator controller during the immersion process to enhance treatment; and draining the ozonated concentrate liquid through the adjustable egress port.

21. A system for treating produce with an ozonated concentrate liquid, comprising:
- a container configured to hold produce and an ozonated concentrate liquid;
- an aqueous ozone generator in fluid communication with the container, the aqueous ozone generator configured to receive water and generate from the water the ozonated concentrate liquid;
- a flow governor configured to regulate an ozonated concentrate liquid production dwell time of the water through the electrochemical generator, controlling an ozone concentration level of the ozonated concentrate liquid within a desired ozone concentration range;
- a flow regulator, configured to control the flow of ozonated concentrate liquid into the container;
- an adjustable egress port at the base of the immersion container, configured to allow the ozonated concentrate liquid to drain at a controlled time rate, wherein the time rate corresponds to a desired disinfection treatment time;
- one or more produce agitation mechanisms; and
- a produce treatment controller, configured to automatically adjust the operation of the flow regulator, the egress port, and the one or more produce agitation mechanisms.

* * * * *